United States Patent
Pelletier et al.

(10) Patent No.: US 9,246,646 B2
(45) Date of Patent: Jan. 26, 2016

(54) METHOD AND APPARATUS FOR TRANSMITTING PILOT ON MULTIPLE ANTENNAS

(75) Inventors: Benoit Pelletier, Montreal (CA); Lujing Cai, Morganville, NJ (US); Hong Zhang, Manalapan, NJ (US); Fengjun Xi, Huntington Station, NY (US); Joseph S. Levy, Merrick, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 13/250,238

(22) Filed: Sep. 30, 2011

(65) Prior Publication Data

US 2012/0082192 A1 Apr. 5, 2012

Related U.S. Application Data

(60) Provisional application No. 61/389,112, filed on Oct. 1, 2010, provisional application No. 61/410,731, filed on Nov. 5, 2010, provisional application No. 61/430,928, filed on Jan. 7, 2011, provisional (Continued)

(51) Int. Cl.
*H04L 5/00* (2006.01)
*H04W 52/42* (2009.01)
(Continued)

(52) U.S. Cl.
CPC ............ *H04L 5/0023* (2013.01); *H04B 7/0404* (2013.01); *H04B 7/0678* (2013.01);
(Continued)

(58) Field of Classification Search
CPC . H04L 5/0098; H04L 5/0092; H04W 76/048; H04W 72/02; H04W 72/0413; H04W 52/0146

USPC .......... 375/219, 267; 370/252, 311, 329, 335, 370/350
See application file for complete search history.

(56) References Cited

U.S. PATENT DOCUMENTS

| | | |
|---|---|---|
| 6,868,075 B1 | 3/2005 | Narvinger et al. |
| 6,947,476 B2 | 9/2005 | Song |

(Continued)

FOREIGN PATENT DOCUMENTS

| | | |
|---|---|---|
| EP | 1793509 A1 | 6/2007 |
| WO | 2008/115588 | 9/2008 |

(Continued)

OTHER PUBLICATIONS

Huawei, "Analysis of UL Transmit Diversity schemes," 3GPP TSG RAN WG1 Meeting #58bis, R1-094297 (Oct. 12-16, 2009).

(Continued)

*Primary Examiner* — Daniel Washburn
*Assistant Examiner* — Eboni Hughes
(74) *Attorney, Agent, or Firm* — Volpe and Koenig, P.C.

(57) ABSTRACT

Method and apparatus for transmitting pilot on multiple antennas are disclosed. A wireless transmit/receive unit (WTRU) may transmit a primary dedicated physical control channel (DPCCH) and at least one secondary DPCCH via multiple antennas using different channelization codes. The first eight pilot symbols of the secondary DPCCH may be same as pilot symbols of length eight of the primary DPCCH. The secondary DPCCH may include a same number of pilot bits as the primary DPCCH in a normal mode and in a compressed mode, respectively. The transmit power of the secondary DPCCH may be adjusted based on a ratio of a number of pilot symbols in the primary DPCCH and the secondary DPCCH. When a required transmit power exceeds a maximum allowed transmit power of the WTRU, power scaling may be applied equally to the primary DPCCH and the secondary DPCCH.

16 Claims, 14 Drawing Sheets

Related U.S. Application Data application No. 61/442,064, filed on Feb. 11, 2011, provisional application No. 61/480,162, filed on Apr. 28, 2011, provisional application No. 61/523,120, filed on Aug. 12, 2011.

(51) Int. Cl.

| | |
|---|---|
| *H04L 25/03* | (2006.01) |
| *H04L 27/26* | (2006.01) |
| *H04B 7/04* | (2006.01) |
| *H04B 7/06* | (2006.01) |
| *H04W 52/16* | (2009.01) |
| *H04W 52/28* | (2009.01) |
| *H04W 52/36* | (2009.01) |
| *H04W 52/38* | (2009.01) |
| *H04W 52/40* | (2009.01) |
| *H04J 13/16* | (2011.01) |

(52) U.S. Cl.
CPC ........ *H04L5/0051* (2013.01); *H04L 25/03942* (2013.01); *H04L 27/2613* (2013.01); *H04W 52/42* (2013.01); *H04B 7/0634* (2013.01); *H04J 13/16* (2013.01); *H04L 5/0014* (2013.01); *H04L 25/03961* (2013.01); *H04W 52/16* (2013.01); *H04W 52/286* (2013.01); *H04W 52/367* (2013.01); *H04W 52/386* (2013.01); *H04W 52/40* (2013.01)

(56) References Cited

U.S. PATENT DOCUMENTS

| | | | | |
|---|---|---|---|---|
| 7,920,890 | B2 | 4/2011 | Iwata | |
| 8,014,454 | B2 | 9/2011 | Yoshii | |
| 8,355,424 | B2* | 1/2013 | Xi | H04B 7/0617 375/144 |
| 8,358,614 | B2* | 1/2013 | Pani | H04W 52/346 370/310.2 |
| 8,380,238 | B2 | 2/2013 | Murata | |
| 8,400,935 | B2* | 3/2013 | Pelletier | H04L 5/0007 370/252 |
| 2004/0160921 | A1* | 8/2004 | Kaipainen | H04B 7/0619 370/335 |
| 2007/0015476 | A1 | 1/2007 | Akbar Attar et al. | |
| 2008/0247339 | A1* | 10/2008 | Choi | H04B 7/2681 370/281 |
| 2009/0067534 | A1 | 3/2009 | Kwak et al. | |
| 2009/0316575 | A1* | 12/2009 | Gholmieh | H04W 76/048 370/225 |
| 2010/0067517 | A1* | 3/2010 | Song | H04B 1/7075 370/350 |
| 2010/0157895 | A1* | 6/2010 | Pani | H04W 52/346 370/328 |
| 2010/0202394 | A1* | 8/2010 | Zhang | H04W 52/34 370/329 |
| 2010/0238829 | A1* | 9/2010 | Sambhwani | H04L 5/003 370/252 |
| 2010/0238869 | A1 | 9/2010 | Bruin et al. | |
| 2010/0246516 | A1* | 9/2010 | Pelletier | H04B 7/0404 370/329 |
| 2010/0322090 | A1* | 12/2010 | Zhang | H04W 52/42 370/252 |
| 2011/0105174 | A1* | 5/2011 | Pelletier | H04W 52/367 455/522 |

FOREIGN PATENT DOCUMENTS

| | | |
|---|---|---|
| WO | 2010051514 A1 | 5/2010 |
| WO | 2010051520 A1 | 5/2010 |
| WO | 2010124192 A2 | 10/2010 |
| WO | 2010/147689 A1 | 12/2010 |

OTHER PUBLICATIONS

Nokia Siemens Networks et al., "Options for uplink closed loop TX diversity & beamforming," 3GPP TSG-RAN WG1 Meeting #62, R1-104914 (Aug. 23-27, 2010).

Qualcomm Incorporated, "On the benefits of Uplink Closed Loop Transmit Diversity," 3GPP TSG RAN WG1 Meeting #62, R1-104737 (Aug. 23-27, 2010).

Ericsson, St-Ericsson, "Closed Loop Transmit Diversity for HSUPA," R1-105475, 3GPP TSG RAN WG1 Meeting #62bis, Xi'an, China, Oct. 11-15, 2010.

Song, "Frame Synchronization Word in W-CDMA System," IEEE Communications Letters, vol. 7, No. 11, Nov. 2003.

Third Generation Partnership Project, "Technical Specification Group Radio Access Network; Physical Channels and Mapping of Transport Channels onto Physical Channels (FDD) (Release 7)," 3GPP TS 25.211 v7.9.0, Dec. 2009.

Third Generation Partnership Project, "Technical Specification Group Radio Access Network; Physical Channels and Mapping of Transport Channels onto Physical Channels (FDD) (Release 7)," 3GPP TS 25.211 v7.10.0, Oct. 2010.

Third Generation Partnership Project, "Technical Specification Group Radio Access Network; Physical Channels and Mapping of Transport Channels onto Physical Channels (FDD) (Release 8)," 3GPP TS 25.211 v8.6.0, Dec. 2009.

Third Generation Partnership Project, "Technical Specification Group Radio Access Network; Physical Channels and Mapping of Transport Channels onto Physical Channels (FDD) (Release 8)," 3GPP TS 25.211 v8.7.0, Oct. 2010.

Third Generation Partnership Project, "Technical Specification Group Radio Access Network; Physical Channels and Mapping of Transport Channels onto Physical Channels (FDD) (Release 9)," 3GPP TS 25.211 v9.1.0, Dec. 2009.

Third Generation Partnership Project, "Technical Specification Group Radio Access Network; Physical Channels and Mapping of Transport Channels onto Physical Channels (FDD) (Release 9)," 3GPP TS 25.211 v9.2.0, Oct. 2010.

Third Generation Partnership Project, "Technical Specification Group Radio Access Network; Physical Channels and Mapping of Transport Channels onto Physical Channels (FDD) (Release 10)," 3GPP TS25.211 v10.0.0, Oct. 2010.

Third Generation Partnership Project, "Technical Specification Group Radio Access Network; Physical Layer Procedures (FDD) (Release 7)," 3GPP TS 25.214 v7.15.0, Mar. 2010.

Third Generation Partnership Project, "Technical Specification Group Radio Access Network; Physical Layer Procedures (FDD) (Release 7)," 3GPP TS 25.214 v7.17.0, Dec. 2010.

Third Generation Partnership Project, "Technical Specification Group Radio Access Network; Physical Layer Procedures (FDD) (Release 8)," 3GPP TS 25.214 v8.9.0, Mar. 2010.

Third Generation Partnership Project, "Technical Specification Group Radio Access Network; Physical Layer Procedures (FDD) (Release 8)," 3GPP TS 25.214 v8.12.0, Sep. 2011.

Third Generation Partnership Project, "Technical Specification Group Radio Access Network; Physical Layer Procedures (FDD) (Release 9)," 3GPP TS 25.214 v9.2.0, Mar. 2010.

Third Generation Partnership Project, "Technical Specification Group Radio Access Network; Physical Layer Procedures (FDD) (Release 9)," 3GPP TS 25.214 v9.7.0, Sep. 2011.

Third Generation Partnership Project, "Technical Specification Group Radio Access Network; Physical Layer Procedures (FDD) (Release 10)," 3GPP TS 25.214 v10.4.0, Sep. 2011.

Third Generation Partnership Project, "Technical Specification Group Radio Access Network; Radio Resource Control (RRC); Protocol Specification (Release 7)," 3GPP TS 25.331 v7.17.0, Jun. 2010.

Third Generation Partnership Project, "Technical Specification Group Radio Access Network; Radio Resource Control (RRC); Protocol Specification (Release 7)," 3GPP TS 25.331 v7.20.0, Jun. 2011.

Third Generation Partnership Project, "Technical Specification Group Radio Access Network; Radio Resource Control (RRC); Protocol Specification (Release 8)," 3GPP TS 25.331 v8.11.0, Jun. 2010.

Third Generation Partnership Project, "Technical Specification Group Radio Access Network; Radio Resource Control (RRC); Protocol Specification (Release 8)," 3GPP TS 25.331 v8.15.0, Jun. 2011.

(56) References Cited

OTHER PUBLICATIONS

Third Generation Partnership Project, "Technical Specification Group Radio Access Network; Radio Resource Control (RRC); Protocol Specification (Release 9)," 3GPP TS 25.331 v9.3.0, Jun. 2010.
Third Generation Partnership Project "Technical Specification Group Radio, Access Network; Radio Resource Control (RRC); Protocol Specification (Release 9)," 3GPP TS 25.331 v9.7.0, Jul. 2011.
Third Generation Partnership Project, "Technical Specification Group Radio Access Network; Radio Resource Control (RRC); Protocol Specification (Release 10)," 3GPP TS 25.331 v10.0.0, Jun. 2010.
Third Generation Partnership Project, "Technical Specification Group Radio Access Network; Radio Resource Control (RRC); Protocol Specification (Release 10)," 3GPP TS 25.331 v10.4.0, Jul. 2011.
Third Generation Partnership Project, "Technical Specification Group Radio Access Network; Spreading and Modulation (FDD) (Release 9)," 3GPP TS 25.213 v9.1.0, Dec. 2009.
Third Generation Partnership Project, "Technical Specification Group Radio Access Network; Spreading and Modulation (FDD) (Release 9)," 3GPP TS 25.213 v9.2.0, Oct. 2010.
Third Generation Partnership Project, "Technical Specification Group Radio Access Network; Spreading and Modulation (FDD) (Release 10)," 3GPP TS 25.213 v10.0.0, Oct. 2010.
Third Generation Partnership Project, "Technical Specification Group Radio Access Network; Requirements for support of radio resource management (FDD) (Release 1999)," 3GPP TS 25.133 V3.22.0 (Sep. 2005).
Third Generation Partnership Project, "Technical Specification Group Radio Access Network; Requirements for support of radio resource management (FDD) (Release 4)," 3GPP TS 25.133 V4.17.0 (Mar. 2006).
Third Generation Partnership Project, "Technical Specification Group Radio Access Network; Requirements for support of radio resource management (FDD) (Release 5)," 3GPP TS 25.133 V5.18.0 (Sep. 2007).
Third Generation Partnership Project, "Technical Specification Group Radio Access Network; Requirements for support of radio resource management (FDD) (Release 6)," 3GPP TS 25.133 V6.24.0 (Mar. 2009).
Third Generation Partnership Project, "Technical Specification Group Radio Access Network; Requirements for support of radio resource management (FDD) (Release 7)," 3GPP TS 25.133 V7.15.0 (Sep. 2009).
Third Generation Partnership Project, "Technical Specification Group Radio Access Network; Requirements for support of radio resource management (FDD) (Release 8)," 3GPP TS 25.133 V8.11.0 (Jun. 2010).
Third Generation Partnership Project, "Technical Specification Group Radio Access Network; Requirements for support of radio resource management (FDD) (Release 8)," 3GPP TS 25.133 V8.14.0 (Jun. 2011).
Third Generation Partnership Project, "Technical Specification Group Radio Access Network; Requirements for support of radio resource management (FDD) (Release 9)," 3GPP TS 25.133 V9.5.0 (Sep. 2010).
Third Generation Partnership Project, "Technical Specification Group Radio Access Network; Requirements for support of radio resource management (FDD) (Release 9)," 3GPP TS 25.133 V9.8.0 (Jun. 2011).
Third Generation Partnership Project, "Technical Specification Group Radio Access Network; Requirements for support of radio resource management (FDD) (Release 10)," 3GPP TS 25.133 V10.2.0 (Jun. 2011).
Ericsson et al., "Channel sounding for closed loop transmit diversity in HSUPA," 3GPP TSG RAN WG1 Meeting #63bis, R1-110486, Dublin, Ireland (Jan. 17-21, 2011).
Ericsson, "DC-HSUPA power scaling," 3GPP TSG RAN WG1 Meeting #57, R1-091894, San Francisco, US (May 4-8, 2009).
Huawei, "Discussion on Power Scaling for DC-HSUPA," 3GPP TSG RAN WG1 Meeting #58, R1-093490, Shenzhen, China (Aug. 24-28, 2009).
Huawei et al., "Overview of Closed Loop Transmit Diversity," 3GPP TSG RAN WG1 Meeting #63, R1-106264, Jacksonville, USA (Nov. 15-19, 2010).
Qualcomm Incorporated, "UE Power Scaling Algorithms When UL CLTD is Configured," 3GPP TSG RAN WG1 Meeting #65, R1-111536, Barcelona, Spain (May 9-13, 2011).

* cited by examiner

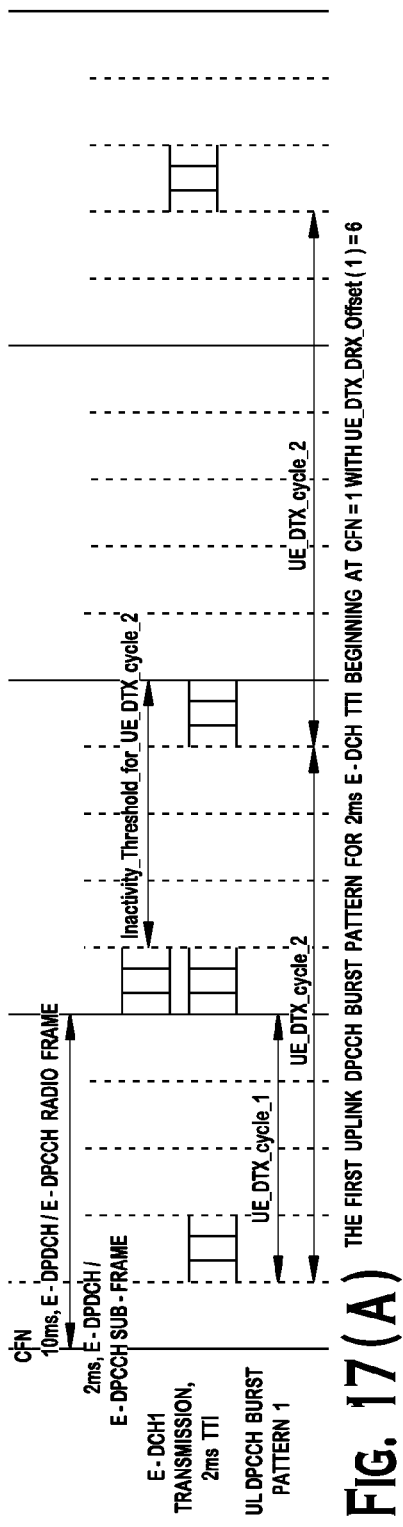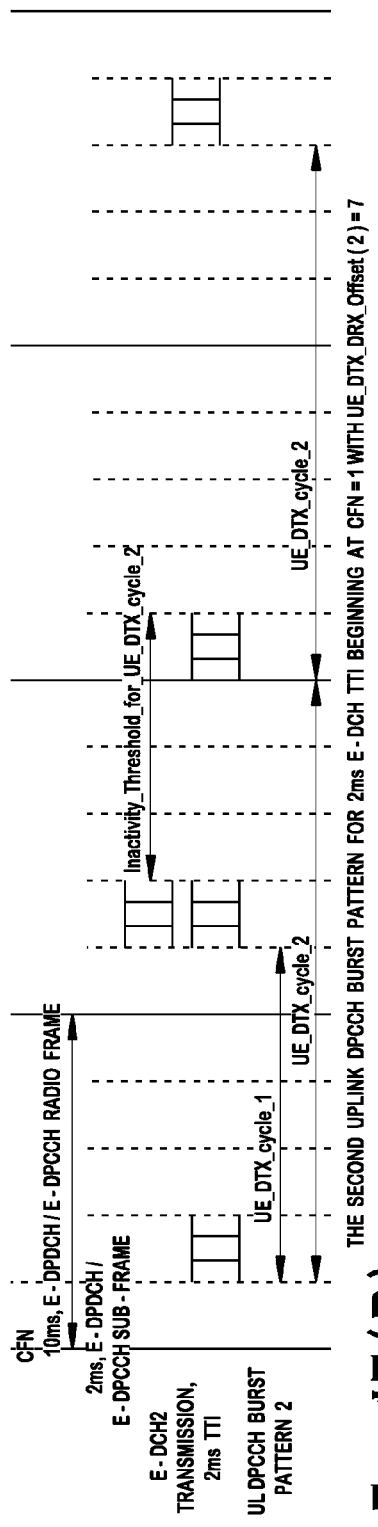
FIG. 17(A) THE FIRST UPLINK DPCCH BURST PATTERN FOR 2ms E-DCH TTI BEGINNING AT CFN=1 WITH UE_DTX_DRX_Offset(1)=6
FIG. 17(B) THE SECOND UPLINK DPCCH BURST PATTERN FOR 2ms E-DCH TTI BEGINNING AT CFN=1 WITH UE_DTX_DRX_Offset(2)=7

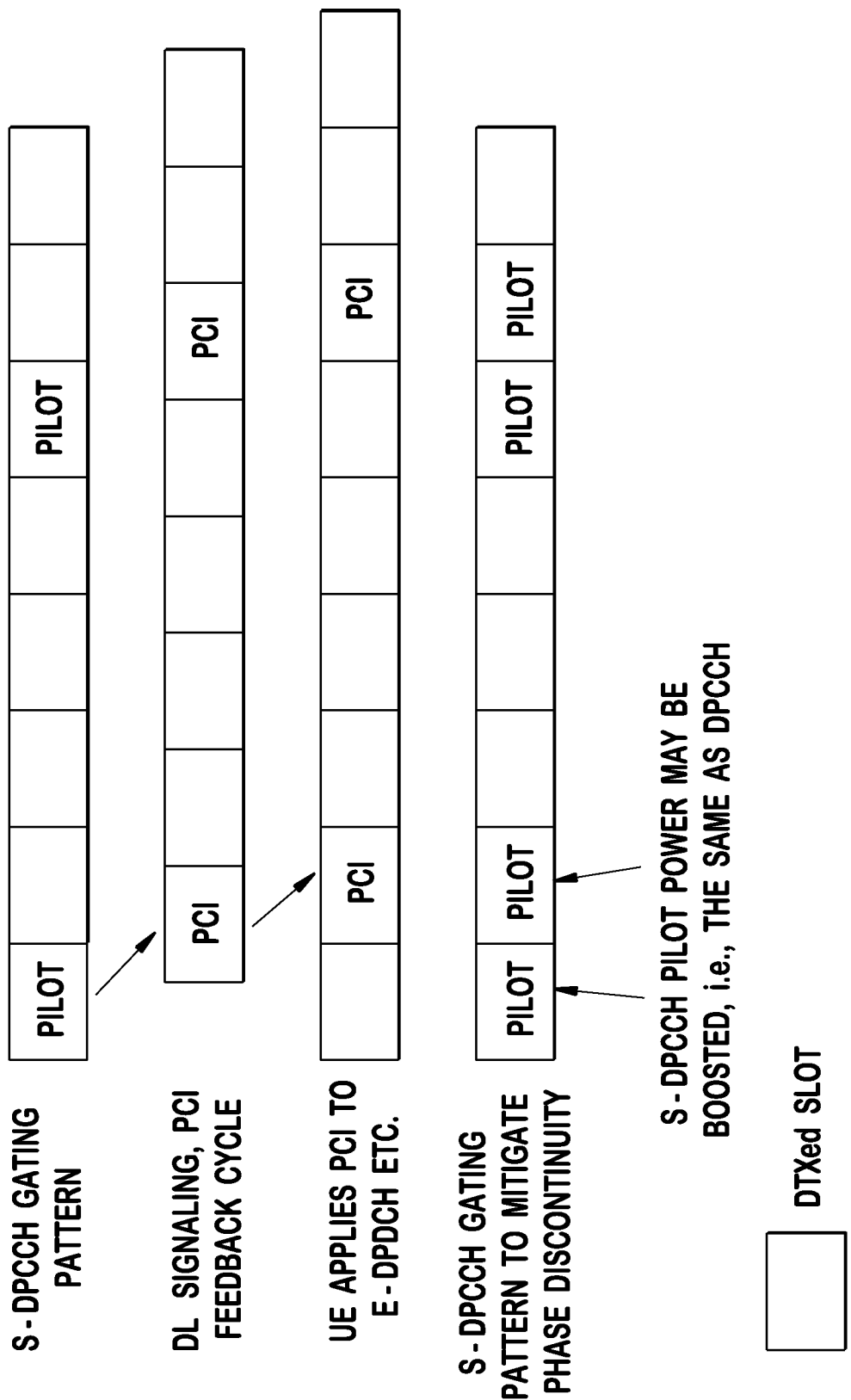

METHOD AND APPARATUS FOR TRANSMITTING PILOT ON MULTIPLE ANTENNAS

CROSS REFERENCE TO RELATED APPLICATIONS

This application claims the benefit of U.S. provisional application Nos. 61/389,112 filed Oct. 1, 2010, 61/410,731 filed Nov. 5, 2010, 61/430,928 filed Jan. 7, 2011, 61/442,064 filed Feb. 11, 2011, 61/480,162 filed Apr. 28, 2011, and 61/523,120 filed Aug. 11, 2011, the contents of which are hereby incorporated by reference herein.

BACKGROUND

Technologies, such as multiple-input multiple-output (MIMO) and transmit diversity, have been developed to enhance the data throughput on the downlink. Data transmission requirements on the downlink are normally larger than those on the uplink. Transmit diversity and MIMO are also considered for the uplink, which would provide extended coverage and enhanced data rate for the uplink such that the peak data rate imbalance between the downlink and the uplink would be reduced.

With the evolution from single antenna transmissions to dual- or multi-antenna transmissions, additional data throughput enhancement would be possible. In order to support the dual- or multi-antenna transmissions in the uplink, it would be required to design a control channel for carrying pilot and other control information on the second transmit antenna.

SUMMARY

Method and apparatus for transmitting pilot on multiple antennas are disclosed. A wireless transmit/receive unit (WTRU) may transmit a primary dedicated physical control channel (DPCCH) and at least one secondary DPCCH via multiple antennas using different channelization codes. The secondary DPCCH may carry only pilot symbols. With spreading factor of 256, the secondary DPCCH may include ten (10) pilot symbols including four (4) frame synchronization word (FSW) symbols and six (6) non-FSM symbols. The first eight pilot symbols of the secondary DPCCH may be same as pilot symbols of length eight of the primary DPCCH. When a compressed mode is configured, the secondary DPCCH may include a same number of pilot bits as the primary DPCCH in a normal mode and in a compressed mode, respectively. The transmit power of the secondary DPCCH may be adjusted based on a ratio of a number of pilot symbols in the primary DPCCH and a number of pilot symbols in the secondary DPCCH. When a required transmit power exceeds a maximum allowed transmit power of the WTRU, power scaling may be applied equally to the primary DPCCH and the secondary DPCCH.

For transmission of an enhanced dedicated channel (E-DCH) dedicated physical data channel (E-DPDCH), a normalized remaining power margin (NRPM) for an E-DCH transport format combination (E-TFC) selection may be performed by taking a secondary DPCCH transmit power into account. The secondary DPCCH transmit power may be determined based on a primary DPCCH power target and a gain factor signaled from a higher layer.

Alternatively, the secondary DPCCH transmit power may be determined based on a primary DPCCH power target, a gain factor signaled from a higher layer, and a secondary DPCCH discontinuous transmission (DTX) cycle, which is defined as a ratio between a number of transmitted secondary DPCCH slot and a number of slots of one radio frame.

BRIEF DESCRIPTION OF THE DRAWINGS

A more detailed understanding may be had from the following description, given by way of example in conjunction with the accompanying drawings wherein:

FIGS. 17(A) and 17(B) show examples of two uplink DPCCH burst patterns with different UE_DTX_DRX_Offset;

FIG. 23 shows an example implementation of the second DPCCH gating pattern to mitigate phase discontinuity.

DETAILED DESCRIPTION

Figure 1A:
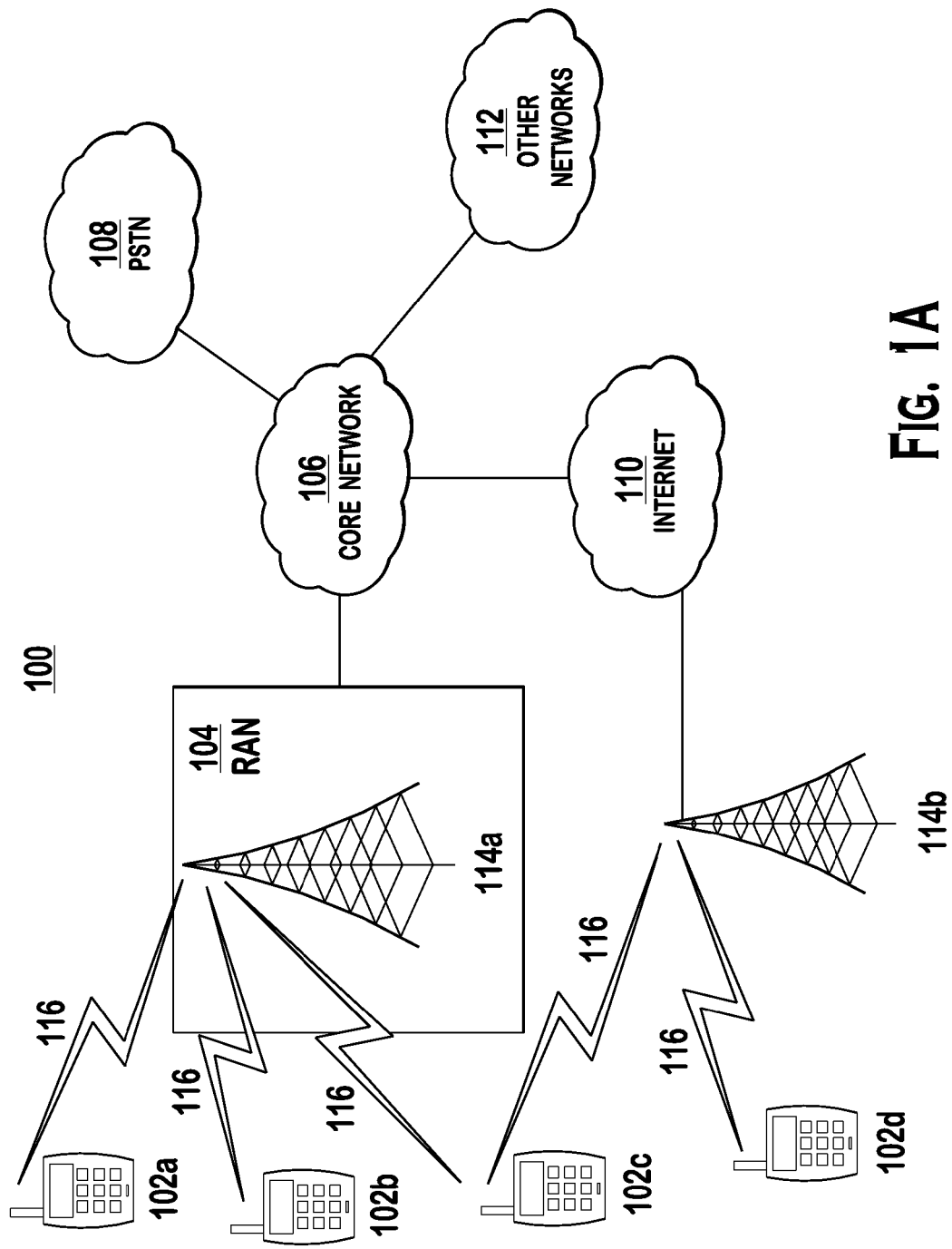
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
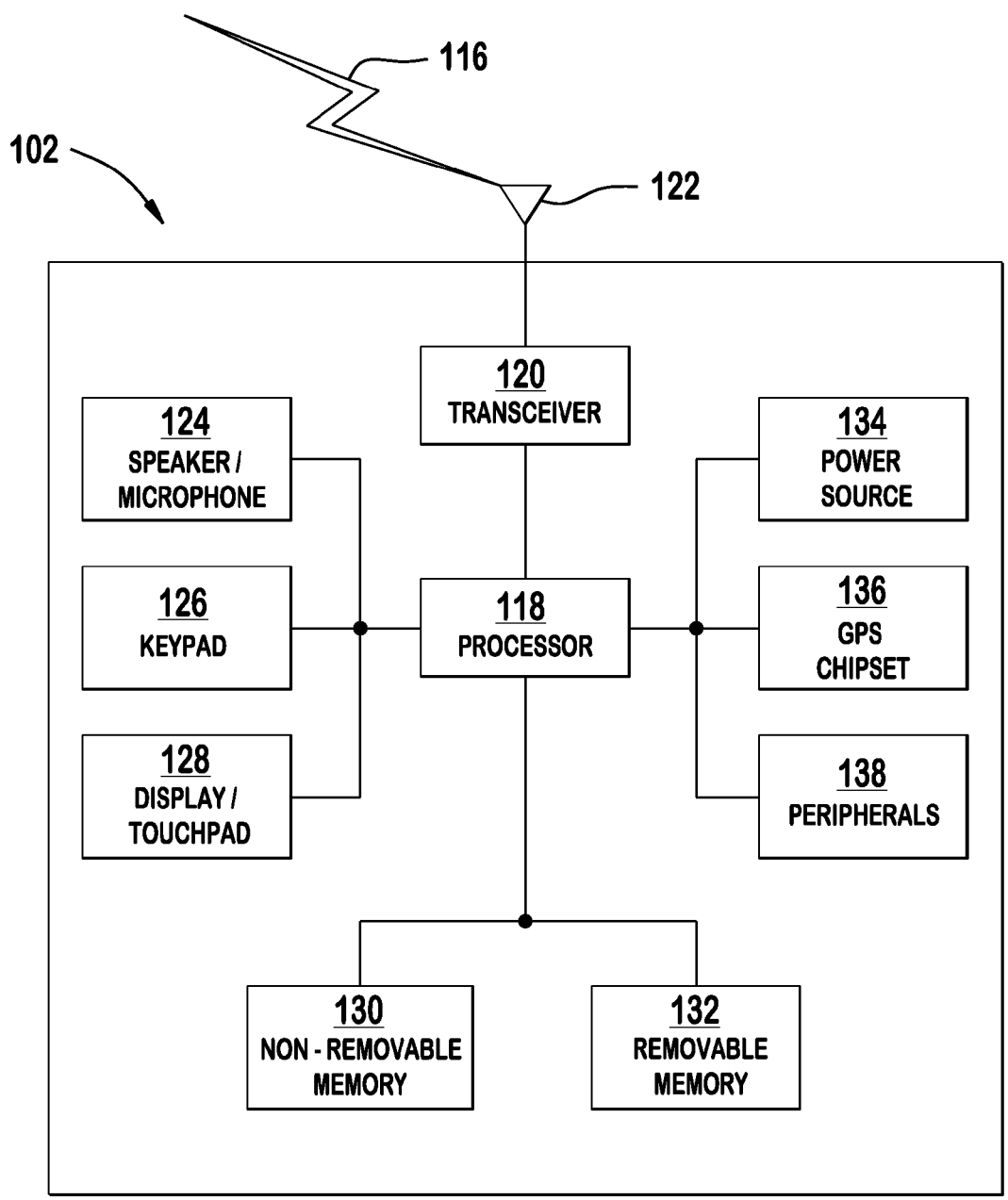
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
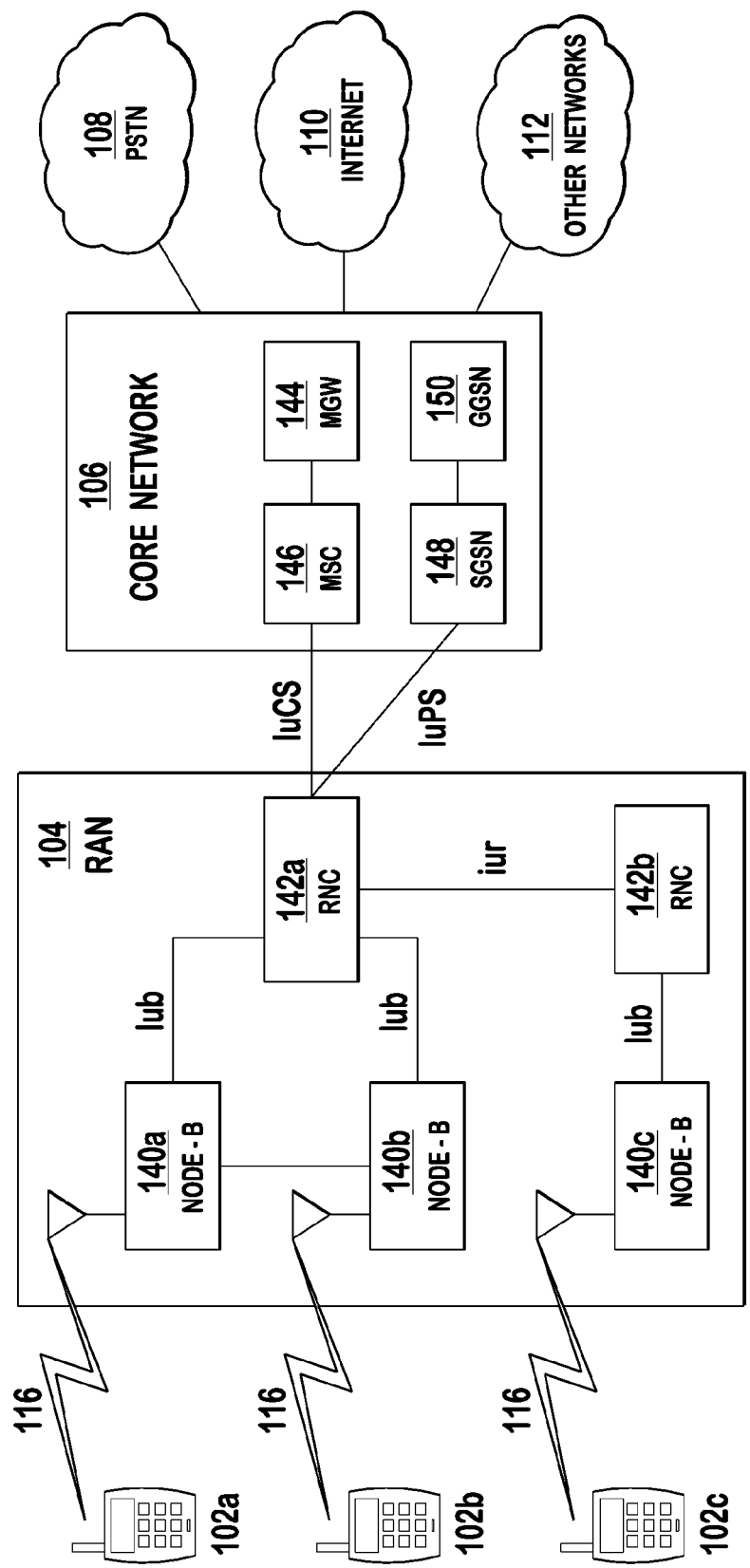
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

The embodiments below will be explained with reference to WCDMA by way of example. It should be noted that the embodiments disclosed below are applicable to any wireless communication systems including, but not limited to, Long Term Evolution (LTE), cdma2000, WiMax, etc. It should also be noted that the embodiments will be explained with reference to uplink dual-stream transmissions with two transmit antennas by way of example, but the embodiments are applicable to more than two streams of transmissions with more than two transmit antennas.

Hereafter, the terms "first pilot" and "primary pilot" will be used interchangeably, and "second pilot" and "secondary pilot" will be used interchangeably. A "pilot sequence" (or pilot signals or pilot symbols) may refer to a control channel carrying a pilot sequence, such as a dedicated physical control channel (DPCCH). A DPCCH is used as an example of the pilot channel. Hereafter, the terms "first DPCCH," "primary DPCCH," and "DPCCH1" will be used interchangeably, and the terms "second DPCCH," "secondary DPCCH," "S-DPCCH," and "DPCCH2" will be used interchangeably.

Figure 2:
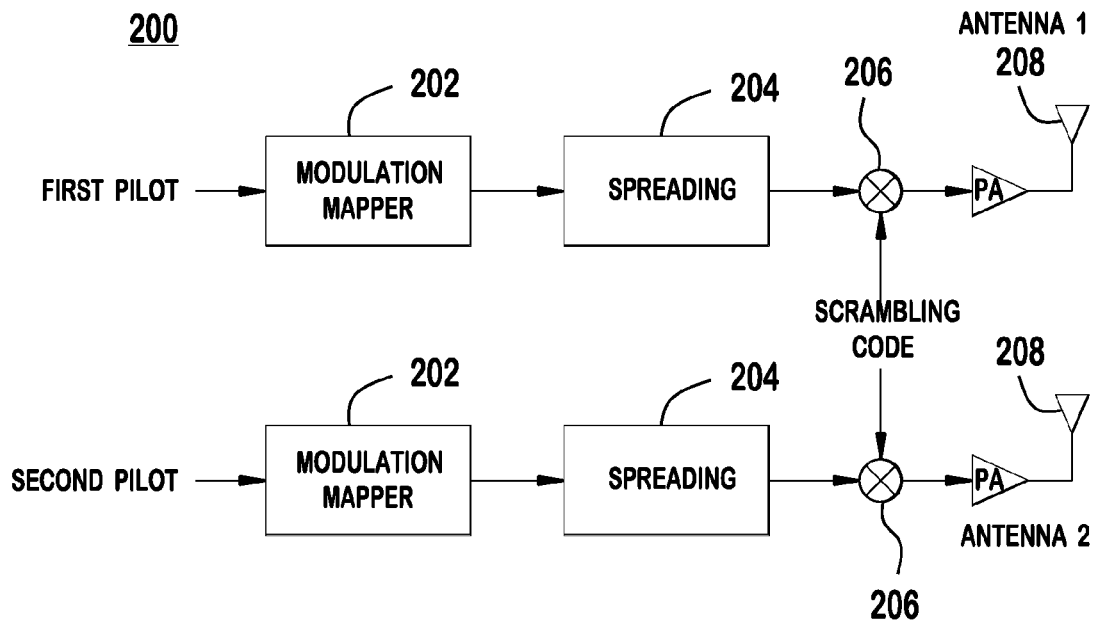
FIG. 2 shows an example of a WTRU sending two pilot sequences via two antennas without pre-coding.
Figure 16:
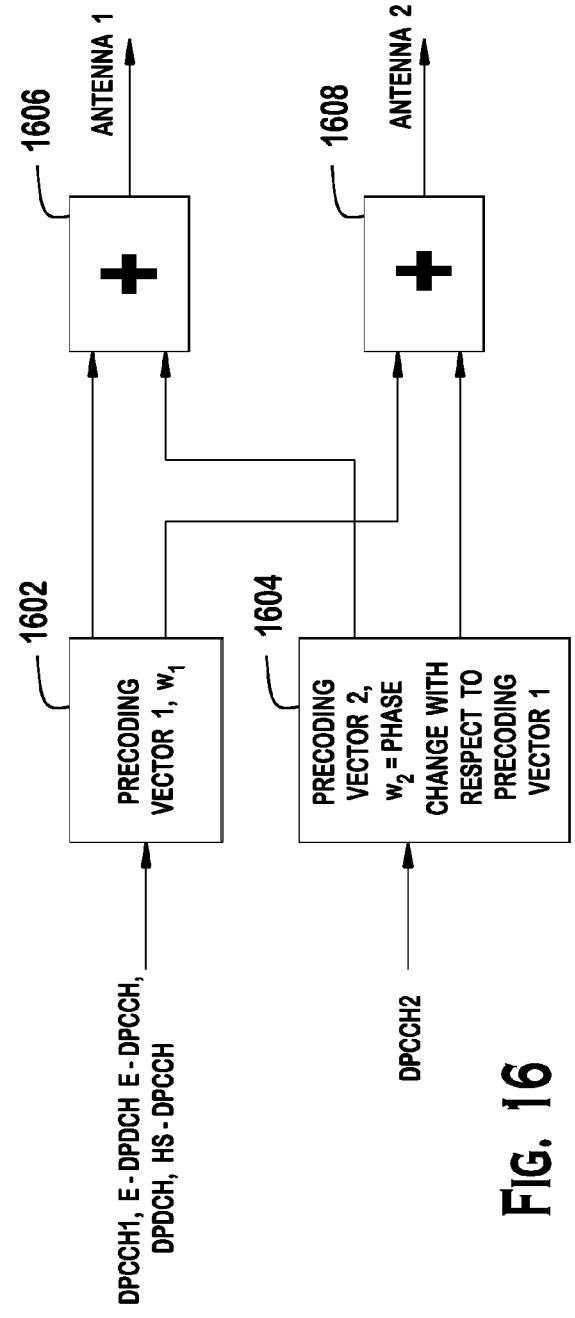
FIG. 16 shows an example non-codebook based closed-loop transmit beamforming scheme.

A WTRU may transmit two (or more) pilot sequences, (i.e., sounding channels or reference signals), via two (or more) antennas. The pilot sequences may or may not be orthogonal. The first and second pilot sequences may be transmitted on different antennas, or pre-coded and transmitted via two antennas on different beams. FIG. 2 shows an example of a WTRU 200 sending two pilot sequences via two antennas 208 without pre-coding. The first and second pilot sequences are modulated by modulation mappers 202, spread by spreading blocks 204, and multiplied with a scrambling code by a scrambling block 206, and transmitted via two antennas 208, respectively. The pilot sequences, (e.g., DPCCH1 and DPCCH2), may be precoded as shown in FIG. 16, as an example. In FIG. 16, the first DPCCH and other uplink channels (e.g., E-DPDCH, E-DPCCH, DPDCH, and HS-DPCCH) are precoded with a vector 1 by a precoding block 1602, and the second DPCCH is precoded with a vector 2 by a precoding block 1604, which has a phase change with respect to precoding vector 1 applied on the first DPCCH and other uplink channels.

When a WTRU is operating in closed loop transmit diversity (CLTD) with a single stream or dual streams (i.e., UL MIMO), the receiver, (e.g., the NodeB), may estimate the spatial channel with the pilot sequences to demodulate or detect the data coherently and to determine the best uplink pre-coding weights to be used at the WTRU for the next transmission to the NodeB.

The WTRU may transmit the second pilot, (e.g., a secondary DPCCH), in at least one of the following cases: (1) when there is data being transmitted (e.g., on an enhanced dedicated channel (E-DCH)), (2) when there are two data streams being transmitted, (3) periodically, (4) during compressed mode gaps, (4) with the first pilot, (5) with the first pilot when there are two data streams, (6) with the first pilot when there is data being transmitted, (7) with the first pilot when there is no data being transmitted, or (8) periodically in place of the first pilot, (e.g., once every N-th transmission opportunity, alternatively once every N-th slot, TTI, or the like). In order to reduce the overhead, the secondary pilot may be discontinuously transmitted and/or transmitted at a lower power compared to the primary pilot.

Figure 3:
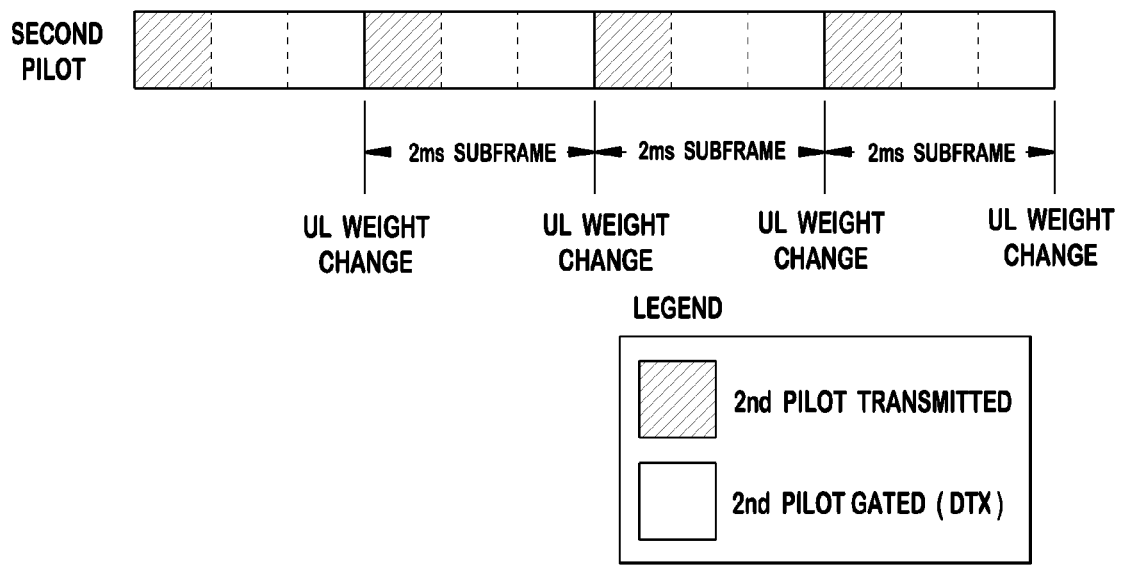
FIG. 3 shows an example where a WTRU transmits the second pilot sequence two slots before the subframe boundary.

In case where the pilot sequences are pre-coded, the second pilot sequence transmitted on a second beam may be considered an overhead from the data modulation point of view. In order to reduce the overhead, the WTRU may transmit the second pilot sequence periodically for a fraction of the time. The duty cycle for the second pilot sequence may be configured by the NodeB or any other network entity. The change of the pre-coding weight may be aligned with an uplink E-DCH subframe (e.g., 2 ms or 10 ms transmission time interval (TTI)). To account for the delay in transmission and NodeB processing, the second pilot may be transmitted prior to the subframe boundary. FIG. 3 shows an example where a WTRU transmits the second pilot sequence (during shaded slots) two slots before the subframe boundary. This allows one slot delay for the NodeB processing and another slot for transmitting the new pre-coding weight information to the WTRU (assuming a one slot physical layer message).

The second pilot may be transmitted at a lower rate, (e.g., every N slots, subframes, or frames, etc.), and may be transmitted in groups of multiple consecutive slots or bursts. The operation parameters for the second pilot, (such as power offset, timing delay, rate and burst size, etc.), may be configured by the network via RRC signalling or some of these parameters, (e.g., timing, burst size, etc.), may be configured in the specifications.

Alternatively, in order to reduce the second DPCCH overhead, the DTX operations of DPCCHs may be controlled on a per-DPCCH basis. Two UL DTX state variables, UL_DTX_Active(1) and UL_DTX_Active(2), may be defined and individually maintained and evaluated for the first and second DPCCHs. The WTRU may control the transmission of the first and second DPCCHs on a per-DPCCH basis.

In one example, UL_DTX_Active(1) may be set to "False" and UL_DTX_Active(2) may be set to "True" so that the second DPCCH is periodically DTXed while the first DPCCH and other channels on the first stream or antenna may be continuously transmitted.

In another example, both UL_DTX_Active(1) and UL_DTX_Active(2) are set to "True", but different DPCCH burst patterns may be configured for the first and second DPCCHs to discontinuously transmit the second DPCCH while allowing the first DPCCH transmission.

An S-DPCCH-specific DTX pattern or cycle may be defined for the S-DPCCH in combination with the semi-static WTRU antenna configuration. For example, the S-DPCCH-specific DTX pattern or cycle may be linked to the WTRU antenna configuration status. The WTRU may be configured to operate with more than one S-DPCCH-specific DTX pattern or cycle for the S-DPCCH, and the activation status of at least one S-DPCCH-specific DTX pattern or cycle may be linked to the antenna configuration status of the WTRU, (e.g., whether the WTRU is operating in UL CLTD or not, or if the WTRU is configured to operate with the uplink channel transmitted on one of the two antennas, with the S-DPCCH transmitted on the other antenna). Table 1 shows example WTRU antenna configuration. Some of the configurations may not be supported. The WTRU may be configured to use one of the other configuration via an HS-SCCH order or RRC signalling.

TABLE 1

| Config. # | Name | Conventional channels (DPCCH, E-DPCCH, E-DPDCH, DPDCH, HS-DPCCH) | S-DPCCH |
|---|---|---|---|
| 1 | Normal UL CLTD operations | Primary precoding vector | Secondary precoding vector |
| 2 | Switched antenna mode | Physical Antenna 1 | Physical Antenna 2 |
| 3 |  | Physical Antenna 2 | Physical Antenna 1 |
| 4 | No Tx diversity antenna 1 | Physical Antenna 1 | De-activated |
| 5 | No Tx diversity antenna 2 | Physical Antenna 2 | De-activated |

In one implementation, the WTRU may be configured with two S-DPCCH-specific DTX patterns or cycles for the S-DPCCH. The WTRU may be configured with these S-DPCCH-specific DTX pattern or cycle parameters, for example, via RRC signalling. One or more of these parameters may be fixed in the specifications.

Figure 4:
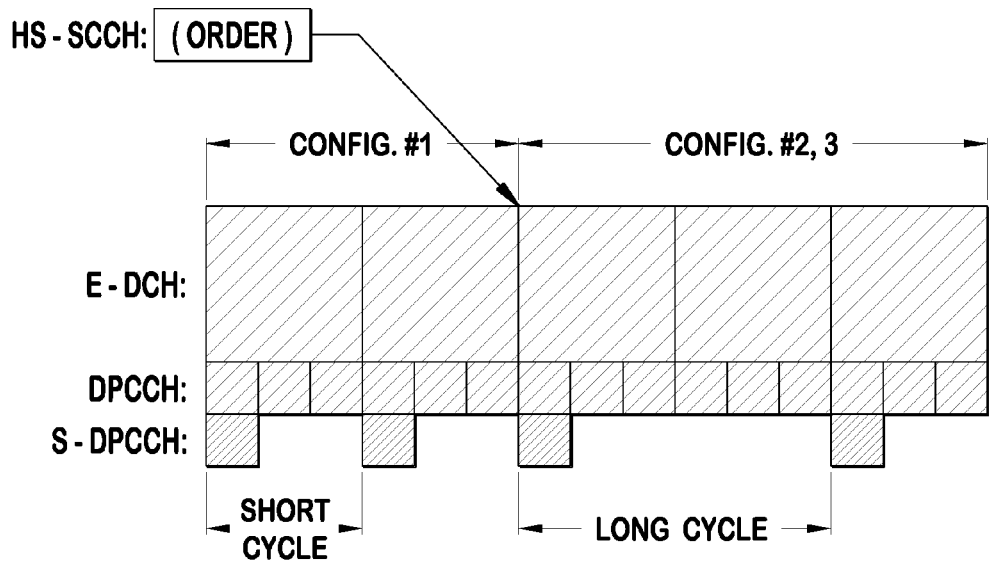
FIG. 4 shows an example implementation of second DPCCH-specific DTX patterns or cycles.

The WTRU applies the first (short) S-DPCCH-specific DTX pattern or cycle when it is configured to operate in a normal UL CLTD mode (i.e., configuration #1 in Table 1). The WTRU may be configured to apply this S-DPCCH-specific DTX pattern regardless of the conventional DPCCH DTX activation status. The WTRU may then apply the second (long) S-DPCCH-specific DTX pattern or cycle when it is configured to operate in a "switch antenna" mode with the S-DPCCH sent on the diversity antenna (e.g., configuration #2 and configuration #3 in Table 1). FIG. 4 shows an example implementation of S-DPCCH-specific DTX pattern or cycle. In FIG. 4, the WTRU is configured to configuration #1 (i.e., operating in UL CLTD mode) and then configured via an HS-SCCH order to configuration #2 or #3.

Figure 5:
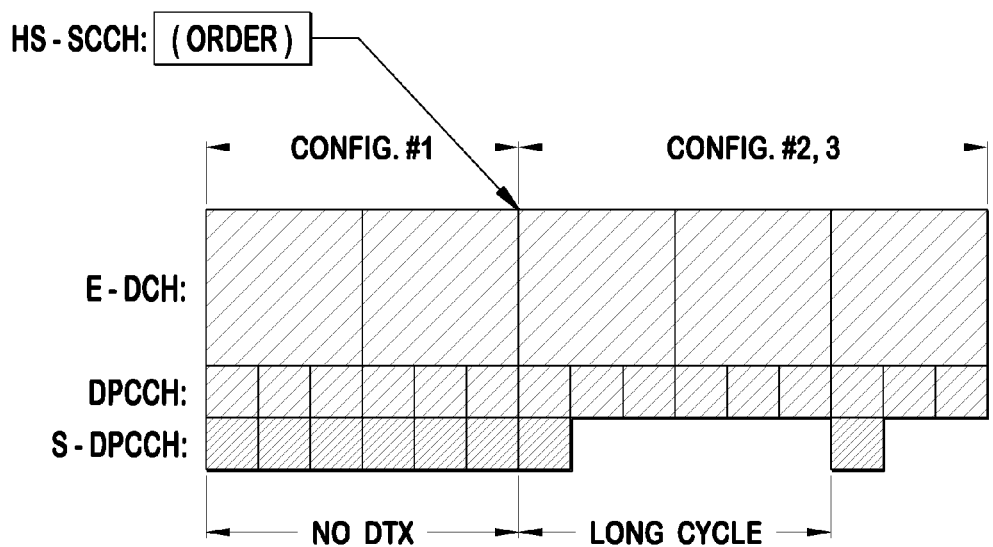
FIG. 5 shows an example implementation of a single second DPCCH-specific DTX pattern or cycle.

In another implementation, the WTRU may be configured with a single (long) S-DPCCH-specific DTX pattern or cycle for the S-DPCCH. The WTRU may apply the (long) DTX pattern when it is configured to a switch antenna mode (i.e., configurations #2 and #3). When the WTRU is not configured to a switched antenna mode, no S-DPCCH-specific DTX pattern or cycle may be applied. FIG. 5 shows an example implementation of a single S-DPCCH-specific DTX pattern or cycle. In FIG. 5, the WTRU is configured to configuration #1 (operating in UL CLTD mode) and then configured via an HS-SCCH order to configuration #2 or #3.

In both of the implementations above, the WTRU may be configured with an infinitely long DTX cycle, which would in effect be equivalent to de-activating the S-DPCCH altogether. Thus, configurations #4 and #5 in Table 1 may become identical as configurations #2 and #3 with an infinite DTX cycle.

An additional DTX, for example, linked to the conventional DPCCH CPC DTX mechanism may be applied on top of the S-DPCCH-specific DTX. For example, the WTRU may be configured to transmit the S-DPCCH when the primary DPCCH is also transmitted.

The S-DPCCH-specific DTX pattern may be dynamically activated and deactivated via an HS-SCCH order or other signaling. The activation status of the S-DPCCH-specific DTX pattern or cycle may be linked to the conventional DPCCH DTX activation status. The S-DPCCH-specific DTX pattern or cycle may be activated/deactivated whenever the conventional DPCCH DTX is activated/deactivated.

Figure 6:
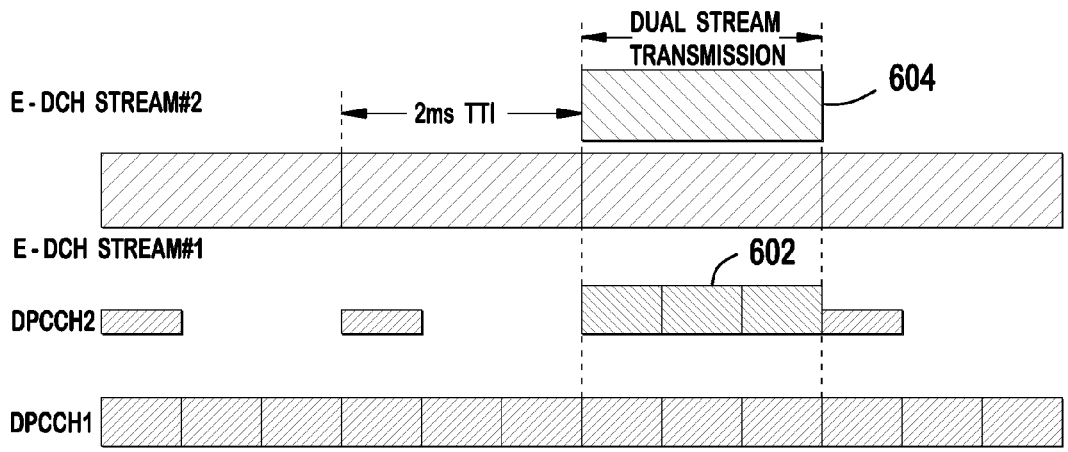
FIG. 6 shows an example transmissions of two E-DCH streams and two DPCCHs with different power setting while the second E-DCH is transmitted.

In dual-stream operations, the NodeB may use the second pilot to demodulate the data on the second stream. This may require better channel estimates. In one embodiment, the WTRU may transmit the second pilot continuously when the second stream is transmitted, at a different (e.g., higher) power setting. FIG. 6 shows an example transmission of two E-DCH streams and two DPCCHs with different power setting while the second E-DCH is transmitted. In FIG. 6, the second DPCCH is transmitted at a higher power level (602) when the second E-DCH stream (604) is transmitted.

The WTRU may transmit the second pilot at a higher power level relative to the normal periodic power level before the start of the subframe carrying the data on the second stream. The WTRU may transmit the second pilot at a higher power level after the subframe carrying the data on the second stream is completed. This may allow the NodeB to further improve its channel estimate for data demodulation.

The WTRU may transmit the second pilot at a higher power level when the NodeB configures the WTRU to the dual stream mode. This allows the NodeB to further improve its channel estimate for channel coding. This may be achieved by having the WTRU transmit the second pilot at a higher power after receiving an indication by the network. Alternatively, the WTRU may transmit the second pilot at a higher power level periodically.

The WTRU may transmit the second pilot at a higher power level if the second pilot is sent on a channel which has control data, (e.g., a DPCCH). If the dual stream operation allows for independent E-DCH transport format combination (E-TFC) selection to be made on each of the streams, independent control data and independent pilot may be transmitted for each stream. In one embodiment, the WTRU may transmit two independent DPCCHs (first and second DPCCHs). Alternatively, the WTRU may send control data for both streams on one DPCCH and an independent pilot sequence on the other DPCCH.

Alternatively, the WTRU may transmit a separate sounding channel for UL channel rank estimation and/or precoding weights estimation. The sounding channel may provide a known signal or a set of signals to the NodeB from which it may estimate the channel rank and optimal precoding. The WTRU may not transmit the sounding channel when dual streams are transmitted. The sounding channel may be periodically transmitted when dual streams are not transmitted. Alternatively, the sounding channel may be periodically transmitted regardless of the dual stream transmissions. The sounding channel may be transmitted based on a trigger event that may be provided by the NodeB.

The sounding channel may include a configurable set of transmissions that may provide channel and scheduling information to the NodeB. The transmission on the sounding channel may be transmitted using the available channel precoding either sequentially or in parallel or in some predetermined combination. For example, the sounding channel may transmit its predefined signals in sequence using each of the available precoding configurations (or a defined subset of precoding configurations) for a subframe. The NodeB may then estimate the channel performance for that WTRU in each of the precoding configuration. If the sounding channel does not contain any control information, the sounding channel may be transmitted at a lower power level than that of the DPCCH which contains control information. Alternatively, the sounding channel may be transmitted from each of the available antennas in sequence, for the case where precoding is not applied to the sounding channel.

Embodiments for power control upon weight change are disclosed hereafter. When the WTRU changes its precoding weight, it may impact the NodeB receive power and signal-to-interference ratio (SIR) for that WTRU. If the channel does not change significantly between the time the NodeB estimates the channel, determines the best precoding weight, signals the information to the WTRU, and the WTRU applies the new weight, the change in receive power at the NodeB would be positive. That is, after a change of the pre-coding weight, the SIR with respect to the WTRU would be improved at the NodeB, and the SIR would be higher than the target SIR at the NodeB, thus creating an excess noise rise and forcing the NodeB to issue a transmit power control (TPC) down command to the WTRU. To avoid such noise rise overshoots and power control instability, the WTRU may adjust its transmission power when pre-coding weights are changed, potentially depending on the TPC command received by all NodeBs in its active set.

In one embodiment, the WTRU may be configured by the network to reduce the first DPCCH transmission power by a configured amount, (e.g., 1 dB), when pre-coding weights are changed. The WTRU may reduce (or alternatively hold) the DPCCH power in the slot where the new pre-coding weights are applied. By reducing the DPCCH power, since it is used as a power reference for other physical channels, the entire WTRU transmit power would be reduced.

In another embodiment, the WTRU may override the TPC command. The WTRU may disregard the TPC command for the slot where a change of precoding weight occurs and apply a TPC "Down" command. Alternatively, the WTRU may hold the power of the DPCCH by overriding the TPC command.

In another embodiment, the WTRU may override the TPC command received from the radio link set (RLS) containing the serving NodeB to a "Down" command. This would force the WTRU to power down by $\Delta_{TPC}$, which is determined by the power control procedure. Alternatively, for such cases a different value of $\Delta_{TPC}$ than the one used for normal power control may be configured for the WTRU.

In another embodiment, the WTRU may reduce or hold the power of the DPCCH in the slots where a pre-coding weights change occurs if the TPC command issued by the RLS including the serving NodeB was "Up," regardless of the TPC commands from other RLS.

In another embodiment, the WTRU may receive a specific power control command as part of the command with the precoding weights change. This may allow the NodeB to estimate the correct power level for the transmissions from the WTRU using the new precoding weights and allow the TPC command to either be ignored for the first transmission or allow the TPC procedure to operate as normal allowing for the TPC command to be compensated for in the specific power control command.

Embodiments for transmission of pilot and non-pilot fields are explained hereafter. The slot format of the second DPCCH may or may not be the same as the first DPCCH. With the same DPCCH slot format for both DPCCHs, the NodeB may use the same channel estimation block and may expect similar quality of channel estimates for both DPCCHs.

Alternatively, a different DPCCH slot format may be defined for the second DPCCH. For example, since the WTRU may need to transmit a single TPC command on the uplink DPCCH, a new slot format for the second DPCCH may not have a TPC field. Alternatively, a new slot format for the second DPCCH may contain only pilot bits.

The WTRU may be configured with different DPCCH slot formats for the second DPCCH, and the slot format may be signalled by the network. Table 2 shows example slot formats for the second DPCCH. In Table 2, the slot formats 4*~8 are newly added to the conventional DPCCH slot formats. The $N_{DTX}$ column indicates the number of DTX bits in the slot format. The DTX bits may not be consecutive at the end of the slot, and some or all of those DTX bits may appear at the beginning or any place of the slot, depending on the configuration.

TABLE 2

| Slot Format #i | Channel Bit Rate (kbps) | Channel Symbol Rate (ksps) | SF | Bits/ Frame | Bits/ Slot | $N_{pilot}$ | $N_{TPC}$ | $N_{TFCI}$ | $N_{FBI}$ | $N_{DTX}$ | Transmitted slots per radio frame |
|---|---|---|---|---|---|---|---|---|---|---|---|
| 0 | 15 | 15 | 256 | 150 | 10 | 6 | 2 | 2 | 0 | 0 | 15 |
| 0A | 15 | 15 | 256 | 150 | 10 | 5 | 2 | 3 | 0 | 0 | 10-14 |
| 0B | 15 | 15 | 256 | 150 | 10 | 4 | 2 | 4 | 0 | 0 | 8-9 |
| 1 | 15 | 15 | 256 | 150 | 10 | 8 | 2 | 0 | 0 | 0 | 8-15 |
| 2 | 15 | 15 | 256 | 150 | 10 | 5 | 2 | 2 | 1 | 0 | 15 |
| 2A | 15 | 15 | 256 | 150 | 10 | 4 | 2 | 3 | 1 | 0 | 10-14 |
| 2B | 15 | 15 | 256 | 150 | 10 | 3 | 2 | 4 | 1 | 0 | 8-9 |
| 3 | 15 | 15 | 256 | 150 | 10 | 7 | 2 | 0 | 1 | 0 | 8-15 |
| 4 | 15 | 15 | 256 | 150 | 10 | 6 | 4 | 0 | 0 | 0 | 8-15 |
| 4* | 15 | 15 | 256 | 150 | 10 | 6 | 0 | 0 | 0 | 4 | 8-15 |
| 5 | 15 | 15 | 256 | 150 | 10 | 7 | 0 | 0 | 0 | 3 | 8-15 |
| 6 | 15 | 15 | 256 | 150 | 10 | 8 | 0 | 0 | 0 | 2 | 8-15 |
| 7 | 15 | 15 | 256 | 150 | 10 | 9 | 0 | 0 | 0 | 1 | 8-15 |
| 8 | 15 | 15 | 256 | 150 | 10 | 10 | 0 | 0 | 0 | 0 | 8-15 |

In another embodiment, the WTRU may be configured with a single DPCCH slot format for both first and second DPCCHs, and the WTRU may apply DTX to the bits in the fields that do not need to be transmitted on the second DPCCH (i.e., "non-applicable fields"). The set of non-applicable fields may be pre-defined in the specifications, which may include, for example, the TPC field. Alternatively, the set of non-applicable fields may be defined by higher level signalling when the second DPCCH is configured.

In another embodiment, the WTRU may transmit non-pilot field information on the second DPCCH, (such as TPC, transport formation combination indicator (TFCI), or feedback information (FBI)).

Embodiments for transmitting the non-pilot field(s) such as TPC command in a DPCCH transmitted on the second antenna or beam in operations with a single power control loop are disclosed hereafter.

Figure 7:
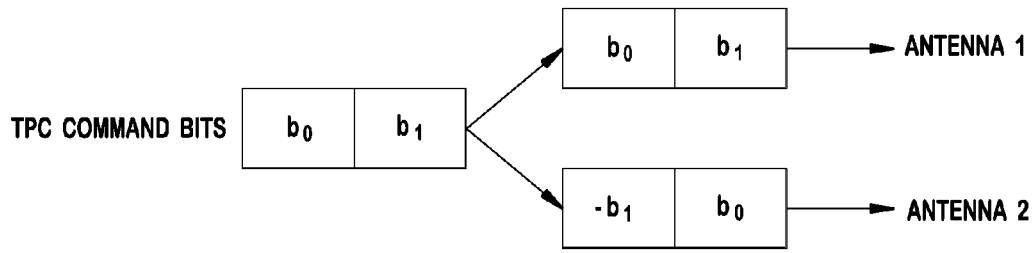
FIG. 7 shows example space time transmit diversity (STTD) encoding of the transmit power control (TPC) command bits.

In one embodiment, the bits in the non-pilot field such as TPC command bits may be transmitted in a space time transmit diversity (STTD) fashion. FIG. 7 shows example STTD encoding of the TPC command bits. Two (or more than two) TPC command bits are STTD encoded and transmitted via two antennas (or beams). When the number of non-pilot bits is odd, the WTRU may encode one of the pilot bits for STTD encoding.

Figure 8:
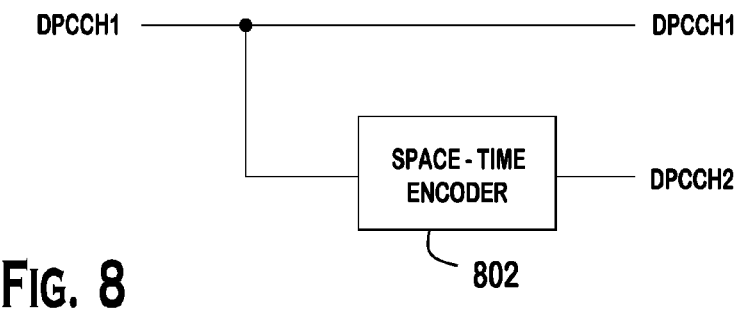
FIG. 8 shows an alternative for the DPCCH space-time encoding.

Alternatively, the WTRU may derive the entire bit sequence of the second DPCCH by applying a space-time encoder to the first DPCCH sequence. FIG. 8 shows an alternative for the DPCCH space-time encoding. The bit sequence for DPCCH1 is processed by a space-time encoder 802 to generate a bit sequence for DPCCH2, (i.e., secondary DPCCH (S-DPCCH)). The output of the space-time encoder mapped to the second DPCCH may be orthogonal to the bit sequence for the first DPCCH.

For example, Alamouti STTD encoder may be used for generating orthogonal DPCCH2 sequence. This can be done on pair of bits over the entire slot. For the ten (10) symbols DPCCH slot, this may be realized by using the bit mapping as shown in Table 3, where the "−" sign operator reverses the associated bit value.

TABLE 3

| DPCCH1 | $b_0$ | $b_1$ | $b_2$ | $b_3$ | $b_4$ | $b_5$ | $b_6$ | $b_7$ | $b_8$ | $B_9$ |
|---|---|---|---|---|---|---|---|---|---|---|
| DPCCH2 | $-b_1$ | $b_0$ | $-b_3$ | $b_2$ | $-b_5$ | $b_4$ | $-b_7$ | $b_6$ | $-b_9$ | $B_8$ |

Alternatively, the space-time mapping may be applied to a subset of the fields of the first DPCCH.

Figure 9:
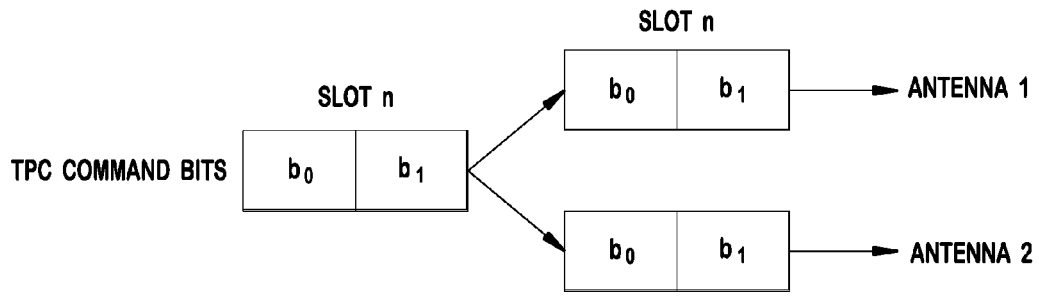
FIG. 9 shows an example repetition transmission of TPC command bits.

In another embodiment, the non-pilot field such as TPC field may be repeatedly transmitted over two antennas/beams. The same bits are transmitted with equal power from the two antennas/beams. FIG. 9 shows an example repetition transmission of TPC command bits.

Figure 10:
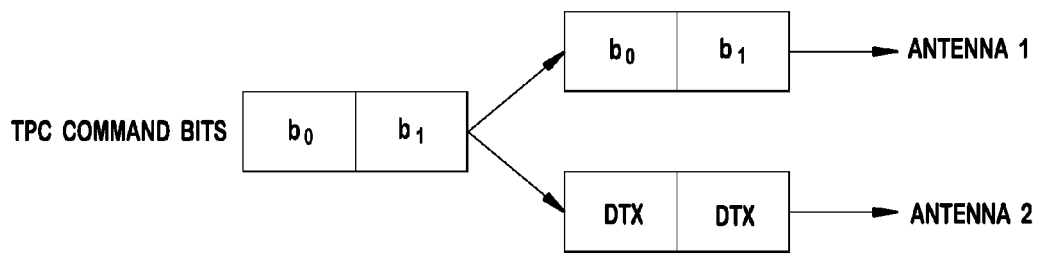
FIG. 10 shows a DTX of TPC field bits on the second antenna.

In another embodiment, the non-pilot field such as TPC filed may be DTXed on the second DPCCH, as shown in FIG. 10. FIG. 10 shows a DTX of TPC field bits on the second antenna.

When configured, the TPC field in the DPCCH slot format (see Table 2) may be of size 2 or 4 bits. Since the TPC field carries the information for a single TPC command (i.e., 1 bit), a specific TPC bit pattern is currently specified for each transmit power control command as shown in Table 4

TABLE 4

| TPC Bit Pattern | | | | | | |
|---|---|---|---|---|---|---|
| $N_{TPC}=2$ | | $N_{TPC}=4$ | | | | Transmitter power |
| $B_0$ | $b_1$ | $b_0$ | $b_1$ | $b_2$ | $b_3$ | control command |
| 1 | 1 | 1 | 1 | 1 | 1 | 1 |
| 0 | 0 | 0 | 0 | 0 | 0 | 0 |

In one embodiment, the TPC bit pattern used for carrying the TPC command on the second DPCCH may be modified to improve detection and channel estimation reliability at the NodeB (e.g., by using the TPC field as extra pilot bits in decision-directed mode). The TPC bit pattern for the second DPCCH may be orthogonal to the TPC bit pattern for the first DPCCH. This may be achieved, for example, by reversing half of the TPC bits in the bit patterns. Tables 5-7 show examples of the TPC bit pattern for the second DPCCH.

TABLE 5

| TPC Bit Pattern | | | | | | |
|---|---|---|---|---|---|---|
| $N_{TPC}=2$ | | $N_{TPC}=4$ | | | | Transmitter power |
| $b_0$ | $b_1$ | $b_0$ | $b_1$ | $b_2$ | $b_3$ | control command |
| 1 | 0 | 1 | 0 | 1 | 0 | 1 |
| 0 | 1 | 0 | 1 | 0 | 1 | 0 |

TABLE 6

| TPC Bit Pattern | | | | | | |
|---|---|---|---|---|---|---|
| $N_{TPC}=2$ | | $N_{TPC}=4$ | | | | Transmitter power |
| $b_0$ | $b_1$ | $b_0$ | $b_1$ | $b_2$ | $b_3$ | control command |
| 1 | 0 | 1 | 1 | 0 | 0 | 1 |
| 0 | 1 | 0 | 0 | 1 | 1 | 0 |

TABLE 7

| TPC Bit Pattern | | | | | | |
|---|---|---|---|---|---|---|
| $N_{TPC}=2$ | | $N_{TPC}=4$ | | | | Transmitter power |
| $b_0$ | $b_1$ | $b_0$ | $b_1$ | $b_2$ | $b_3$ | control command |
| 0 | 1 | 0 | 1 | 0 | 1 | 1 |
| 1 | 0 | 1 | 0 | 1 | 0 | 0 |

After calculating the value of the upcoming TPC command, the WTRU may apply the conventional TPC bit pattern (as shown in Table 4) to the TPC field of the first DPCCH and apply the corresponding (e.g., orthogonal) TPC bit pattern (e.g., as shown in Tables 5-7) to the TPC field of the second DPCCH.

The S-DPCCH may carry 8 pilot bits each slot and the rest 2 bits may be used for control information signalling. That is, each S-DPCCH slot may contain 8-bit pilot field and 2-bit non-pilot field before spreading operation. In order to have a reliable transmission of the 2-bit non-pilot field of the S-DPCCH, the 2-bit non-pilot field may be precoded using the precoding weight vector applied on the DPCCH while the 8-bit pilot field may be precoded using the precoding weight vector orthogonal to the one applied on the DPCCH.

Defined that the primary precoding weight vector to be applied on the DPCCH is $w_1$, the DPCCH gain factor is $\beta_c$, and the associated secondary precoding weight vector orthogonal to $w_1$ is $w_2$. The non-pilot field of the S-DPCCH may be precoded with $w_1$ and the gain factor of the non-pilot field of the S-DPCCH may be set to $\beta_c$, and the pilot field of the S-DPCCH may be precoded with $w_2$ and the gain factor of the pilot field of the S-DPCCH may be set to $\gamma\beta_c$. Alternatively, the non-pilot field of the S-DPCCH may be precoded with $w_1$ and the gain factor of the non-pilot field of the S-DPCCH may be set to $\gamma\beta_c$, and the pilot field of the S-DPCCH may be precoded with $w_2$ and the gain factor of the pilot field of the S-DPCCH may be set to $\gamma\beta_c$.

An uplink DPCCH power control preamble is used for initialization of data transmission on a radio link. The length of the power control preamble $N_{pcp}$ is signalled by a higher layer. For WTRUs with two transmit antennas, when $N_{pcp} > 0$, the uplink DPCCH power control preamble may be transmitted in any of the following ways.

In one embodiment, the uplink DPCCH power control preamble may be transmitted on both antennas, one DPCCH on each antenna. Without loss of generality the first DPCCH may be transmitted on antenna 1 using the legacy pilot bit pattern, and the second DPCCH may be transmitted on antenna 2 using the pilot bit pattern, that may be orthogonal to the one used in the first DPCCH, as disclosed above. The transport format combination index (TFCI) field on both DPCCHs, if present, may be filled with "0" bits. Other non-pilot fields, such as FBI and TPC bits may be transmitted using embodiments as disclosed above.

In another embodiment, the first DPCCH power control preamble may be transmitted but the second DPCCH power control preamble may be DTXed.

In another embodiment, the first DPCCH power control preamble may be transmitted and the second DPCCH power control preamble may be DTXed during a first pre-defined time period (e.g., the full length or half length of the preamble length, or some other defined period), and during the next time period, the second DPCCH power control preamble is transmitted and the first DPCCH power control preamble may be DTXed (or alternatively both DPCCH power control preambles may be transmitted). The predefined period maybe defined in the specification or by higher layer signalling.

Embodiments for power adjustment of the first and second DPCCHs in uplink power control are disclosed hereafter. There may be one or more than one uplink power control loop established between the WTRU and the NodeB.

If one power control loop is used, one TPC command is received by the WTRU to control the transmit power of the UL DPCCHs. Based on the received TPC command over a TPC command combining period, the WTRU derives a single TPC command, TPC_cmd, by the appropriate power control algorithm, and derives the change in DPCCH power with respect to its previous value, which is denoted by $\Delta_{DPCCH}$ (in dB), and adjusts the transmit power of the uplink DPCCHs with a step of $\Delta_{DPCCH}$ (in dB) which is given by:

$$\Delta_{DPCCH} = \Delta_{TPC} \times \text{TPC\_cmd}. \quad \text{Equation (1)}$$

During the uplink DPCCH power control preamble, the WTRU may derive the change in DPCCH power with respect to its previous value, which is denoted by $\Delta_{DPCCH}$ (in dB), and adjust the total transmit power of the uplink DPCCH power control preamble with a step of $\Delta_{DPCCH}$ (in dB) as in equation (1). Based on the derived change in uplink DPCCH transmit power, $\Delta_{DPCCH}$, the WTRU may control the transmit power of the first DPCCH and second DPCCH (if it is configured) based on the combined TPC command by one or any combination of the following embodiments.

In one embodiment, the WTRU may equally allocate the power to two pilot channels as follows:

$$\Delta_{DPCCH1} = \Delta_{DPCCH2} = (\Delta_{DPCCH})/2. \quad \text{Equation (2)}$$

In another embodiment, the WTRU may allocate power inversely proportional to the length of pilot respectively used in the first and second DPCCHs as follows:

$$\Delta_{DPCCH} = \Delta_{DPCCH1} + \Delta_{DPCCH2}, \text{ and} \quad \text{Equation (3)}$$

$$\Delta_{DPCCH2} = (N_{pilot1}/N_{pilot2}) \times (\Delta_{DPCCH1}). \quad \text{Equation (4)}$$

In another embodiment, before UL synchronization is reached, the WTRU may allocate the total adjustable DPCCH power among two pilot channels in such a way that increases the first DPCCH power while decreasing the second DPCCH power to speed up the UL synchronization, (i.e., $\Delta_{DPCCH2}$ may be smaller than $\Delta_{DPCCH1}$). $\Delta_{DPCCH2}$ may be negative. This would be advantageous in case where UL synchronization primitives at NodeBs are based on the first DPCCH quality or cyclic redundancy check (CRC) check.

In another embodiment, the WTRU may adjust the transmit power of the first and second UL DPCCHs with a step of $\Delta_{DPCCH}$ and $(\Delta_{DPCCH} + \Delta_{WTRU\_sec\_dpcch\_backoff})$, where $\Delta_{WTRU\_sec\_dpcch\_backoff}$ denotes the power offset for the second DPCCH with respect to the first DPCCH, which may be set by higher layers or pre-defined in specification or dynamically signalled to the WTRU by the NodeB, (e.g., over a high speed shared control channel (HS-SCCH) order) or any of DL control channels or some higher layer signalling.

In another embodiment, the WTRU may use any of the above embodiments by taking antenna imbalance into account when adjusting the transmit power of first and second DPCCHs. For example, assuming that the first embodiment (i.e., equally allocate the power change) is used, by taking power imbalance (PI) between two antennas into account, the DPCCH power offsets may be calculated as follows:

$$\Delta_{DPCCH1} = (\Delta_{DPCCH} + \text{PI})/2, \quad \text{and Equation (5)}$$

$$\Delta_{DPCCH2} = (\Delta_{DPCCH} - \text{PI})/2. \quad \text{Equation (6)}$$

This embodiment may be useful for the case that two DPCCHs are not pre-coded.

If two UL power control loops are used, two TPC commands are received by the WTRU to individually control the transmit power of the UL DPCCHs. The conventional uplink power control rules may be reused for the second DPCCH.

Any of the above embodiments may be used to partition the initial DPCCH power signaled from a high layer used for the legacy DPCCH into the initial transmit powers for the first DPCCH and the second DPCCH when UL Tx diversity is used for DPCCH.

Any of the above embodiments to adjust a transmit power of the first and second DPCCHs or DPCCH power control preamble may be applied to a physical random access channel (PRACH) which uses UL Tx diversity, for example, to split the power ramp step, $\Delta P_0$, for two preambles on a PRACH, or to split the transmission power offset of the control part of the random access message with respect to the power of the last transmitted preamble, i.e., $P_{p-m}$ [dB].

When the WTRU transmits two DPCCHs to the NodeB, the uplink synchronisation primitives may be estimated based on the quality of both first and second DPCCHs. Alternatively, the uplink synchronisation primitives may be estimated based on the quality of the first DPCCH. Alternatively, the uplink synchronisation primitives may be estimated based on the quality of the filtered first and second DPCCHs.

For MIMO transmission schemes such as precoding-based MIMO transmission and space time transmit diversity (STTD)/space time block coding (STBC) at the receiver, the channels from different transmit antennas need to be known or estimated before symbol detection. This may be performed with the pilot bits which are known both at the transmitter and the receiver. For multiple transmit antennas, the pilot sequences transmitted from two or multiple antennas may be orthogonal to each other.

Tables 8 and 9 show the conventional DPCCH pilot bit patterns for different length of the pilot bits $N_{pilot}$. The $f_x$ columns (x=1 . . . 4) of the pilot bit pattern are defined as frame synchronization word (FSW) which may be used to confirm frame synchronization. The value of the pilot bit pattern other than FSWs is "1." For a pilot bit pattern in a slot with a given length $N_{pilot}$, $N_f$ is the number of FSWs and $N_r$ is the number of non-FSWs. In Tables 8 and 9, there are four different FSW sequences, identified by $f_1$ . . . $f_4$.

TABLE 8

| | $N_{pilot}$ = 3 | | | $N_{pilot}$ = 4 | | | | $N_{pilot}$ = 5 | | | | | $N_{pilot}$ = 6 | | | | | |
|---|---|---|---|---|---|---|---|---|---|---|---|---|---|---|---|---|---|---|
| Bit # | 0 | 1 | 2 | 0 | 1 | 2 | 3 | 0 | 1 | 2 | 3 | 4 | 0 | 1 | 2 | 3 | 4 | 5 |
| Pattern | $f_1$ | $f_2$ | 1 | 1 | $f_1$ | $f_2$ | 1 | $f_1$ | $f_2$ | 1 | $f_3$ | $f_4$ | 1 | $F_1$ | $f_2$ | 1 | $f_3$ | $f_4$ |
| Slot #0 | 1 | 1 | 1 | 1 | 1 | 1 | 1 | 1 | 1 | 1 | 1 | 0 | 1 | 1 | 1 | 1 | 1 | 0 |
| 1 | 0 | 0 | 1 | 1 | 0 | 0 | 1 | 0 | 0 | 1 | 1 | 0 | 1 | 0 | 0 | 1 | 1 | 0 |
| 2 | 0 | 1 | 1 | 1 | 0 | 1 | 1 | 0 | 1 | 1 | 0 | 1 | 1 | 0 | 1 | 1 | 0 | 1 |
| 3 | 0 | 0 | 1 | 1 | 0 | 0 | 1 | 0 | 0 | 1 | 0 | 0 | 1 | 0 | 0 | 1 | 0 | 0 |
| 4 | 1 | 0 | 1 | 1 | 1 | 0 | 1 | 1 | 0 | 1 | 0 | 1 | 1 | 1 | 0 | 1 | 0 | 1 |
| 5 | 1 | 1 | 1 | 1 | 1 | 1 | 1 | 1 | 1 | 1 | 1 | 0 | 1 | 1 | 1 | 1 | 1 | 0 |
| 6 | 1 | 1 | 1 | 1 | 1 | 1 | 1 | 1 | 1 | 1 | 0 | 0 | 1 | 1 | 1 | 1 | 0 | 0 |
| 7 | 1 | 0 | 1 | 1 | 1 | 0 | 1 | 1 | 0 | 1 | 0 | 0 | 1 | 1 | 0 | 1 | 0 | 0 |
| 8 | 0 | 1 | 1 | 1 | 0 | 1 | 1 | 0 | 1 | 1 | 1 | 0 | 1 | 0 | 1 | 1 | 1 | 0 |
| 9 | 1 | 1 | 1 | 1 | 1 | 1 | 1 | 1 | 1 | 1 | 1 | 1 | 1 | 1 | 1 | 1 | 1 | 1 |
| 10 | 0 | 1 | 1 | 1 | 0 | 1 | 1 | 0 | 1 | 1 | 0 | 1 | 1 | 0 | 1 | 1 | 0 | 1 |
| 11 | 1 | 0 | 1 | 1 | 1 | 0 | 1 | 1 | 0 | 1 | 1 | 1 | 1 | 1 | 0 | 1 | 1 | 1 |
| 12 | 1 | 0 | 1 | 1 | 1 | 0 | 1 | 1 | 0 | 1 | 0 | 0 | 1 | 1 | 0 | 1 | 0 | 0 |
| 13 | 0 | 0 | 1 | 1 | 0 | 0 | 1 | 0 | 0 | 1 | 1 | 1 | 1 | 0 | 0 | 1 | 1 | 1 |
| 14 | 0 | 0 | 1 | 1 | 0 | 0 | 1 | 0 | 0 | 1 | 1 | 1 | 1 | 0 | 0 | 1 | 1 | 1 |

TABLE 9

| | $N_{pilot}$ = 7 | | | | | | | $N_{pilot}$ = 8 | | | | | | | |
|---|---|---|---|---|---|---|---|---|---|---|---|---|---|---|---|
| Bit # | 0 | 1 | 2 | 3 | 4 | 5 | 6 | 0 | 1 | 2 | 3 | 4 | 5 | 6 | 7 |
| Pattern | 1 | $f_1$ | $f_2$ | 1 | $f_3$ | $f_4$ | 1 | 1 | $f_1$ | 1 | $f_2$ | 1 | $f_3$ | 1 | $f_4$ |
| Slot #0 | 1 | 1 | 1 | 1 | 1 | 0 | 1 | 1 | 1 | 1 | 1 | 1 | 1 | 1 | 0 |
| 1 | 1 | 0 | 0 | 1 | 1 | 0 | 1 | 1 | 0 | 1 | 0 | 1 | 1 | 1 | 0 |
| 2 | 1 | 0 | 1 | 1 | 0 | 1 | 1 | 1 | 0 | 1 | 1 | 1 | 0 | 1 | 1 |
| 3 | 1 | 0 | 0 | 1 | 0 | 0 | 1 | 1 | 0 | 1 | 0 | 1 | 0 | 1 | 0 |
| 4 | 1 | 1 | 0 | 1 | 0 | 1 | 1 | 1 | 1 | 1 | 0 | 1 | 0 | 1 | 1 |
| 5 | 1 | 1 | 1 | 1 | 1 | 0 | 1 | 1 | 1 | 1 | 1 | 1 | 1 | 1 | 0 |
| 6 | 1 | 1 | 1 | 1 | 0 | 0 | 1 | 1 | 1 | 1 | 1 | 1 | 0 | 1 | 0 |
| 7 | 1 | 1 | 0 | 1 | 0 | 0 | 1 | 1 | 1 | 1 | 0 | 1 | 0 | 1 | 0 |
| 8 | 1 | 0 | 1 | 1 | 1 | 0 | 1 | 1 | 0 | 1 | 1 | 1 | 1 | 1 | 0 |
| 9 | 1 | 1 | 1 | 1 | 1 | 1 | 1 | 1 | 1 | 1 | 1 | 1 | 1 | 1 | 1 |
| 10 | 1 | 0 | 1 | 1 | 0 | 1 | 1 | 1 | 0 | 1 | 1 | 1 | 0 | 1 | 1 |
| 11 | 1 | 1 | 0 | 1 | 1 | 1 | 1 | 1 | 1 | 1 | 0 | 1 | 1 | 1 | 1 |
| 12 | 1 | 1 | 0 | 1 | 0 | 0 | 1 | 1 | 1 | 1 | 0 | 1 | 0 | 1 | 0 |
| 13 | 1 | 0 | 0 | 1 | 1 | 1 | 1 | 1 | 0 | 1 | 0 | 1 | 1 | 1 | 1 |
| 14 | 1 | 0 | 0 | 1 | 1 | 1 | 1 | 1 | 0 | 1 | 0 | 1 | 1 | 1 | 1 |

Embodiments for a new pilot bit sequence for the second antenna for channel estimation of the multi-dimensional channel matrix are disclosed hereafter. The new pilot patterns may be designed using the conventional pilot patterns and transforming them into a new set of pilot patterns (e.g., with the orthogonal properties) to be used on the second antenna/beam. This approach may be used to derive a new set of pilot sequences maintaining the FSW correlation properties.

When the number of pilot bits is even, orthogonality may be achieved within one single pilot field in a given slot. The order in which the FSW and non-FSW vectors are organized may be maintained as the conventional pilot field. To obtain an orthogonal sequence for even number of pilot bits, a subset (corresponding to the half of the pilot sequence length) of the FSW vectors may be reversed. Table 10 shows an example pilot sequence generated in this way.

The WTRU and the NodeB may simply invert the appropriate bits, depending on the configuration. This may be done for both cases where the sequences are generated using binary shift-register circuits and where the sequences are hard-coded in a table (in which case a single table may be needed if the inverters are properly implemented).

While for even-numbered $N_{pilot}$ orthogonality may be maintained on a per time slot basis, when $N_{pilot}$ is odd numbered, there is 1 bit residue left in the correlation that would destroy the orthogonality. In order to maintain orthogonality for an odd number of pilot symbols, the orthogonality may be applied across two slots instead of one slot.

In one embodiment, two pilot patterns may be created for the second pilot (pattern A and B). The WTRU may transmit pattern A and B alternating in time. Alternatively, the WTRU may transmit pattern A during even slots and pattern B during odd slots of a radio frame. Example pilot patterns for odd number of pilot symbols that are generated by reversing FSW bits are shown in Tables 12 and 13.

TABLE 10

| | $N_{pilot}$ = 4 | | | | $N_{pilot}$ = 6 | | | | | | $N_{pilot}$ = 8 | | | | | | | |
|---|---|---|---|---|---|---|---|---|---|---|---|---|---|---|---|---|---|---|
| Bit # | 0 | 1 | 2 | 3 | 0 | 1 | 2 | 3 | 4 | 5 | 0 | 1 | 2 | 3 | 4 | 5 | 6 | 7 |
| Pattern | I | $-f_1$ | $-f_2$ | I | I | $-f_1$ | $-f_2$ | I | $-f_3$ | $f_4$ | I | $-f_1$ | I | $-f_2$ | I | $-f_3$ | I | $-f_4$ |
| Slot #0 | 1 | 0 | 0 | 1 | 1 | 0 | 0 | 1 | 0 | 0 | 1 | 0 | 1 | 0 | 1 | 0 | 1 | 1 |
| 1 | 1 | 1 | 1 | 1 | 1 | 1 | 1 | 1 | 0 | 0 | 1 | 1 | 1 | 1 | 1 | 0 | 1 | 1 |
| 2 | 1 | 1 | 0 | 1 | 1 | 1 | 0 | 1 | 1 | 1 | 1 | 1 | 1 | 0 | 1 | 1 | 1 | 0 |
| 3 | 1 | 1 | 1 | 1 | 1 | 1 | 1 | 1 | 1 | 0 | 1 | 1 | 1 | 1 | 1 | 1 | 1 | 1 |
| 4 | 1 | 0 | 1 | 1 | 1 | 0 | 1 | 1 | 1 | 1 | 1 | 0 | 1 | 1 | 1 | 1 | 1 | 0 |
| 5 | 1 | 0 | 0 | 1 | 1 | 0 | 0 | 1 | 0 | 0 | 1 | 0 | 1 | 0 | 1 | 0 | 1 | 1 |
| 6 | 1 | 0 | 0 | 1 | 1 | 0 | 0 | 1 | 1 | 0 | 1 | 0 | 1 | 0 | 1 | 1 | 1 | 1 |
| 7 | 1 | 0 | 1 | 1 | 1 | 0 | 1 | 1 | 1 | 0 | 1 | 0 | 1 | 1 | 1 | 1 | 1 | 1 |
| 8 | 1 | 1 | 0 | 1 | 1 | 1 | 0 | 1 | 0 | 0 | 1 | 1 | 1 | 0 | 1 | 0 | 1 | 1 |
| 9 | 1 | 0 | 0 | 1 | 1 | 0 | 0 | 1 | 0 | 1 | 1 | 0 | 1 | 0 | 1 | 0 | 1 | 0 |
| 10 | 1 | 1 | 0 | 1 | 1 | 1 | 0 | 1 | 1 | 1 | 1 | 1 | 1 | 0 | 1 | 1 | 1 | 0 |
| 11 | 1 | 0 | 1 | 1 | 1 | 0 | 1 | 1 | 0 | 1 | 1 | 0 | 1 | 1 | 1 | 0 | 1 | 0 |
| 12 | 1 | 0 | 1 | 1 | 1 | 0 | 1 | 1 | 1 | 0 | 1 | 0 | 1 | 1 | 1 | 1 | 1 | 1 |
| 13 | 1 | 1 | 1 | 1 | 1 | 1 | 1 | 1 | 0 | 1 | 1 | 1 | 1 | 1 | 1 | 0 | 1 | 0 |
| 14 | 1 | 1 | 1 | 1 | 1 | 1 | 1 | 1 | 0 | 1 | 1 | 1 | 1 | 1 | 1 | 0 | 1 | 0 |

In another embodiment, the non-FSW bits may be reversed. Because for $N_{pilot}$=4 and $N_{pilot}$=8 exactly half of the pattern sequences consist of non-FSW bits, this embodiment may be implemented by inverting all the non-FSW bits (from 1 to 0). For $N_{pilot}$=6, 2 out of the 6 bits (for each slot) are non-FSW bits. Thus, in this case, one FSW bit may be inverted to keep the orthogonality. The resulting example bit patterns are shown in Table 11.

TABLE 11

| | $N_{pilot}$ = 4 | | | | $N_{pilot}$ = 6 | | | | | | $N_{pilot}$ = 8 | | | | | | | |
|---|---|---|---|---|---|---|---|---|---|---|---|---|---|---|---|---|---|---|
| Bit # | 0 | 1 | 2 | 3 | 0 | 1 | 2 | 3 | 4 | 5 | 0 | 1 | 2 | 3 | 4 | 5 | 6 | 7 |
| Pattern | -I | $f_1$ | $f_2$ | -I | -I | $f_1$ | $f_2$ | -I | $f_3$ | $-f_4$ | -I | $f_1$ | -I | $f_2$ | -I | $f_3$ | -I | $f_4$ |
| Slot #0 | 0 | 1 | 1 | 0 | 0 | 1 | 0 | 0 | 1 | 1 | 0 | 1 | 0 | 1 | 0 | 1 | 0 | 0 |
| 1 | 0 | 0 | 0 | 0 | 0 | 0 | 1 | 0 | 1 | 1 | 0 | 0 | 0 | 0 | 0 | 1 | 0 | 0 |
| 2 | 0 | 0 | 1 | 0 | 0 | 0 | 0 | 0 | 0 | 0 | 0 | 0 | 0 | 1 | 0 | 0 | 0 | 1 |
| 3 | 0 | 0 | 0 | 0 | 0 | 0 | 1 | 0 | 0 | 1 | 0 | 0 | 0 | 0 | 0 | 0 | 0 | 0 |
| 4 | 0 | 1 | 0 | 0 | 0 | 1 | 1 | 0 | 0 | 0 | 0 | 1 | 0 | 0 | 0 | 0 | 0 | 1 |
| 5 | 0 | 1 | 1 | 0 | 0 | 1 | 0 | 0 | 1 | 1 | 0 | 1 | 0 | 1 | 0 | 1 | 0 | 0 |
| 6 | 0 | 1 | 1 | 0 | 0 | 1 | 0 | 0 | 0 | 1 | 0 | 1 | 0 | 1 | 0 | 0 | 0 | 0 |
| 7 | 0 | 1 | 0 | 0 | 0 | 1 | 1 | 0 | 0 | 1 | 0 | 1 | 0 | 0 | 0 | 0 | 0 | 0 |
| 8 | 0 | 0 | 1 | 0 | 0 | 0 | 1 | 0 | 1 | 1 | 0 | 0 | 0 | 1 | 0 | 1 | 0 | 0 |
| 9 | 0 | 1 | 1 | 0 | 0 | 1 | 1 | 0 | 1 | 0 | 0 | 1 | 0 | 1 | 0 | 1 | 0 | 1 |
| 10 | 0 | 0 | 1 | 0 | 0 | 0 | 1 | 0 | 0 | 0 | 0 | 0 | 0 | 1 | 0 | 0 | 0 | 1 |
| 11 | 0 | 1 | 0 | 0 | 0 | 1 | 1 | 0 | 1 | 0 | 0 | 1 | 0 | 0 | 0 | 1 | 0 | 1 |
| 12 | 0 | 1 | 0 | 0 | 0 | 1 | 1 | 0 | 0 | 1 | 0 | 1 | 0 | 0 | 0 | 0 | 0 | 0 |
| 13 | 0 | 0 | 0 | 0 | 0 | 0 | 1 | 0 | 1 | 0 | 0 | 0 | 0 | 0 | 0 | 1 | 0 | 1 |
| 14 | 0 | 0 | 0 | 0 | 0 | 0 | 1 | 0 | 1 | 0 | 0 | 0 | 0 | 0 | 0 | 1 | 0 | 1 |

TABLE 12

| | $N_{pilot}=3$ A | | | $N_{pilot}=3$ B | | | $N_{pilot}=5$ A | | | | | $N_{pilot}=5$ B | | | | |
|---|---|---|---|---|---|---|---|---|---|---|---|---|---|---|---|---|
| Bit # | 0 | 1 | 2 | 0 | 1 | 2 | 0 | 1 | 2 | 3 | 4 | 0 | 1 | 2 | 3 | 4 |
| Pattern | $-f_1$ | $-f_2$ | I | $-f_1$ | $f_2$ | I | $-f_1$ | $-f_2$ | I | $-f_3$ | $f_4$ | $-f_1$ | $-f_2$ | I | $f_3$ | $f_4$ |
| Slot #0 | 0 | 0 | 1 | 0 | 1 | 1 | 0 | 0 | 1 | 0 | 0 | 0 | 0 | 1 | 1 | 0 |
| 1 | 1 | 1 | 1 | 1 | 0 | 1 | 1 | 1 | 1 | 0 | 0 | 1 | 1 | 1 | 1 | 0 |
| 2 | 1 | 0 | 1 | 1 | 1 | 1 | 1 | 0 | 1 | 1 | 1 | 1 | 0 | 1 | 0 | 1 |
| 3 | 1 | 1 | 1 | 1 | 0 | 1 | 1 | 1 | 1 | 1 | 0 | 1 | 1 | 1 | 0 | 0 |
| 4 | 0 | 1 | 1 | 0 | 0 | 1 | 0 | 1 | 1 | 1 | 1 | 0 | 1 | 1 | 0 | 1 |
| 5 | 0 | 0 | 1 | 0 | 1 | 1 | 0 | 0 | 1 | 0 | 0 | 0 | 0 | 1 | 1 | 0 |
| 6 | 0 | 0 | 1 | 0 | 1 | 1 | 0 | 0 | 1 | 1 | 0 | 0 | 0 | 1 | 0 | 0 |
| 7 | 0 | 1 | 1 | 0 | 0 | 1 | 0 | 1 | 1 | 1 | 0 | 0 | 1 | 1 | 0 | 0 |
| 8 | 1 | 0 | 1 | 1 | 1 | 1 | 1 | 0 | 1 | 0 | 0 | 1 | 0 | 1 | 1 | 0 |
| 9 | 0 | 0 | 1 | 0 | 1 | 1 | 0 | 0 | 1 | 0 | 1 | 0 | 0 | 1 | 1 | 1 |
| 10 | 1 | 0 | 1 | 1 | 1 | 1 | 1 | 0 | 1 | 1 | 1 | 1 | 0 | 1 | 0 | 1 |
| 11 | 0 | 1 | 1 | 0 | 0 | 1 | 0 | 1 | 1 | 0 | 1 | 0 | 1 | 1 | 1 | 1 |
| 12 | 0 | 1 | 1 | 0 | 0 | 1 | 0 | 1 | 1 | 1 | 0 | 0 | 1 | 1 | 0 | 0 |
| 13 | 1 | 1 | 1 | 1 | 0 | 1 | 1 | 1 | 1 | 0 | 1 | 1 | 1 | 1 | 1 | 1 |
| 14 | 1 | 1 | 1 | 1 | 0 | 1 | 1 | 1 | 1 | 0 | 1 | 1 | 1 | 1 | 1 | 1 |

TABLE 13

| | $N_{pilot}=7$ A | | | | | | | $N_{pilot}=7$ B | | | | | | |
|---|---|---|---|---|---|---|---|---|---|---|---|---|---|---|
| Bit # | 0 | 1 | 2 | 3 | 4 | 5 | 6 | 0 | 1 | 2 | 3 | 4 | 5 | 6 |
| Pattern | I | $-f_1$ | $-f_2$ | I | $-f_3$ | $-f_4$ | I | I | $-f_1$ | $-f_2$ | I | $-f_3$ | $f_4$ | I |
| Slot #0 | 1 | 0 | 0 | 1 | 0 | 0 | 1 | 1 | 0 | 0 | 1 | 0 | 0 | 1 |
| 1 | 1 | 1 | 1 | 1 | 0 | 0 | 1 | 1 | 1 | 1 | 1 | 0 | 0 | 1 |
| 2 | 1 | 1 | 0 | 1 | 1 | 1 | 1 | 1 | 1 | 0 | 1 | 1 | 1 | 1 |
| 3 | 1 | 1 | 1 | 1 | 0 | 1 | 1 | 1 | 1 | 1 | 1 | 0 | 1 | 1 |
| 4 | 1 | 0 | 1 | 1 | 1 | 1 | 1 | 1 | 0 | 1 | 1 | 1 | 1 | 1 |
| 5 | 1 | 0 | 0 | 1 | 0 | 0 | 1 | 1 | 0 | 0 | 1 | 0 | 0 | 1 |
| 6 | 1 | 0 | 0 | 1 | 1 | 0 | 1 | 1 | 0 | 0 | 1 | 1 | 0 | 1 |
| 7 | 1 | 0 | 1 | 1 | 1 | 0 | 1 | 1 | 0 | 1 | 1 | 1 | 0 | 1 |
| 8 | 1 | 1 | 0 | 1 | 0 | 0 | 1 | 1 | 1 | 0 | 1 | 0 | 0 | 1 |
| 9 | 1 | 0 | 0 | 1 | 0 | 1 | 1 | 1 | 0 | 0 | 1 | 0 | 1 | 1 |
| 10 | 1 | 1 | 0 | 1 | 1 | 1 | 1 | 1 | 1 | 0 | 1 | 1 | 1 | 1 |
| 11 | 1 | 0 | 1 | 1 | 0 | 1 | 1 | 1 | 0 | 1 | 1 | 0 | 1 | 1 |
| 12 | 1 | 0 | 1 | 1 | 1 | 0 | 1 | 1 | 0 | 1 | 1 | 1 | 0 | 1 |
| 13 | 1 | 1 | 1 | 1 | 0 | 1 | 1 | 1 | 1 | 1 | 1 | 0 | 1 | 1 |
| 14 | 1 | 1 | 1 | 1 | 0 | 1 | 1 | 1 | 1 | 1 | 1 | 0 | 1 | 1 |

Figure 11:
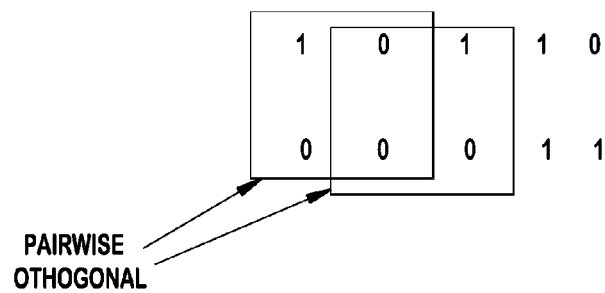
FIG. 11 shows an example of the pair-wise orthogonal bit streams.

In another embodiment, the orthogonality requirement may be relaxed by introducing the concept of pair-wise orthogonality, which requires that any of the consecutively paired bits in the two pilot patterns be orthogonal. FIG. 11 shows an example of the pair-wise orthogonal bit streams.

Denote the bits from the primary pilot pattern sent to the first antenna as: $C_{p1}(n)$, $n=0, 1, 2, \ldots, N_{pilot}-1$. For the secondary pilot bit pattern that is sent to the second antenna, the pair-wise orthogonality can be achieved by inverting every other bits of the primary pilot pattern as follows:

$$C_{p2}(n) = \begin{cases} C_{p1}(n) & \text{for even } n \\ \overline{C_{p1}(n)} & \text{for odd } n, \end{cases} \quad \text{Equation (7)}$$

where $\overline{C}$ represents the operation of inverting the bit. The process may be repeated on the pilot bit pattern for every slot.

By designing the secondary pilot pattern this way, the bit position of the FSW of the new pilot pattern may be the same as that of conventional pilot pattern, the autocorrelation of the FSWs of the new pilot bit pattern may be no worse than that of the conventional pilot bit pattern, and the cross-correlation between the FSWs and the non-FSWs and other FSWs of the new pilot bit pattern may be no worse than that of legacy pilot pattern.

The same principle may be applied to the cases where the number of pilot bits is even. In combination of both even and odd number of pilot bits, Table 14 shows example secondary pilot patterns for $N_{pilot}=3$, 4, 5 and 6, and Table 15 shows example secondary pilot patterns for $N_{pilot}=7$ and 8.

TABLE 14

| | $N_{pilot}=3$ | | | $N_{pilot}=4$ | | | | $N_{pilot}=5$ | | | | | $N_{pilot}=6$ | | | | | |
|---|---|---|---|---|---|---|---|---|---|---|---|---|---|---|---|---|---|---|
| Bit # | 0 | 1 | 2 | 0 | 1 | 2 | 3 | 0 | 1 | 2 | 3 | 4 | 0 | 1 | 2 | 3 | 4 | 6 |
| Slot #0 | 1 | 0 | 1 | 1 | 0 | 1 | 0 | 1 | 0 | 1 | 0 | 0 | 1 | 0 | 1 | 0 | 1 | 1 |
| 1 | 0 | 1 | 1 | 1 | 1 | 0 | 0 | 0 | 1 | 1 | 0 | 0 | 1 | 1 | 0 | 0 | 1 | 1 |

TABLE 14-continued

| | $N_{pilot} = 3$ | | | $N_{pilot} = 4$ | | | | $N_{pilot} = 5$ | | | | | $N_{pilot} = 6$ | | | | | |
|---|---|---|---|---|---|---|---|---|---|---|---|---|---|---|---|---|---|---|
| Bit # | 0 | 1 | 2 | 0 | 1 | 2 | 3 | 0 | 1 | 2 | 3 | 4 | 0 | 1 | 2 | 3 | 4 | 6 |
| 2 | 0 | 0 | 1 | 1 | 1 | 1 | 0 | 0 | 0 | 1 | 1 | 1 | 1 | 1 | 1 | 0 | 0 | 0 |
| 3 | 0 | 1 | 1 | 1 | 1 | 0 | 0 | 0 | 1 | 1 | 1 | 0 | 1 | 1 | 0 | 0 | 0 | 1 |
| 4 | 1 | 1 | 1 | 1 | 0 | 0 | 0 | 1 | 1 | 1 | 1 | 1 | 1 | 0 | 0 | 0 | 0 | 0 |
| 5 | 1 | 0 | 1 | 1 | 0 | 1 | 0 | 1 | 0 | 1 | 0 | 0 | 1 | 0 | 1 | 0 | 1 | 1 |
| 6 | 1 | 0 | 1 | 1 | 0 | 1 | 0 | 1 | 0 | 1 | 1 | 0 | 1 | 0 | 1 | 0 | 0 | 1 |
| 7 | 1 | 1 | 1 | 1 | 0 | 0 | 0 | 1 | 1 | 1 | 1 | 0 | 1 | 0 | 0 | 0 | 0 | 1 |
| 8 | 0 | 0 | 1 | 1 | 1 | 1 | 0 | 0 | 0 | 1 | 0 | 0 | 1 | 1 | 1 | 0 | 1 | 1 |
| 9 | 1 | 0 | 1 | 1 | 0 | 1 | 0 | 1 | 0 | 1 | 0 | 1 | 1 | 0 | 1 | 0 | 1 | 0 |
| 10 | 0 | 0 | 1 | 1 | 1 | 1 | 0 | 0 | 0 | 1 | 1 | 1 | 1 | 1 | 1 | 0 | 0 | 0 |
| 11 | 1 | 1 | 1 | 1 | 0 | 0 | 0 | 1 | 1 | 1 | 0 | 1 | 1 | 0 | 0 | 0 | 1 | 0 |
| 12 | 1 | 1 | 1 | 1 | 0 | 0 | 0 | 1 | 1 | 1 | 1 | 0 | 1 | 0 | 0 | 0 | 0 | 1 |
| 13 | 0 | 1 | 1 | 1 | 1 | 0 | 0 | 0 | 1 | 1 | 0 | 1 | 1 | 1 | 0 | 0 | 1 | 0 |
| 14 | 0 | 1 | 1 | 1 | 1 | 0 | 0 | 0 | 1 | 1 | 0 | 1 | 1 | 1 | 0 | 0 | 1 | 0 |

TABLE 15

| | $N_{pilot} = 7$ | | | | | | | $N_{pilot} = 8$ | | | | | | | |
|---|---|---|---|---|---|---|---|---|---|---|---|---|---|---|---|
| Bit # | 0 | 1 | 2 | 3 | 4 | 5 | 6 | 0 | 1 | 2 | 3 | 4 | 5 | 6 | 7 |
| Slot #0 | 1 | 0 | 1 | 0 | 1 | 1 | 1 | 1 | 0 | 1 | 0 | 1 | 0 | 1 | 1 |
| 1 | 1 | 1 | 0 | 0 | 1 | 1 | 1 | 1 | 1 | 1 | 1 | 1 | 0 | 1 | 1 |
| 2 | 1 | 1 | 1 | 0 | 0 | 0 | 1 | 1 | 1 | 1 | 0 | 1 | 1 | 1 | 0 |
| 3 | 1 | 1 | 0 | 0 | 0 | 1 | 1 | 1 | 1 | 1 | 1 | 1 | 1 | 1 | 1 |
| 4 | 1 | 0 | 0 | 0 | 0 | 0 | 1 | 1 | 0 | 1 | 1 | 1 | 1 | 1 | 0 |
| 5 | 1 | 0 | 1 | 0 | 1 | 1 | 1 | 1 | 0 | 1 | 0 | 1 | 0 | 1 | 1 |
| 6 | 1 | 0 | 1 | 0 | 0 | 1 | 1 | 1 | 0 | 1 | 0 | 1 | 1 | 1 | 1 |
| 7 | 1 | 0 | 0 | 0 | 0 | 1 | 1 | 1 | 0 | 1 | 1 | 1 | 1 | 1 | 1 |
| 8 | 1 | 1 | 1 | 0 | 1 | 1 | 1 | 1 | 1 | 1 | 0 | 1 | 0 | 1 | 1 |
| 9 | 1 | 0 | 1 | 0 | 1 | 0 | 1 | 1 | 0 | 1 | 0 | 1 | 0 | 1 | 0 |
| 10 | 1 | 1 | 1 | 0 | 0 | 0 | 1 | 1 | 1 | 1 | 0 | 1 | 1 | 1 | 0 |
| 11 | 1 | 0 | 0 | 0 | 1 | 0 | 1 | 1 | 0 | 1 | 1 | 1 | 0 | 1 | 0 |
| 12 | 1 | 0 | 0 | 0 | 0 | 1 | 1 | 1 | 0 | 1 | 1 | 1 | 1 | 1 | 1 |
| 13 | 1 | 1 | 0 | 0 | 1 | 0 | 1 | 1 | 1 | 1 | 1 | 0 | 1 | 0 | 0 |
| 14 | 1 | 1 | 0 | 0 | 1 | 0 | 1 | 1 | 1 | 1 | 1 | 0 | 1 | 0 | 0 |

In another embodiment, the secondary pilot pattern may be generated with a different inverting pattern (e.g., inverting even bits) for the pair-wise orthogonality. Tables 16 and 17 show example secondary pilot bit patterns in this way.

TABLE 16

| | $N_{pilot} = 3$ | | | $N_{pilot} = 4$ | | | | $N_{pilot} = 5$ | | | | | $N_{pilot} = 6$ | | | | | |
|---|---|---|---|---|---|---|---|---|---|---|---|---|---|---|---|---|---|---|
| Bit # | 0 | 1 | 2 | 0 | 1 | 2 | 3 | 0 | 1 | 2 | 3 | 4 | 0 | 1 | 2 | 3 | 4 | 5 |
| Slot #0 | 0 | 1 | 0 | 0 | 1 | 0 | 1 | 0 | 1 | 0 | 1 | 1 | 0 | 1 | 0 | 1 | 0 | 0 |
| 1 | 1 | 0 | 0 | 0 | 0 | 1 | 1 | 1 | 0 | 0 | 1 | 1 | 0 | 0 | 1 | 1 | 0 | 0 |
| 2 | 1 | 1 | 0 | 0 | 0 | 0 | 1 | 1 | 1 | 0 | 0 | 0 | 0 | 0 | 0 | 1 | 1 | 1 |
| 3 | 1 | 0 | 0 | 0 | 0 | 1 | 1 | 1 | 0 | 0 | 0 | 1 | 0 | 0 | 1 | 1 | 1 | 0 |
| 4 | 0 | 0 | 0 | 0 | 1 | 1 | 1 | 0 | 0 | 0 | 0 | 0 | 0 | 1 | 1 | 1 | 1 | 1 |
| 5 | 0 | 1 | 0 | 0 | 1 | 0 | 1 | 0 | 1 | 0 | 1 | 1 | 0 | 1 | 0 | 1 | 0 | 0 |
| 6 | 0 | 1 | 0 | 0 | 1 | 0 | 1 | 0 | 1 | 0 | 1 | 0 | 1 | 0 | 1 | 1 | 0 | 1 |
| 7 | 0 | 0 | 0 | 0 | 1 | 1 | 1 | 0 | 0 | 0 | 0 | 1 | 0 | 1 | 1 | 1 | 1 | 0 |
| 8 | 1 | 1 | 0 | 0 | 0 | 0 | 1 | 1 | 1 | 0 | 1 | 1 | 0 | 0 | 0 | 1 | 0 | 0 |
| 9 | 0 | 1 | 0 | 0 | 1 | 0 | 1 | 0 | 1 | 0 | 1 | 0 | 0 | 1 | 0 | 1 | 0 | 1 |
| 10 | 1 | 1 | 0 | 0 | 0 | 0 | 1 | 1 | 1 | 0 | 0 | 0 | 0 | 0 | 0 | 1 | 1 | 1 |
| 11 | 0 | 0 | 0 | 0 | 1 | 1 | 1 | 0 | 0 | 0 | 1 | 0 | 0 | 1 | 1 | 1 | 0 | 1 |
| 12 | 0 | 0 | 0 | 0 | 1 | 1 | 1 | 0 | 0 | 0 | 0 | 1 | 0 | 1 | 1 | 1 | 1 | 0 |
| 13 | 1 | 0 | 0 | 0 | 0 | 1 | 1 | 1 | 0 | 0 | 1 | 0 | 0 | 0 | 1 | 1 | 0 | 1 |
| 14 | 1 | 0 | 0 | 0 | 0 | 1 | 1 | 1 | 0 | 0 | 1 | 0 | 0 | 0 | 1 | 1 | 0 | 1 |

TABLE 17

| | $N_{pilot}=7$ | | | | | | | $N_{pilot}=8$ | | | | | | | |
|---|---|---|---|---|---|---|---|---|---|---|---|---|---|---|---|
| Bit # | 0 | 1 | 2 | 3 | 4 | 5 | 6 | 0 | 1 | 2 | 3 | 4 | 5 | 6 | 7 |
| Slot #0 | 0 | 1 | 0 | 1 | 0 | 0 | 0 | 0 | 1 | 0 | 1 | 0 | 1 | 0 | 0 |
| 1 | 0 | 0 | 1 | 1 | 0 | 0 | 0 | 0 | 0 | 0 | 0 | 0 | 1 | 0 | 0 |
| 2 | 0 | 0 | 0 | 1 | 1 | 1 | 0 | 0 | 0 | 0 | 1 | 0 | 0 | 0 | 1 |
| 3 | 0 | 0 | 1 | 1 | 1 | 0 | 0 | 0 | 0 | 0 | 0 | 0 | 0 | 0 | 0 |
| 4 | 0 | 1 | 1 | 1 | 1 | 1 | 0 | 0 | 1 | 0 | 0 | 0 | 0 | 0 | 1 |
| 5 | 0 | 1 | 0 | 1 | 0 | 0 | 0 | 0 | 1 | 0 | 1 | 0 | 1 | 0 | 0 |
| 6 | 0 | 1 | 0 | 1 | 1 | 0 | 0 | 0 | 1 | 0 | 1 | 0 | 0 | 0 | 0 |
| 7 | 0 | 1 | 1 | 1 | 1 | 0 | 0 | 0 | 1 | 0 | 0 | 0 | 0 | 0 | 0 |
| 8 | 0 | 0 | 0 | 1 | 0 | 0 | 0 | 0 | 0 | 0 | 1 | 0 | 1 | 0 | 0 |
| 9 | 0 | 1 | 0 | 1 | 0 | 1 | 0 | 0 | 1 | 0 | 1 | 0 | 1 | 0 | 1 |
| 10 | 0 | 0 | 0 | 1 | 1 | 1 | 0 | 0 | 0 | 0 | 1 | 0 | 0 | 0 | 1 |
| 11 | 0 | 1 | 1 | 1 | 0 | 1 | 0 | 0 | 1 | 0 | 0 | 0 | 1 | 0 | 1 |
| 12 | 0 | 1 | 1 | 1 | 1 | 0 | 0 | 0 | 1 | 0 | 0 | 0 | 0 | 0 | 0 |
| 13 | 0 | 0 | 1 | 1 | 0 | 1 | 0 | 0 | 0 | 0 | 0 | 0 | 1 | 0 | 1 |
| 14 | 0 | 0 | 1 | 1 | 0 | 1 | 0 | 0 | 0 | 0 | 0 | 0 | 1 | 0 | 1 |

In another embodiment, the pair-wise orthogonality may be maintained across slot boundaries in a range of entire radio frame. For example for $N_{pilot}=3$ with inverting odd bits, the secondary pilot bit pattern may be generated as:

$$C_{p1}^{1}(0), \overline{C}_{p1}^{1}(1), C_{p1}^{1}(2), \overline{C}_{p1}^{2}(0), C_{p1}^{2}(1),$$
$$\overline{C}_{p1}^{2}(2), C_{p1}^{3}(0), \overline{C}_{p1}^{3}(1), C_{p1}^{3}(2), \ldots,$$

where the superscript represents the slot number. The example resulting pilot bit patterns are shown in Tables 18 and 19.

TABLE 18

| | $N_{pilot}=3$ | | | $N_{pilot}=4$ | | | | $N_{pilot}=5$ | | | | | $N_{pilot}=6$ | | | | | |
|---|---|---|---|---|---|---|---|---|---|---|---|---|---|---|---|---|---|---|
| Bit # | 0 | 1 | 2 | 0 | 1 | 2 | 3 | 0 | 1 | 2 | 3 | 4 | 0 | 1 | 2 | 3 | 4 | 5 |
| Slot #0 | 1 | 0 | 1 | 1 | 0 | 1 | 0 | 1 | 0 | 1 | 0 | 0 | 1 | 0 | 1 | 0 | 1 | 1 |
| 1 | 1 | 0 | 0 | 0 | 0 | 1 | 1 | 1 | 0 | 0 | 1 | 1 | 0 | 0 | 1 | 1 | 0 | 0 |
| 2 | 0 | 0 | 1 | 1 | 1 | 1 | 0 | 0 | 0 | 1 | 1 | 1 | 1 | 1 | 1 | 0 | 0 | 0 |
| 3 | 1 | 0 | 0 | 0 | 0 | 1 | 1 | 1 | 0 | 0 | 0 | 1 | 0 | 0 | 1 | 1 | 1 | 0 |
| 4 | 1 | 1 | 1 | 1 | 0 | 0 | 0 | 1 | 1 | 1 | 1 | 1 | 1 | 0 | 0 | 0 | 0 | 0 |
| 5 | 0 | 1 | 0 | 0 | 1 | 0 | 1 | 0 | 1 | 0 | 1 | 1 | 0 | 1 | 0 | 1 | 0 | 0 |
| 6 | 1 | 0 | 1 | 0 | 1 | 0 | 1 | 0 | 1 | 1 | 0 | 1 | 0 | 1 | 0 | 0 | 0 | 1 |
| 7 | 0 | 0 | 0 | 0 | 1 | 1 | 1 | 0 | 0 | 0 | 0 | 1 | 0 | 1 | 1 | 1 | 1 | 0 |
| 8 | 0 | 0 | 1 | 1 | 1 | 1 | 0 | 0 | 0 | 1 | 0 | 0 | 1 | 1 | 1 | 0 | 1 | 1 |
| 9 | 0 | 1 | 0 | 0 | 1 | 0 | 1 | 0 | 1 | 0 | 1 | 0 | 0 | 1 | 0 | 1 | 0 | 1 |
| 10 | 0 | 0 | 1 | 1 | 1 | 1 | 0 | 0 | 0 | 1 | 1 | 1 | 1 | 1 | 1 | 0 | 0 | 0 |
| 11 | 0 | 0 | 0 | 0 | 1 | 1 | 1 | 0 | 0 | 0 | 1 | 0 | 0 | 1 | 1 | 1 | 0 | 1 |
| 12 | 1 | 1 | 1 | 1 | 0 | 0 | 0 | 1 | 1 | 1 | 1 | 0 | 1 | 0 | 0 | 0 | 0 | 1 |
| 13 | 1 | 0 | 0 | 0 | 0 | 1 | 1 | 1 | 0 | 0 | 0 | 1 | 0 | 0 | 0 | 1 | 0 | 1 |
| 14 | 0 | 1 | 1 | 1 | 1 | 0 | 0 | 0 | 1 | 1 | 0 | 1 | 1 | 1 | 0 | 0 | 1 | 0 |

TABLE 19

| | $N_{pilot}=7$ | | | | | | | $N_{pilot}=8$ | | | | | | | |
|---|---|---|---|---|---|---|---|---|---|---|---|---|---|---|---|
| Bit # | 0 | 1 | 2 | 3 | 4 | 5 | 6 | 0 | 1 | 2 | 3 | 4 | 5 | 6 | 7 |
| Slot #0 | 1 | 0 | 1 | 0 | 1 | 1 | 1 | 0 | 1 | 0 | 1 | 0 | 1 | 1 | |
| 1 | 0 | 0 | 1 | 1 | 0 | 0 | 0 | 0 | 0 | 0 | 0 | 0 | 1 | 0 | 0 |
| 2 | 1 | 1 | 1 | 0 | 0 | 0 | 1 | 1 | 1 | 0 | 1 | 1 | 1 | 0 | |
| 3 | 0 | 0 | 1 | 1 | 0 | 0 | 0 | 0 | 0 | 0 | 0 | 0 | 0 | 0 | |
| 4 | 1 | 0 | 0 | 0 | 0 | 1 | 1 | 0 | 1 | 1 | 1 | 1 | 0 | | |
| 5 | 0 | 1 | 0 | 1 | 0 | 0 | 0 | 1 | 0 | 1 | 0 | 1 | 0 | 0 | |
| 6 | 1 | 0 | 1 | 0 | 0 | 1 | 1 | 0 | 1 | 0 | 1 | 1 | 1 | 1 | |
| 7 | 0 | 1 | 1 | 1 | 1 | 0 | 0 | 0 | 1 | 0 | 0 | 0 | 0 | 0 | |

TABLE 19-continued

| | Npilot = 7 | | | | | | | Npilot = 8 | | | | | | | |
|---|---|---|---|---|---|---|---|---|---|---|---|---|---|---|---|
| Bit # | 0 | 1 | 2 | 3 | 4 | 5 | 6 | 0 | 1 | 2 | 3 | 4 | 5 | 6 | 7 |
| 8 | 1 | 1 | 1 | 0 | 1 | 1 | 1 | 1 | 1 | 1 | 0 | 1 | 0 | 1 | 1 |
| 9 | 0 | 1 | 0 | 1 | 0 | 1 | 0 | 0 | 1 | 0 | 1 | 0 | 1 | 0 | 1 |
| 10 | 1 | 1 | 1 | 0 | 0 | 0 | 1 | 1 | 1 | 1 | 0 | 1 | 1 | 1 | 0 |
| 11 | 0 | 1 | 1 | 1 | 0 | 1 | 0 | 0 | 1 | 0 | 0 | 0 | 1 | 0 | 1 |
| 12 | 1 | 0 | 0 | 0 | 0 | 1 | 1 | 1 | 1 | 0 | 1 | 1 | 1 | 1 | 1 |
| 13 | 0 | 0 | 1 | 1 | 0 | 1 | 0 | 0 | 0 | 0 | 0 | 0 | 1 | 0 | 1 |
| 14 | 1 | 1 | 0 | 0 | 1 | 0 | 1 | 1 | 1 | 1 | 1 | 1 | 0 | 1 | 0 |

Alternatively, even bits may be inverted instead. For example, when $N_{pilot}=3$, another set of pilot bit pattern may be created as follows:

$$\overline{C}_{p1}^{1}(0), C_{p1}^{1}(1), \overline{C}_{p1}^{1}(2), C_{p1}^{2}(0), \overline{C}_{p1}^{2}(1), C_{p1}^{2}(2)$$
$$\overline{C}_{p1}^{3}(0), C_{p1}^{3}(1), \overline{C}_{p1}^{3}(2), \ldots$$

The example bit patterns are shown in Tables 20 and 21.

TABLE 20

| | Npilot = 3 | | | Npilot = 4 | | | | Npilot = 5 | | | | | Npilot = 6 | | | | | |
|---|---|---|---|---|---|---|---|---|---|---|---|---|---|---|---|---|---|---|
| Bit # | 0 | 1 | 2 | 0 | 1 | 2 | 3 | 0 | 1 | 2 | 3 | 4 | 0 | 1 | 2 | 3 | 4 | 5 |
| Slot #0 | 0 | 1 | 0 | 0 | 1 | 0 | 1 | 0 | 1 | 0 | 1 | 1 | 0 | 1 | 0 | 1 | 0 | 0 |
| 1 | 0 | 1 | 1 | 1 | 1 | 0 | 0 | 0 | 1 | 1 | 0 | 0 | 1 | 1 | 0 | 0 | 1 | 1 |
| 2 | 1 | 1 | 0 | 0 | 0 | 0 | 1 | 1 | 1 | 0 | 0 | 0 | 0 | 0 | 0 | 1 | 1 | 1 |
| 3 | 0 | 1 | 1 | 1 | 1 | 0 | 0 | 0 | 1 | 1 | 1 | 0 | 1 | 1 | 0 | 0 | 0 | 1 |
| 4 | 0 | 0 | 0 | 0 | 1 | 1 | 1 | 0 | 0 | 0 | 0 | 0 | 0 | 1 | 1 | 1 | 1 | 1 |
| 5 | 1 | 0 | 1 | 1 | 0 | 1 | 0 | 1 | 0 | 1 | 0 | 0 | 1 | 0 | 1 | 0 | 1 | 1 |
| 6 | 0 | 1 | 0 | 0 | 1 | 0 | 1 | 0 | 1 | 0 | 0 | 1 | 0 | 1 | 0 | 1 | 1 | 0 |
| 7 | 1 | 1 | 1 | 1 | 0 | 0 | 0 | 1 | 1 | 1 | 1 | 0 | 1 | 0 | 0 | 0 | 0 | 1 |
| 8 | 1 | 1 | 0 | 0 | 0 | 1 | 1 | 1 | 1 | 0 | 1 | 1 | 0 | 0 | 0 | 1 | 0 | 0 |
| 9 | 1 | 0 | 1 | 1 | 0 | 1 | 0 | 1 | 0 | 1 | 0 | 1 | 1 | 0 | 1 | 0 | 1 | 0 |
| 10 | 1 | 1 | 0 | 0 | 0 | 0 | 1 | 1 | 1 | 0 | 0 | 0 | 0 | 0 | 0 | 1 | 1 | 1 |
| 11 | 1 | 1 | 1 | 1 | 0 | 0 | 0 | 1 | 1 | 1 | 0 | 1 | 1 | 0 | 0 | 0 | 1 | 0 |
| 12 | 0 | 0 | 0 | 0 | 1 | 1 | 1 | 0 | 0 | 0 | 0 | 1 | 0 | 1 | 1 | 1 | 1 | 0 |
| 13 | 0 | 1 | 1 | 1 | 1 | 0 | 0 | 0 | 1 | 1 | 0 | 1 | 1 | 1 | 0 | 0 | 1 | 0 |
| 14 | 1 | 0 | 0 | 0 | 0 | 1 | 1 | 1 | 0 | 0 | 1 | 0 | 0 | 0 | 1 | 1 | 0 | 1 |

TABLE 21

| | Npilot = 7 | | | | | | | Npilot = 8 | | | | | | | |
|---|---|---|---|---|---|---|---|---|---|---|---|---|---|---|---|
| Bit # | 0 | 1 | 2 | 3 | 4 | 5 | 6 | 0 | 1 | 2 | 3 | 4 | 5 | 6 | 7 |
| Slot #0 | 0 | 1 | 0 | 1 | 0 | 0 | 0 | 0 | 1 | 0 | 1 | 0 | 1 | 0 | 0 |
| 1 | 1 | 1 | 0 | 0 | 1 | 1 | 1 | 1 | 1 | 1 | 1 | 1 | 0 | 1 | 1 |
| 2 | 0 | 0 | 0 | 1 | 1 | 1 | 0 | 0 | 0 | 0 | 1 | 0 | 0 | 0 | 1 |
| 3 | 1 | 1 | 0 | 0 | 0 | 1 | 1 | 1 | 1 | 1 | 1 | 1 | 1 | 1 | 1 |
| 4 | 0 | 1 | 1 | 1 | 1 | 0 | 0 | 0 | 1 | 0 | 0 | 0 | 0 | 0 | 1 |
| 5 | 1 | 0 | 1 | 0 | 1 | 1 | 1 | 1 | 0 | 1 | 0 | 1 | 0 | 1 | 1 |
| 6 | 0 | 1 | 0 | 1 | 1 | 0 | 0 | 0 | 1 | 0 | 1 | 0 | 0 | 0 | 0 |
| 7 | 1 | 0 | 0 | 0 | 0 | 1 | 1 | 1 | 0 | 1 | 1 | 1 | 1 | 1 | 1 |
| 8 | 0 | 0 | 0 | 1 | 0 | 0 | 0 | 0 | 0 | 0 | 1 | 0 | 1 | 0 | 0 |
| 9 | 1 | 0 | 1 | 0 | 1 | 0 | 1 | 1 | 0 | 1 | 0 | 1 | 0 | 1 | 0 |
| 10 | 0 | 0 | 0 | 1 | 1 | 1 | 0 | 0 | 0 | 0 | 1 | 0 | 0 | 0 | 1 |
| 11 | 1 | 0 | 0 | 0 | 1 | 0 | 1 | 1 | 0 | 1 | 1 | 1 | 0 | 1 | 0 |
| 12 | 0 | 1 | 1 | 1 | 1 | 0 | 0 | 0 | 1 | 0 | 0 | 0 | 0 | 0 | 0 |
| 13 | 1 | 1 | 0 | 0 | 1 | 0 | 1 | 1 | 1 | 1 | 1 | 1 | 0 | 1 | 0 |
| 14 | 0 | 0 | 1 | 1 | 0 | 1 | 0 | 0 | 0 | 0 | 0 | 0 | 1 | 0 | 1 |

Figure 12:
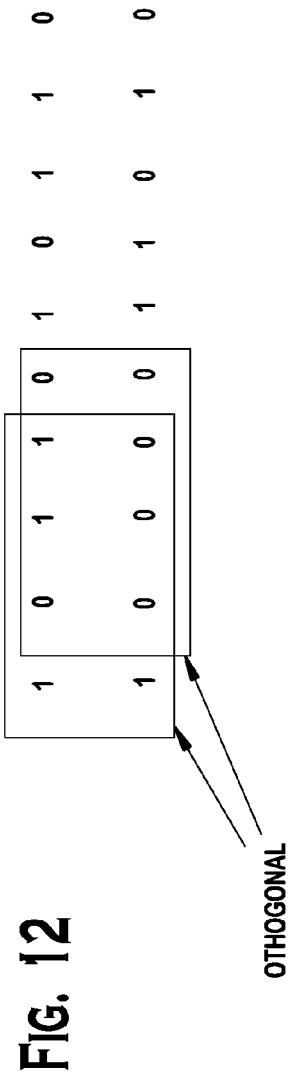
FIG. 12 shows an example of binary streams with a length 4.

The pair-wise orthogonality may be further generalized to have a bigger orthogonal block size. Any block of L consecutive bits may be orthogonal between the primary and secondary pilot sequences, where L may be any even number. FIG. 12 shows an example of binary streams with L=4.

For example, for L=4, a secondary pilot bit pattern may be generated as follows:

$$C_{p2}(n) = \begin{cases} C_{p1}(n) & \text{if } \mod(n, 4) = 0 \text{ or } 1 \\ \overline{C_{p1}(n)} & \text{if } \mod(n, 4) = 2 \text{ or } 3 \end{cases}, \quad \text{Equation (8)}$$

$$n = 0, 1, 2, \ldots, N_{pilot} - 1$$

where mod(x,4) presents the modulo 4 operation performed over variable x.

Different inverting patterns may be used and the orthogonality may be maintained across slot boundaries.

Channel estimation with the pairwise orthogonal pilots are disclosed hereafter. Without loss generality, an uplink TX diversity system with 2×1 antenna configuration will be used to illustrate channel estimation from the pilot bit patterns disclosed above when $N_{pilot}$ is odd numbered.

Figure 13:
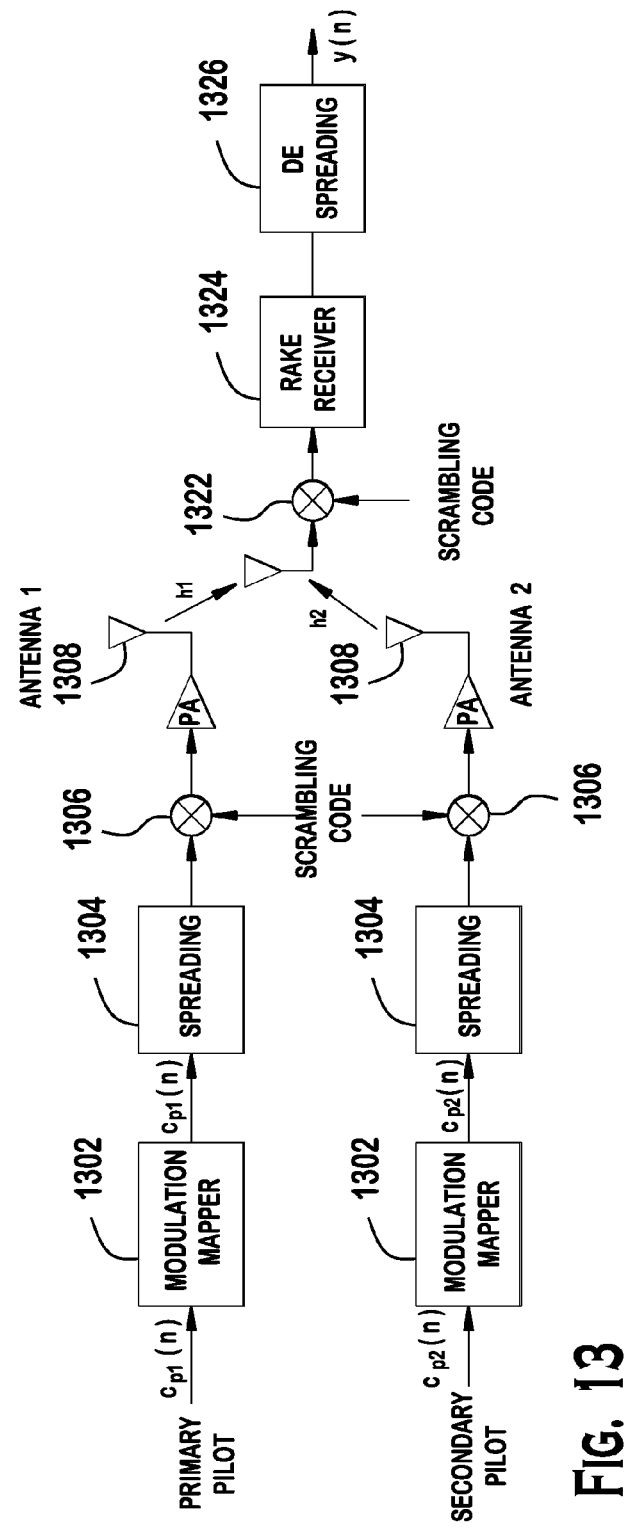
FIG. 13 shows an example pilot transmission in an uplink transmit diversity system.

FIG. 13 shows an example pilot transmission in an uplink TX diversity system. The primary and secondary pilots are separately mapped to symbols by modulation mappers 1302, (e.g., binary phase shift keying (BPSK) symbols), spread by spreading blocks 1304, and scrambled by scrambling blocks 1306 with scrambling code before sent to the two antennas 1308 for transmission. In the modulation mapping operation, the pilot bits in a slot may be mapped to BPSK symbols.

With the pair-wise orthogonality property, the secondary pilot symbols can be expressed as:

$$C_{p2}(n) = (-1)^n C_{p1}(n). \quad \text{Equation (9)}$$

At the receiver side, the received signal is processed by a descrambling block 1322, a rake receiver 1324, and a dispreading block 1326.

Concatenating the processing in the TX and RX chains, the signal at the output of the despreader may be written as follows:

$$y(n) = h_1(n)C_{p1}(n) + h_2(n)C_{p2}(n) + n(n) = h_1(n)C_{p1}(n) + h_2(n)(-1)^n C_{p1}(n) + n(n), \quad \text{Equation (10)}$$

where $h_1(n)$ and $h_2(n)$ are equivalent channel state information (CSI) for the propagation paths of antenna 1 and 2, respectively. $n(n)$ is the noise term.

For odd numbered $N_{pilot}$, two sets of averages may be performed when correlating with original pilot symbols to make use of all the symbols: one over the symbols ranging from 0 to $N_{pilot}-2$, and the other one from 1 to $N_{pilot}-1$. The channel estimation may be resulted from the pair-wise combining as follows:

$$\hat{h}_1(n) = \frac{1}{N_{pilot}-1} \sum_{n=0}^{N_{pilot}-2} y(n)C_{p1}(n) + \quad \text{Equation (11)}$$

$$\frac{1}{N_{pilot}-1} \sum_{n=1}^{N_{pilot}-1} y(n)C_{p1}(n)$$

$$= \frac{1}{N_{pilot}-1} \sum_{n=0}^{N_{pilot}-2} [(y(n)C_{p1}(n)] +$$

$$y(n+1)C_{p1}(n+1))$$

$$= \frac{1}{N_{pilot}-1} \sum_{n=0}^{N_{pilot}-2} [(h_1(n) + (-1)^n h_2(n)) +$$

$$(h_1(n) + (-1)^{n-1} h_2(n))] + n'(n)$$

$$= h_1(n) + n'(n),$$

where $h_1(n)$ is effectively separated from $h_2(n)$ and the estimation is unbiased.

Likewise for $h_2(n)$, $$\hat{h}_2(n) = \frac{1}{N_{pilot}-1} \sum_{n=0}^{N_{pilot}-2} y(n)C_{p2}(n) + \quad \text{Equation (12)}$$

$$\frac{1}{N_{pilot}-1} \sum_{n=1}^{N_{pilot}-1} y(n)C_{p2}(n)$$

$$= \frac{1}{N_{pilot}-1} \sum_{n=0}^{N_{pilot}-2} [(y(n)C_{p2}(n)] +$$

$$y(n+1)C_{p2}(n+1))$$

$$= \frac{1}{N_{pilot}-1} \sum_{n=0}^{N_{pilot}-2} [(h_2(n) + (-1)^n h_1(n)) +$$

$$(h_2(n) + (-1)^{n-1} h_1(n))] + n'(n)$$

$$= h_2(n) + n'(n).$$

For a 2×2 MIMO system, the similar operation may be applied to each of the signals received from two receive antennas to estimate the channel responses of $h_{11}(n)$, $h_{12}(n)$, $h_{21}(n)$, and $h_{22}(n)$.

Embodiments for pilot design for the secondary pilot channel, (e.g., S-DPCCH), with a different channelization code are disclosed hereafter.

When the S-DPCCH is mapped on a different channelization code than the primary DPCCH (P-DPCCH), the pilot sequence on the S-DPCCH may not be orthogonal to the pilot sequence on the P-DPCCH. Since the S-DPCCH quality may not be guaranteed at the NodeB receiver, only pilot symbols may be carried on the S-DPCCH. In such case, the S-DPCCH may carry 10 pilot symbols, regardless of the DPCCH slot format (assuming a spreading factor (SF) of 256).

Since pilot sequences of 10 symbols are not defined in the current specifications, a new 10 symbol long pilot sequence need to be defined for the S-DPCCH.

In one embodiment, the conventional pilot sequence for 8 symbols in Table 9 may be extended by 2 symbols by adding two non-FSW symbols. The two non-FSW symbols may be placed in any location. For example, the two additional non-FSW symbols may be added at each end of the sequence, as shown in Table 22. Alternatively, the two additional non-FSW symbols may be added at the end of the sequence, as shown in Table 23. Alternatively, the two additional non-FSW symbols may be added in the middle of the sequence, as shown in Table 24.

TABLE 22

| | | | | | $N_{pilot}=10$ | | | | | |
|---|---|---|---|---|---|---|---|---|---|---|
| Bit # | 0 | 1 | 2 | 3 | 4 | 5 | 6 | 7 | 8 | 9 |
| Pattern | I | I | $f_1$ | I | $f_2$ | I | $f_3$ | I | $f_4$ | I |
| Slot #0 | 1 | 1 | 1 | 1 | 1 | 1 | 1 | 1 | 0 | 1 |
| 1 | 1 | 1 | 0 | 1 | 0 | 1 | 1 | 1 | 0 | 1 |
| 2 | 1 | 1 | 0 | 1 | 1 | 1 | 0 | 1 | 1 | 1 |
| 3 | 1 | 1 | 0 | 1 | 0 | 1 | 0 | 1 | 0 | 1 |
| 4 | 1 | 1 | 1 | 1 | 0 | 1 | 0 | 1 | 1 | 1 |
| 5 | 1 | 1 | 1 | 1 | 1 | 1 | 1 | 1 | 0 | 1 |
| 6 | 1 | 1 | 1 | 1 | 1 | 1 | 0 | 1 | 0 | 1 |
| 7 | 1 | 1 | 1 | 1 | 0 | 1 | 0 | 1 | 0 | 1 |
| 8 | 1 | 1 | 0 | 1 | 1 | 1 | 1 | 1 | 0 | 1 |
| 9 | 1 | 1 | 1 | 1 | 1 | 1 | 1 | 1 | 1 | 1 |
| 10 | 1 | 1 | 0 | 1 | 1 | 1 | 0 | 1 | 1 | 1 |
| 11 | 1 | 1 | 1 | 1 | 0 | 1 | 1 | 1 | 1 | 1 |
| 12 | 1 | 1 | 1 | 1 | 0 | 1 | 0 | 1 | 0 | 1 |

TABLE 22-continued $N_{pilot} = 10$

| Bit # | 0 | 1 | 2 | 3 | 4 | 5 | 6 | 7 | 8 | 9 |
|---|---|---|---|---|---|---|---|---|---|---|
| 13 | 1 | 1 | 0 | 1 | 0 | 1 | 1 | 1 | 1 | 1 |
| 14 | 1 | 1 | 0 | 1 | 0 | 1 | 1 | 1 | 1 | 1 |

TABLE 23

$N_{pilot} = 10$

| Bit # | 0 | 1 | 2 | 3 | 4 | 5 | 6 | 7 | 8 | 9 |
|---|---|---|---|---|---|---|---|---|---|---|
| Pattern | I | $f_1$ | I | $f_2$ | I | $f_3$ | I | $f_4$ | I | I |
| Slot #0 | 1 | 1 | 1 | 1 | 1 | 1 | 1 | 0 | 1 | 1 |
| 1 | 1 | 0 | 1 | 0 | 1 | 1 | 1 | 0 | 1 | 1 |
| 2 | 1 | 0 | 1 | 1 | 1 | 0 | 1 | 1 | 1 | 1 |
| 3 | 1 | 0 | 1 | 0 | 1 | 0 | 1 | 0 | 1 | 1 |
| 4 | 1 | 1 | 1 | 0 | 1 | 0 | 1 | 1 | 1 | 1 |
| 5 | 1 | 1 | 1 | 1 | 1 | 1 | 1 | 0 | 1 | 1 |
| 6 | 1 | 1 | 1 | 1 | 1 | 0 | 1 | 0 | 1 | 1 |
| 7 | 1 | 1 | 1 | 0 | 1 | 0 | 1 | 0 | 1 | 1 |
| 8 | 1 | 0 | 1 | 1 | 1 | 1 | 1 | 0 | 1 | 1 |
| 9 | 1 | 1 | 1 | 1 | 1 | 1 | 1 | 1 | 1 | 1 |
| 10 | 1 | 0 | 1 | 1 | 1 | 0 | 1 | 1 | 1 | 1 |
| 11 | 1 | 1 | 1 | 0 | 1 | 1 | 1 | 1 | 1 | 1 |
| 12 | 1 | 1 | 1 | 0 | 1 | 0 | 1 | 0 | 1 | 1 |
| 13 | 1 | 0 | 1 | 0 | 1 | 1 | 1 | 1 | 1 | 1 |
| 14 | 1 | 0 | 1 | 0 | 1 | 1 | 1 | 1 | 1 | 1 |

TABLE 24

$N_{pilot} = 10$

| Bit # | 0 | 1 | 2 | 3 | 4 | 5 | 6 | 7 | 8 | 9 |
|---|---|---|---|---|---|---|---|---|---|---|
| Pattern | I | $f_1$ | I | $f_2$ | I | I | I | $f_3$ | I | $f_4$ |
| Slot #0 | 1 | 1 | 1 | 1 | 1 | 1 | 1 | 1 | 1 | 0 |
| 1 | 1 | 0 | 1 | 0 | 1 | 1 | 1 | 1 | 1 | 0 |
| 2 | 1 | 0 | 1 | 1 | 1 | 1 | 1 | 0 | 1 | 1 |
| 3 | 1 | 0 | 1 | 0 | 1 | 1 | 1 | 0 | 1 | 0 |
| 4 | 1 | 1 | 1 | 0 | 1 | 1 | 1 | 0 | 1 | 1 |
| 5 | 1 | 1 | 1 | 1 | 1 | 1 | 1 | 1 | 1 | 0 |
| 6 | 1 | 1 | 1 | 1 | 1 | 1 | 1 | 0 | 1 | 0 |
| 7 | 1 | 1 | 1 | 0 | 1 | 1 | 1 | 0 | 1 | 0 |
| 8 | 1 | 0 | 1 | 1 | 1 | 1 | 1 | 1 | 1 | 0 |
| 9 | 1 | 1 | 1 | 1 | 1 | 1 | 1 | 1 | 1 | 1 |
| 10 | 1 | 0 | 1 | 1 | 1 | 1 | 1 | 0 | 1 | 1 |
| 11 | 1 | 1 | 1 | 0 | 1 | 1 | 1 | 1 | 1 | 1 |
| 12 | 1 | 1 | 1 | 0 | 1 | 1 | 1 | 0 | 1 | 0 |
| 13 | 1 | 0 | 1 | 0 | 1 | 1 | 1 | 1 | 1 | 1 |
| 14 | 1 | 0 | 1 | 0 | 1 | 1 | 1 | 1 | 1 | 1 |

In another embodiment, the pilot sequence for the S-DPCCH may not make use of the frame synchronization word and a simple sequence of all 1's or all 0's may be used instead and may be kept constant between slots in a frame. The received SNR of the S-DPCCH may not directly be controlled by the inner loop power control (ILPC) and thus the NodeB may not make use of the FSW information in it for synchronization purposes.

Embodiments for using the second pilot for probing purposes are disclosed hereafter.

Data demodulation and precoding weight selection at the NodeB may impose different requirements on the channel estimation. The two pilots may be configured to serve different purposes for the case of single data stream transmission. The primary pilot carried in the primary DPCCH may be designed for obtaining high quality channel estimation for demodulating the data, while the pilot carried in the secondary DPCCH may be designed to probe the radio channel condition, for example, for selection of optimal precoding weight.

Figure 14:
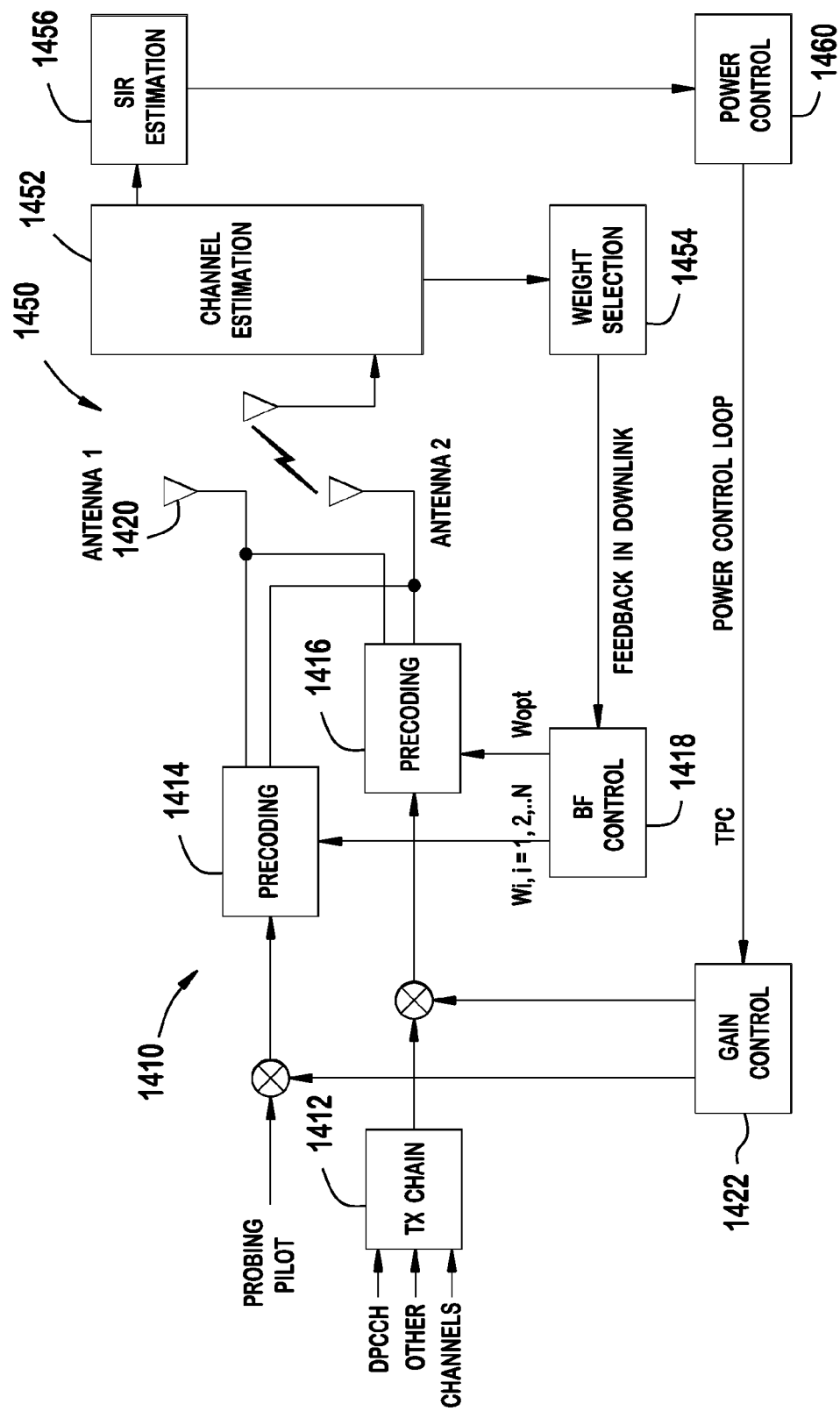
FIG. 14 shows utilizing probing pilots.

FIG. 14 shows utilizing probing pilots. At the transmitter 1410, a primary DPCCH (and other channels) is processed by the Tx chain 1412. Gains of the primary DPCCH (and other channels) and the probing pilot are controlled based on the TPC command from the power control block 1460 in the receiver 1450. The primary DPCCH (and other channels) and the probing pilot may be precoded by the precoding units 1414, 1416, respectively, and transmitted via antennas 1420. The channel estimation block 1452 in the receiver 1450 performs channel estimation using the primary pilot for demodulation of data, and performs channel estimation for precoding weight selection using the probing pilot. The weight selection function 1454 in the receiver 1450 selects an optimal weight vector and sends feedback to the transmitter 1410. The primary DPCCH is precoded by the optimal precoding weight, Wopt, which is output from the beam forming control function 1418, which is determined by the receiver according to channel state information obtained based on the probing pilot. The receiver determines the TPC command based on an SIR estimation estimated by the SIR estimation block 1456 and the power control block 1460 sends the TPC command to the transmitter 1410, which controls the gain at the transmitter 1410. The probing pilot may be transmitted in time-alternation over different precoding weights (or vectors) among all or subset of weights in the precoding codebook.

The beam forming control function 1418 as shown in the FIG. 14 is to control the precoding operation over the probing pilot to find the optimal precoding weights. It provides a pre-defined or channel-dependent probing pattern that sweeps through all the precoding vectors available in the codebook with time division multiplexing (TDM) fashion.

A codebook with a limited number of entries may be defined for the precoding weights. Let $w_i$, i=1, 2, . . . , N represent the precoding vectors, where N is the number of available the precoding vectors. For example, $w_1$ and $w_2$ may have following four vector values:

$$\begin{bmatrix} w_1 \\ w_2 \end{bmatrix} = \left\{ \begin{bmatrix} 1/\sqrt{2} \\ \frac{1+j}{2} \end{bmatrix}, \begin{bmatrix} 1/\sqrt{2} \\ \frac{1-j}{2} \end{bmatrix}, \begin{bmatrix} 1/\sqrt{2} \\ \frac{-1+j}{2} \end{bmatrix}, \begin{bmatrix} 1/\sqrt{2} \\ \frac{-1-j}{2} \end{bmatrix} \right\}. \quad \text{Equation (13)}$$

The antenna switching may be considered as a special case of the beam forming, where two following precoding vectors are used:

$$\begin{bmatrix} w_1 \\ w_2 \end{bmatrix} = \left\{ \begin{bmatrix} 1 \\ 0 \end{bmatrix}, \begin{bmatrix} 0 \\ 1 \end{bmatrix} \right\}. \quad \text{Equation (14)}$$

Figure 15:
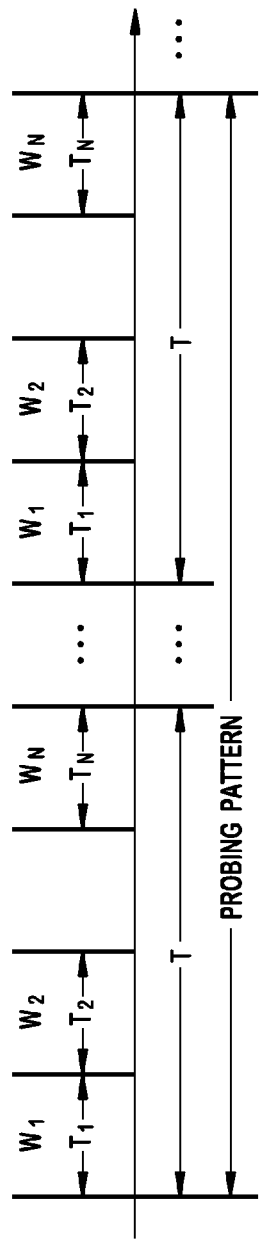
FIG. 15 shows an example of fixed length probing pattern.

In one embodiment, the length of the probing pilot may be fixed. Denote Ti, i=1, 2, . . . , N as the lengths of probing states during which the individual precoding vectors are used respectively. Ti, i=1, 2, . . . , N may be set to different values or be identical. The total duration of one probing cycle, T, is the sum of: $T=T_1+T_2+ \ldots T_N$. The unit of the time intervals may be time slot, transmission time interval (TTI), radio frame, or the like. The probing pattern may consist of one or multiple probing cycles as show in FIG. 15. FIG. 15 shows an example of fixed length probing pattern.

For example, the fixed length probing pattern may be implemented by switching precoding vectors every TTI for fast channel conditions. Each probing cycle may take different setting for its own duration T.

The fixed length probing pattern may be controlled by both the Node B and the WTRU. If the probing pattern is controlled by the WTRU, it may work autonomously and need to be synchronized with the Node B at the beginning so that the Node B is aware of which precoding vector is used according to the pre-determined probing pattern. For the synchronization between the Node B and the WTRU, the WTRU may send a signal to the Node B at L1 level to indicate the beginning of the probing cycle. Alternatively, the probing pilot may have different modulation patterns for each of the precoding vectors respectively. Alternatively, the probing pilot may use a different modulation pattern at the beginning of the probing cycle. Alternatively, the probing pilot may use a different modulation pattern at the end of the probing cycle.

If the probing pattern is controlled by the NodeB or higher layers, the probing pattern may be preconfigured and a periodic schedule or trigger may be used to initiate the sending of the pattern. If more control or flexibility is desired, the NodeB or higher layers may control which weight is sent at any given time. This may be done by signaling the specific weight to be used or by signaling which one of a set of pre defined probing patterns may be used. As with the case of a single probing pattern, the transmissions may be periodically scheduled or triggered (on demand).

In another embodiment, the receiver operation status may be taken into account in deciding whether to switch the precoding vector for the next probing state. Thus, the duration staying on one particular precoding vector may be variable depending on whether the required condition is met or not. Factors for triggering a switch include, but are not limited to, channel estimation quality from the probing pilot, the received power on the probing pilot, the WTRU speed, or the like.

To separate the primary and secondary DPCCHs, different channelization codes may be used to achieve the orthogonality between the DPCCHs.

In another embodiment, a different modulation pattern may be used on the probing pilot (e.g., secondary DPCCH) to distinguish the precoding vectors in transmission for synchronization purpose. 10 bit pilot patterns may be specified as shown in Tables 25 and 26.

TABLE 25

| | $N_{pilot} = 10$ | | | | | | | | | |
|---|---|---|---|---|---|---|---|---|---|---|
| Bit # | 0 | 1 | 2 | 3 | 4 | 5 | 6 | 7 | 8 | 9 |
| Slot #0 | 1 | 1 | 1 | 1 | 1 | 0 | 1 | 1 | 1 | 1 |
| 1 | 1 | 0 | 0 | 1 | 1 | 0 | 1 | 0 | 0 | 1 |
| 2 | 1 | 0 | 1 | 1 | 0 | 1 | 1 | 0 | 1 | 1 |

TABLE 25-continued

| | $N_{pilot} = 10$ | | | | | | | | | |
|---|---|---|---|---|---|---|---|---|---|---|
| Bit # | 0 | 1 | 2 | 3 | 4 | 5 | 6 | 7 | 8 | 9 |
| 3 | 1 | 0 | 0 | 1 | 0 | 0 | 1 | 0 | 0 | 1 |
| 4 | 1 | 1 | 0 | 1 | 0 | 1 | 1 | 1 | 0 | 1 |
| 5 | 1 | 1 | 1 | 1 | 1 | 0 | 1 | 1 | 1 | 1 |
| 6 | 1 | 1 | 1 | 1 | 0 | 0 | 1 | 1 | 1 | 1 |
| 7 | 1 | 1 | 0 | 1 | 0 | 0 | 1 | 1 | 0 | 1 |
| 8 | 1 | 0 | 1 | 1 | 1 | 0 | 1 | 0 | 1 | 1 |
| 9 | 1 | 1 | 1 | 1 | 1 | 1 | 1 | 1 | 1 | 1 |
| 10 | 1 | 0 | 1 | 1 | 0 | 1 | 1 | 0 | 1 | 1 |
| 11 | 1 | 1 | 0 | 1 | 1 | 1 | 1 | 1 | 0 | 1 |
| 12 | 1 | 1 | 0 | 1 | 0 | 0 | 1 | 1 | 0 | 1 |
| 13 | 1 | 0 | 0 | 1 | 1 | 1 | 1 | 0 | 0 | 1 |
| 14 | 1 | 0 | 0 | 1 | 1 | 1 | 1 | 0 | 0 | 1 |

TABLE 26

| | $N_{pilot} = 10$ | | | | | | | | | |
|---|---|---|---|---|---|---|---|---|---|---|
| Bit # | 0 | 1 | 2 | 3 | 4 | 5 | 6 | 7 | 8 | 9 |
| Slot #0 | 0 | 1 | 0 | 1 | 0 | 0 | 0 | 1 | 0 | 1 |
| 1 | 0 | 0 | 1 | 1 | 0 | 0 | 0 | 0 | 1 | 1 |
| 2 | 0 | 0 | 0 | 1 | 1 | 1 | 0 | 0 | 0 | 1 |
| 3 | 0 | 0 | 1 | 1 | 1 | 0 | 0 | 0 | 1 | 1 |
| 4 | 0 | 1 | 1 | 1 | 1 | 1 | 0 | 1 | 1 | 1 |
| 5 | 0 | 1 | 0 | 1 | 0 | 0 | 0 | 1 | 0 | 1 |
| 6 | 0 | 1 | 0 | 1 | 1 | 0 | 0 | 1 | 0 | 1 |
| 7 | 0 | 1 | 1 | 1 | 1 | 0 | 0 | 1 | 1 | 1 |
| 8 | 0 | 0 | 0 | 1 | 0 | 0 | 0 | 0 | 0 | 1 |
| 9 | 0 | 1 | 0 | 1 | 0 | 1 | 0 | 1 | 0 | 1 |
| 10 | 0 | 0 | 0 | 1 | 1 | 1 | 0 | 0 | 0 | 1 |
| 11 | 0 | 1 | 1 | 1 | 0 | 1 | 0 | 1 | 1 | 1 |
| 12 | 0 | 1 | 1 | 1 | 1 | 0 | 0 | 1 | 1 | 1 |
| 13 | 0 | 0 | 1 | 1 | 0 | 1 | 0 | 0 | 1 | 1 |
| 14 | 0 | 0 | 1 | 1 | 0 | 1 | 0 | 0 | 1 | 1 |

The secondary set of probing pilot in Table 26 is orthogonal to the primary probing pilot set in Table 25, which can be used to identify the beginning of the probing mode.

In another embodiment, the probing pilot patterns may not be time slot specific. Instead, the bit patterns may be associated to different precoding vectors. Tables 27 and 28 show example precoding specific probing pilot patterns with different number pilot bits.

TABLE 27

| | $N_{pilot} = 3$ | | | $N_{pilot} = 4$ | | | |
|---|---|---|---|---|---|---|---|
| precoding vector | 0 | 1 | 2 | 0 | 1 | 2 | 3 |
| W1 | 1 | 1 | 1 | 1 | 1 | 1 | 1 |
| W2 | 0 | 0 | 1 | 1 | 0 | 0 | 1 |
| W3 | 0 | 1 | 1 | 1 | 0 | 1 | 1 |
| W4 | 1 | 0 | 1 | 1 | 1 | 0 | 1 |

TABLE 28

| | $N_{pilot} = 5$ | | | | | $N_{pilot} = 6$ | | | | | | $N_{pilot} = 7$ | | | | | | | $N_{pilot} = 8$ | | | | | | | |
|---|---|---|---|---|---|---|---|---|---|---|---|---|---|---|---|---|---|---|---|---|---|---|---|---|---|
| Precoding vector | 0 | 1 | 2 | 3 | 4 | 0 | 1 | 2 | 3 | 4 | 5 | 0 | 1 | 2 | 3 | 4 | 5 | 6 | 0 | 1 | 2 | 3 | 4 | 5 | 6 | 7 |
| W1 | 0 | 0 | 1 | 0 | 0 | 1 | 0 | 0 | 1 | 0 | 0 | 1 | 0 | 0 | 1 | 0 | 0 | 1 | 1 | 0 | 1 | 0 | 1 | 0 | 1 | 0 |
| W2 | 0 | 0 | 1 | 0 | 1 | 1 | 0 | 0 | 1 | 0 | 1 | 1 | 0 | 0 | 1 | 0 | 1 | 1 | 1 | 0 | 1 | 0 | 1 | 0 | 1 | 1 |
| W3 | 0 | 0 | 1 | 1 | 0 | 1 | 0 | 0 | 1 | 1 | 0 | 1 | 0 | 0 | 1 | 1 | 0 | 1 | 1 | 0 | 1 | 0 | 1 | 1 | 1 | 0 |
| W4 | 0 | 0 | 1 | 1 | 1 | 1 | 0 | 0 | 1 | 1 | 1 | 1 | 0 | 0 | 1 | 1 | 1 | 1 | 1 | 0 | 1 | 0 | 1 | 1 | 1 | 1 |
| W5 | 0 | 1 | 1 | 0 | 0 | 1 | 0 | 1 | 1 | 0 | 0 | 1 | 0 | 1 | 1 | 0 | 0 | 1 | 1 | 0 | 1 | 1 | 1 | 0 | 1 | 0 |
| W6 | 0 | 1 | 1 | 0 | 1 | 1 | 0 | 1 | 1 | 0 | 1 | 1 | 0 | 1 | 1 | 0 | 1 | 1 | 1 | 0 | 1 | 1 | 1 | 0 | 1 | 1 |
| W7 | 0 | 1 | 1 | 1 | 0 | 1 | 0 | 1 | 1 | 1 | 0 | 1 | 0 | 1 | 1 | 1 | 0 | 1 | 1 | 0 | 1 | 1 | 1 | 1 | 1 | 0 |

TABLE 28-continued

| | $N_{pilot}=5$ | | | | | $N_{pilot}=6$ | | | | | | $N_{pilot}=7$ | | | | | | | $N_{pilot}=8$ | | | | | | | |
|---|---|---|---|---|---|---|---|---|---|---|---|---|---|---|---|---|---|---|---|---|---|---|---|---|---|---|
| Precoding vector | 0 | 1 | 2 | 3 | 4 | 0 | 1 | 2 | 3 | 4 | 5 | 0 | 1 | 2 | 3 | 4 | 5 | 6 | 0 | 1 | 2 | 3 | 4 | 5 | 6 | 7 |
| W8  | 0 | 1 | 1 | 1 | 1 | 1 | 0 | 1 | 1 | 1 | 1 | 1 | 0 | 1 | 1 | 1 | 1 | 1 | 1 | 0 | 1 | 1 | 1 | 1 | 1 | 1 |
| W9  | 1 | 0 | 1 | 0 | 0 | 1 | 1 | 0 | 1 | 0 | 0 | 1 | 1 | 0 | 1 | 0 | 0 | 1 | 1 | 1 | 1 | 0 | 1 | 0 | 1 | 0 |
| W10 | 1 | 0 | 1 | 0 | 1 | 1 | 1 | 0 | 1 | 0 | 1 | 1 | 1 | 0 | 1 | 0 | 1 | 1 | 1 | 1 | 1 | 0 | 1 | 0 | 1 | 1 |
| W11 | 1 | 0 | 1 | 1 | 0 | 1 | 1 | 0 | 1 | 1 | 0 | 1 | 1 | 0 | 1 | 1 | 0 | 1 | 1 | 1 | 1 | 0 | 1 | 1 | 1 | 0 |
| W12 | 1 | 0 | 1 | 1 | 1 | 1 | 1 | 0 | 1 | 1 | 1 | 1 | 1 | 0 | 1 | 1 | 1 | 1 | 1 | 1 | 1 | 0 | 1 | 1 | 1 | 1 |
| W13 | 1 | 1 | 0 | 0 | 0 | 1 | 1 | 1 | 0 | 0 | 0 | 1 | 1 | 1 | 0 | 0 | 0 | 1 | 1 | 1 | 1 | 1 | 0 | 1 | 0 |   |
| W14 | 1 | 1 | 1 | 0 | 1 | 1 | 1 | 1 | 1 | 0 | 1 | 1 | 1 | 1 | 1 | 0 | 1 | 1 | 1 | 1 | 1 | 1 | 1 | 0 | 1 | 1 |
| W15 | 1 | 1 | 1 | 1 | 0 | 1 | 1 | 1 | 1 | 1 | 0 | 1 | 1 | 1 | 1 | 1 | 1 | 0 | 1 | 1 | 1 | 1 | 1 | 1 | 1 | 0 |
| W16 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

In Table 28, a total of 16 precoding vectors are considered. If actual number of precoding vectors is smaller than 16, any subset of them may be used, or one precoding vector may be associated with multiple pilot patterns. In case all of the 10 bits in the second DPCCH are used for the probing pilot, the rest of bit fields not specified in the tables may be set to '1.'

Although the pilot patterns disclosed above are designed in context of probing pilot, it should be understood that the concepts may be generalized to other cases.

If it is not necessary to run the probing pattern every moment, (e.g., in slow fading channel conditions), the probing pilot may be disabled to reduce the signaling overhead. In such case, the probing pilot may be DTXed or stopped from transmission. Disabling and enabling the probing pilot may be implemented via new HS-SCCH orders or other specially designed L1 signaling in downlink.

The gain control function 1422 in FIG. 14 receives the TPC commands and performs the power control on the primary DPCCH and the probing pilot. Because the channel estimation quality requirement is not as high for the probing pilot, a smaller transmit power may be allocated to the probing pilot in order to reduce the signal overhead. To be able to perform the power control separately, the probing pilot signal may not go through the gain path in the power control loop that is used by the rest of the physical channels. Instead, the probing pilot signal may have its own gain control. The gain control function 1422 may generate two gain factors: the gain factor (g) that controls the transmit power of the DPCCH and all other physical channels that uses the DPCCH as the power reference, and the gain factor ($g_{prob}$) for the probing pilot. The DPCCH transmit power is adjusted by the power control procedure as in equation (1). In one embodiment, the gain factor for the probing pilot may be calculated by:

$$g_{prob}(n) = A_{prob} g(n), \quad \text{Equation (15)}$$

where $A_{prob}$ is a power offset signaled by the network and n is a time slot index.

This gain factor may be dynamic as a TPC command is received on a per time slot basis. If the transmit power is tied up to the power control loop on a per time slot basis, the fluctuation in the transmit power in probing pilot may impact the fairness of the precoding weight selection at the Node B receiver because the sweeping of the precoding vector may be conducted on a TDM basis. In order to alleviate this issue, the gain freeze mechanism may be used.

The gain freeze operation may be formulated by:

$$g_{prob}(n) = A_{prob} g(n_0), \quad \text{Equation (16)}$$

such that $g_{prob}$ is kept constant at the value specified at moment no, rather than following g on every time slot basis. $n_0$ may be the slot index of time slots at the beginning of every probing cycle. Alternatively, $n_0$ may be the slot index of time slots at beginning of probing pattern. Alternatively, $n_0$ may be the slot index of k-th time slots within every probing cycle, where k may be an integer value from 1 to N. Alternatively, no may be the slot index of k-th time slots within every probing pattern, where k may be an integer value from 1 to the end of the probing pattern.

In another embodiment, $g_{prob}$ may be tied up to g with a fixed ratio on a per slot basis. In order to compensate the variation caused by the power control procedure, the TPC commands may be tracked and recorded, e.g., starting from the beginning of the probing pattern. A result following adjustment needs to be factored into the decision of the optimum precoding vector:

$$\Delta_{pi} = \Delta_{TPC} \times \sum_{n \in n_1 \text{to} n_i} TPC(n), \quad i = 1, 2, \ldots, N, \quad \text{Equation (17)}$$

where i is the index of the precoding vectors, $n_1$ is the index of starting time slot of the probing cycle, and $n_i$ is the index of ending time slot for the precoding vector i. The above offset is calculated in terms of dB in scale.

Alternatively, the probing pilot may be tied to g and the gain of the probed pre-coded channel may be measured relative to the current pre-coded channel. Since the significant measurements are when the probing pilot pre-coding is providing better channel gain than the currently chosen pre-coding, this is true because the NodeB is interested in improving the channel quality.

Embodiments for non-codebook based probing scheme is disclosed hereafter. FIG. 16 shows an example non-codebook based closed-loop transmit beamforming scheme. In FIG. 16, DPCCH1 and other uplink channels (e.g., E-DPDCH, E-DPCCH, DPDCH, and HS-DPCCH) are precoded with a vector 1 by a precoding block 1602, and the probing pilot channel DPCCH2 is precoded with a vector 2 by a precoding block 1604, which has a phase change with respect to precoding vector 1 applied on DPCCH1 and other uplink channels. The phase change may be either a positive or a negative value and may vary in a time alternative fashion. Define precoding vector 1 $w_1 = [w_{11}\ w_{21}]^T$ and precoding vector 2 $w_2 = [w_{12}\ w_{22}]^T$ and $w_2 \in \{w_1 \otimes [1\ e^{j\Delta}]^T, w_1 \otimes [1\ e^{-j\Delta}]^T\}$, where $\otimes$ denotes Kronecker product. The precoded components from the precoding blocks 1602 and 1604 are added by combiners 1606, 1608 and sent to corresponding antennas.

Based on the measurements on both DPCCHs, the NodeB may signal the WTRU a new precoding vector to be applied on DPCCH1, which may be $w_1, w_1 \otimes [1\ e^{j\Delta}]^T, w_1 \otimes [1\ e^{-j\Delta}]^T$, where $w_1$ denotes the current precoding vector applied on DPCCH1. Therefore, in the downlink, the NodeB may use 1-bit three-value signalling (DTX, +1, and −1) to indicate the WTRU for the next precoding vector to be applied on DPCCH1, (i.e., no phase change, positive phase change, and negative phase change), with respect to the current or most recently used precoding vector on DPCCH1. The phase change Δ may be changed semi-dynamically and signalled to the WTRU by the NodeB via higher layers.

Embodiments for operations during compressed mode gaps are disclosed hereafter. Compressed mode gaps are periods during which the WTRU receiver is re-tuned to a different frequency to perform intra-frequency, inter-frequency, and/or inter-radio access technology (RAT) measurements. During these gaps, the WTRU may not receive power control or precoding weight information from the serving NodeB.

In one embodiment, during the compressed mode gaps, the WTRU may maintain its pre-coding weights, such that upon resuming the WTRU is in a known state.

When DTX operations are configured, or when a specific DTX pattern is configured for the second pilot, the WTRU may not transmit the second pilot for some time after the WTRU resumes from the compressed mode gap. Without the second pilot (or alternatively without the means for channel sounding), the NodeB may not properly estimate the channel and determine the best precoding weights to use. In such cases, the WTRU may operate with non-optimal precoding weights, leading to a temporary loss of performance. To avoid such performance impairment, upon resuming from the compressed mode gap, the WTRU may transmit the second pilot (or alternatively the sounding channels) for a period of time sufficient for the NodeB to make proper channel measurement, and then the WTRU listens for the downlink weight update information.

For a WTRU that is configured in closed-loop transmit diversity (CLTD) mode, when the compressed mode is enabled, due to the introduction of the second DPCCH, the length of the pilot bit of the second DPCCH with respect to that of the first DPCCH has an impact on uplink transmit power control. Embodiments for assigning the pilot bit length of the second DPCCH and corresponding power control procedures are disclosed hereafter.

In one embodiment, the second DPCCH may be assigned the same length of pilot bits as the first DPCCH. Therefore, compressed and non-compressed frames in the uplink second DPCCH may have a different number of pilot bits per slot. The WTRU may derive the second DPCCH power offset $\Delta_{pilot}^{s\text{-}dpcch}$ in dB as follows:

$$\Delta_{pilot}^{s\text{-}dpcch} = 10 \log_{10}\left(\frac{N_{pilot,prev}^{s\text{-}dpcch}}{N_{pilot,curr}^{s\text{-}dpcch}}\right),$$ Equation (18)

where $N_{pilot,prev}^{s\text{-}dpcch}$ is the number of the second DPCCH pilot bits in the most recently transmitted slot, and $N_{pilot,curr}^{s\text{-}dpcch}$ the number of the second DPCCH pilot bits in the current slot. In each slot the WTRU may adjust the transmit power of the second DPCCH as follows:

$$\Delta_{s\text{-}dpcch} = \Delta_{TPC} \times TPC\_cmd + \Delta_{pilot}^{s\text{-}dpcch}.$$ Equation (19)

This embodiment may not require signalling a new power ratio between the first DPCCH and the second DPCCH in a compressed mode. In addition, this power ratio after power control may be maintained as in most cases, $\Delta_{pilot}^{s\text{-}dpcch} = \Delta_{pilot}$ such that $\Delta_{dpcch} = \Delta_{s\text{-}dpcch}$, which means no explicit calculation of $\Delta_{pilot}^{s\text{-}dpcch}$ and $\Delta_{s\text{-}dpcch}$ may be performed.

In another embodiment, the second DPCCH may have a fixed length of pilot bits, independent of the compressed mode configuration. For example, the second DPCCH may use the slot format 8 in Table 2 in both non-compressed mode and compressed mode. In this case, there is no change of the number of pilot bits of the second DPCCH, i.e., $\Delta_{pilot}^{s\text{-}dpcch}=0$ and therefore $\Delta_{s\text{-}dpcch}=\Delta_{TPC} \times TPC\_cmd$. On the other hand, the TPC_cmd may be generated based on the first DPCCH whose length of the pilot bits may change between a non-compressed mode and a compressed mode. In order to reuse the conventional power control for non-Tx diversity WTRU in a compressed mode, when a WTRU is operating in a compressed mode the network may signal a new power ratio of the first DPCCH and the second DPCCH, which may be different from the power ratio when the WTRU is operating in a non-compressed mode. In this way, the required transmit power on the second DPCCH may be adjusted. The power ratio of the first DPCCH and the second DPCCH may change after power control but the NodeB may know the change thus there will be no impact on weight generation at the NodeB receiver.

In another embodiment, the WTRU may maintain the same ratio of pilot power between the first DPCCH and the second DPCCH. If, during a compressed mode, the number of pilots on the first DPCCH and the first DPCCH power changes, the WTRU may apply a power offset to the second DPCCH to maintain the ratio of total second DPCCH pilot power to total first DPCCH pilot power the same.

The normal second DPCCH to first DPCCH gain factor may be configured by the network and is calculated as follows:

$$\beta_{sc} = \beta_c A_{sc},$$ Equation (20)

where $\beta_c$ is signalled or calculated using the conventional way and $A_{sc}$, is the quantized amplitude ratio for the second DPCCH signalled by the network. In a non-compressed mode, the WTRU may use this gain factor for the second DPCCH. Assume that the number of pilot symbols in one slot in a normal mode for the first DPCCH and the second DPCCH are $N_{pilot}$ and $N_{sc,pilot}$, respectively, and that in a compressed mode, the number of pilot symbols in one slot in the first DPCCH and the second DPCCH are $N_{pilot}^{CM}$ and $N_{sc,pilot}^{CM}$, respectively.

The number of pilot symbols in the second DPCCH may remain constant regardless of the mode (normal or compressed mode) such that $N_{sc,pilot}^{CM}=N_{sc,pilot}$. Alternatively, the number of pilot symbols between the second DPCCH and the first DPCCH may be the same in each mode, that is $N_{pilot}=N_{sc,pilot}$ and $N_{sc,pilot}^{CM}=N_{sc,pilot}^{CM}$.

When the WTRU is in a compressed mode, the gain factor for the second DPCCH ($\beta_{sc}^{CM}$) may be calculated as follows:

$$\beta_{sc}^{CM} = \beta_{c,C,j} A_{sc} \sqrt{\frac{N_{sc,pilot}}{N_{sc,pilot}^{CM}} \times \frac{N_{pilot}^{CM}}{N_{pilot}}},$$ Equation (21)

where $\beta_{c,C,j}$ is calculated in the conventional way.

If the number of pilots in the second DPCCH does not change when in a compressed mode, the first term in the square root in equation (21) becomes one and the gain factor for the second DPCCH in a compressed mode may be calculated by the WTRU as follows:

$$\beta_{sc}^{CM} = \beta_{c,C,j} A_{sc} \sqrt{\frac{N_{pilot}^{CM}}{N_{pilot}}}.$$ Equation (22)

When the number of pilot symbols between the second DPCCH and first DPCCH are the same in each mode, the WTRU may calculate the gain factor during the compressed mode as follows:

$$\beta_{sc}^{CM} = \beta_{c,C,j} A_{sc}.$$ Equation (23)

Embodiments for discontinuous uplink DPCCH operations for the WTRU configured with two DPCCHs in the uplink multi-antenna transmission, such as CLTD or MIMO, are disclosed hereafter. With these embodiments, the WTRU power consumption and overhead from L1 control signaling (i.e., DPCCH) and interference in the uplink would be reduced. The uplink first and second DPCCH burst patterns and the uplink first and second DPCCH preambles and postambles comprise the DTX operations.

DTX of DPCCHs may be controlled on an antenna basis. In one embodiment, a single UL DTX state variable, UL_DTX_Active=UL_DTX_Active(i), where i=1, 2, may be maintained and evaluated for two antennas. The common UL_DTX_Active may be used for the WTRU regardless of the number of DPCCHs configured. In another embodiment, a separate UL DTX state variable may be maintained and evaluated per antenna. UL_DTX_Active(i) is the UL DTX state variable for the i-th antenna which the i-th uplink DPCCH is transmitted from.

The control of the two DPCCH DTX operations may be performed per-antenna. When UL_DTX_Active(i) is TRUE, the WTRU may not transmit the i-th uplink DPCCH in a slot on an i-th antenna when all of the following conditions are met for that antenna: (1) there is no HARQ-ACK transmission on an HS-DPCCH overlapping with the i-th uplink DPCCH slot, (2) there is no CQI transmission on an HS-DPCCH as indicated overlapping with the i-th uplink DPCCH slot, (3) there is no E-DCH transmission during the i-th uplink DPCCH slot, (4) the slot is in a gap in the i-th uplink DPCCH burst pattern, and (5) the i-th uplink DPCCH preamble or postamble is not transmitted in the slot.

Alternatively, the control of the two DPCCH DTX operations may be common across two antennas. When UL_DTX_Active(i) is TRUE for i=1 and 2, the WTRU may transmit neither the first DPCCH nor the second DPCCH when all conditions (1)-(5) above are met for both antennas.

DTX of DPCCHs may be controlled on a DPCCH basis. In one embodiment, a single UL DTX state variable, UL_DTX_Active=UL_DTX_Active(i), where i=1, 2, may be maintained and evaluated for two DPCCHs, (i.e., a common UL_DTX_Active state variable is used for two DPCCHs). In another embodiment, a separate UL DTX state variable is maintained and evaluated for each DPCCH. UL_DTX_Active(i) is the UL DTX state variable for the i-th uplink DPCCH.

The control of the two DPCCH DTX operations may be performed per-DPCCH. When UL_DTX_Active(i) is TRUE, the WTRU may not transmit the i-th uplink DPCCH in a slot on one or two antennas when all the conditions (1)-(5) above are met for that antenna.

Alternatively, the control of two DPCCH DTX operations may be common across two DPCCHs. When UL_DTX_Active(i) is TRUE for i=1 and 2, the WTRU may transmit neither the first DPCCH nor the second DPCCH when all the conditions (1)-(5) above are met for both DPCCHs.

Embodiments for UL first and second DPCCH burst patterns are disclosed hereafter.

In one embodiment, a common DPCCH burst pattern may be applied to both first and second DPCCHs, (i.e., the second DPCCH burst pattern is the same as the first DPCCH burst pattern).

In another embodiment, the first and second DPCCH burst patterns may be independently configured, i.e., the second DPCCH burst patterns may be the same as, or different from, the first DPCCH burst pattern.

The following parameters may be configured on a per DPCCH basis to derive the first and second DPCCH burst patterns. For the i-th UL DPCCH, where i=1, 2, UE_DTX_cycle_1(i) is the i-th uplink DPCCH burst pattern length in subframes, and UE_DTX_cycle_2(i) is the i-th uplink DPCCH burst pattern length in subframes. Inactivity_Threshold_for_UE_DTX_cycle_2(i) defines the number of consecutive E-DCH TTIs without an E-DCH transmission, after which the WTRU may move from UE_DTX_cycle_1(i) to UE_DTX_cycle_2(i). UE_DPCCH_burst_1(i) determines the i-th uplink DPCCH burst length in subframes, when UE_DTX_cycle_1(i) is applied. UE_DPCCH_burst_2(i) determines the i-th uplink DPCCH burst length in subframes, when UE_DTX_cycle_2(i) is applied. UE_DTX_DRX Offset(i) is the i-th uplink DPCCH burst pattern and HS-SCCH reception pattern offset in subframes.

In another embodiment, the first and second DPCCH burst patterns may be defined such that the DPCCH bursts in two DPCCH burst patterns are transmitted in a TDM fashion by configuring different UE_DTX_DRX Offset(i) for two DPCCH burst patterns, where i=1 and 2. This embodiment may be useful for the case that the HS-DPCCH is transmitted with the first DPCCH burst pattern on the first antenna which may not require the transmission of the second DPCCH burst pattern at the same time. It may also be useful for antenna switching transmit diversity. FIGS. 15(A) and 15(B) show examples of two uplink DPCCH burst patterns with different UE_DTX_DRX_Offset. In FIG. 17(A), the first uplink DPCCH burst pattern for 2 ms E-DCH TTI begins at CFN=1 with UE_DTX_DRX_Offset(1)=6. In FIG. 17(B), the second uplink DPCCH burst pattern for 2 ms E-DCH TTI begins at CFN=2 with UE_DTX_DRX_Offset(2)=7.

When the DPCCH-only transmission, the E-DCH transmission, or the HS-DPCCH transmission is carried on the same antenna as the i-th uplink DPCCH preamble and postamble, the same configuration may be applied for both first and second DPCCH preambles and postambles. Alternatively, the parameters for the first and second DPCCH preambles and postambles may be individually configured. For example, the length of the preamble associated with the UE_DTX_cycle_2(i) in slot may be individually configured on a per-DPCCH basis, (i.e., UE_DTX_long_preamble_length(i) may be the same or different for i=1 and 2).

Embodiments for physical random access channel (PRACH) transmissions are disclosed hereafter.

Figure 18:
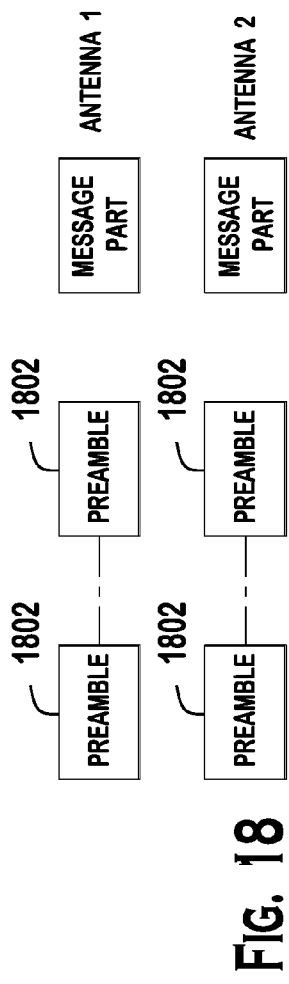
FIG. 18 shows an example physical random access channel (PRACH) transmission with two transmit antennas in accordance with this embodiment.

When a WTRU is equipped with two transmit antennas, the WTRU may transmit the same bits with equal power from the two antennas. FIG. 18 shows an example PRACH transmission with two transmit antennas in accordance with this embodiment. In FIG. 18, the same RACH preamble bits 1802 are transmitted with equal power from the two antennas.

The slot and frame structure of the message part on the second antenna may be the same as the one on the first antenna. The message part comprises a data part and a control part (pilot bits and TFCI bits). The same data part bits may be transmitted with equal power from the two antennas. The repetition transmission may be applied to the TFCI bits of the control part as well. The pilot bits of the control part transmitted on the second antenna may be the same as the pilot bits transmitted on the first antenna.

In another embodiment, the transmission on the second antenna may be DTXed, and the PRACH preamble and message part may be transmitted on the first antenna.

Figure 19:
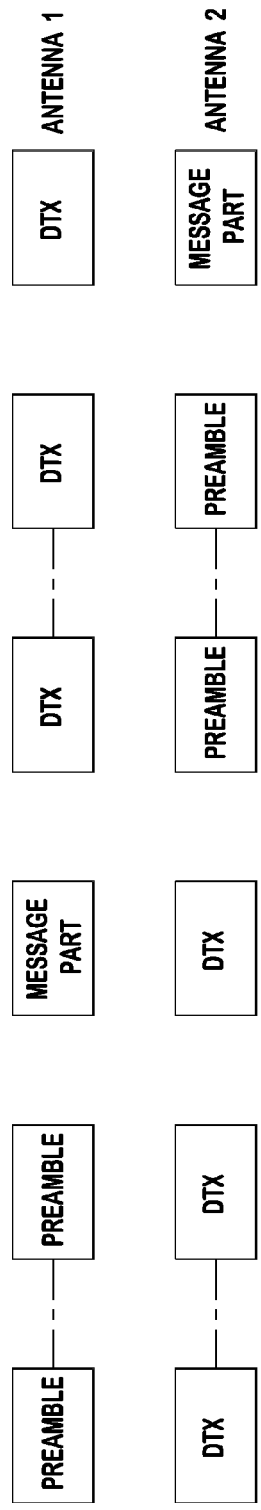
FIG. 19 shows an example transmission of PRACH using antenna switching.

In another embodiment, an antenna switching scheme may be applied to PRACH. FIG. 19 shows an example transmission of PRACH using antenna switching. The PRACH preamble and message part are transmitted on a first antenna on one transmission, and on a second antenna on the next transmission as shown in FIG. 19.

Figure 20:
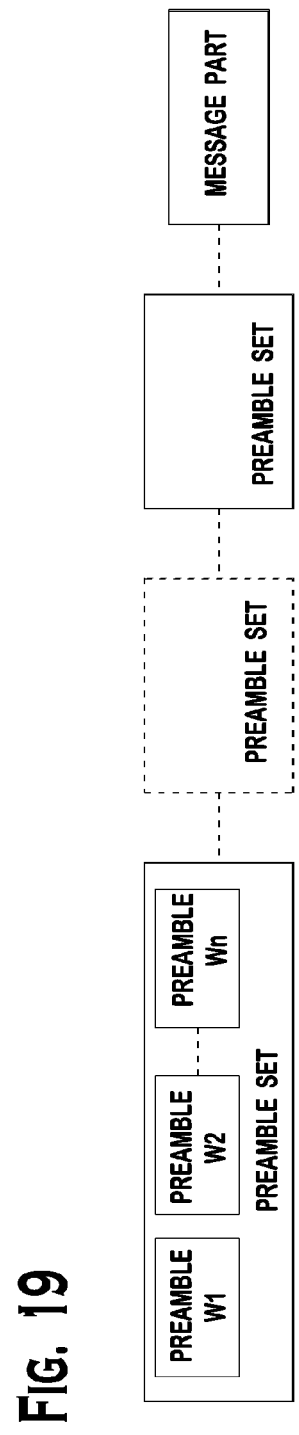
FIG. 20 shows an example PRACH transmission applying beamforming.

In another embodiment, beamforming may be applied to the PRACH transmissions. FIG. 20 shows an example PRACH transmission applying beamforming. The WTRU transmits the PRACH preamble repeatedly if no acknowledgement is received. The WTRU applies different beamforming weights to each preamble transmissions. The WTRU may transmit the preambles at the same power for each weight before ramping the preamble power. In this way, the WTRU may learn both the proper transmission power and beamforming weight for the RACH transmission.

Alternatively, the WTRU may ramp up the preamble transmit power on each preamble transmission regardless of which weight is used. The ramp step size may be adjusted to provide a better compromise in time to transmission and correct beamforming weight/power. The order in which the weights (W1, W2, . . . Wn) are applied and which weights are transmitted may be optimized.

Embodiments for handling maximum power are disclosed hereafter. When the required transmit power exceeds the maximum allowed transmit power, the WTRU may scale back the transmit power on the uplink physical channels. To reduce the control channel overhead, the second DPCCH may be DTXed or gated periodically. Hereafter, the power scaling refers to the power measured before precoding.

In one embodiment, the conventional power scaling rule may be used if the second DPCCH is not transmitted in the upcoming slot. If the second DPCCH is transmitted in the upcoming slot, equal scaling may be applied on two DPCCHs before precoding. In other words, the two DPCCHs are treated as a single or bundled DPCCH from the power scaling perspective when applying the conventional power scaling rule. In this embodiment, there is no need to signal in the uplink the power ratios between the two DPCCHs for the NodeB to recover the non-precoded channel for the purpose of weight generation.

In another embodiment, two DPCCHs may be sequentially scaled down after scaling down data channels. If the total WTRU transmit power exceeds the maximum allowed value, data channels are scaled down up to an allowed minimum. If the total WTRU transmit power still exceeds the maximum allowed value, the second DPCCH maybe scaled down up to a minimum value $\beta_{c2,min}$, if the second DPCCH will be transmitted in the upcoming slot. If the total WTRU transmit power still exceeds the maximum allowed value, the total transmit power may be scaled down, (i.e., all physical channels are scaled down equally), until the total transmit power becomes equal to, or less than, the maximum allowed power.

In another embodiment, the second DPCCH is first scaled down before scaling down data channels. If the total WTRU transmit power exceeds the maximum allowed value, the second DPCCH maybe scaled down up to a minimum value $\beta_{c2,min}$ if the second DPCCH will be transmitted in the upcoming slot. If the total WTRU transmit power still exceeds the maximum allowed value, data channels are then scaled down up to an allowed minimum. If the total WTRU transmit power still exceeds the maximum allowed value, the total transmit power is scaled down, (i.e., all physical channels are scaled down equally), until the total transmit power becomes equal to, or less than, the maximum allowed power.

$\beta_{c2,min}$ may be a pre-defined or configured by higher layers. The range of $\beta_{c2,min}$ may be the same as that of the minimum reduced E-DPDCH gain factor $\beta_{ed,k,reduced,min}$. Alternatively, the range of $\beta_{c2,min}$ may be a new set of enumerated values. Alternatively, $\beta_{c2,min}$ may be a fixed value, (e.g., $\beta_{c2,min}=0$, which means a special case of turning off the second DPCCH).

In another embodiment, the WTRU may turn off the second DPCCH and autonomously switches back to non-transmit diversity mode if the required transmit power exceeds the maximum allowed transmit power. If the WTRU is still power limited, the conventional power scaling may be applied.

In another embodiment, the CLTD may be deactivated, which may include accordingly turning off the second antenna and the second DPCCH transmission.

The amplitude information of channel state information (CSI) may be included in the precoding vector when two transmit antennas are un-balanced, which is the case for WTRUs where the space for antennas are very limited. Having amplitude information in the precoding vector may cause unequal transmit power at the two transmit antennas. This may not be a problem for WTRUs equipped with two full-power power amplifiers (PA), one for each antenna. To save the cost and also the power consumption of the WTRU, the WTRU may be equipped with one full-power PA for one antenna and one half-power PA for the other antenna, or two half-power PAs for two antennas. For such WTRUs, special handling may be required as the transmit power could exceed the maximum allowed power of the half-power PA.

In the following, define $P_H$ the maximum allowed power of the half-power PA and $P_F$ the maximum allowed power of the full-power PA. Normally, $P_F=2P_H$. Define P the required transmit power on the antenna equipped with a half-power PA, $P_{tot}$ the total required transmit power, and $P_{max}$ the total maximum allowed transmit power at the WTRU. In general, $P_{max} \leq P_F$. The precoding weight vector includes two parts: the amplitude information and phase information.

If $P_{tot} > P_{max}$, the WTRU may first perform the maximum power scaling. Otherwise, the following step is performed. If $P > P_H$, the WTRU may disregard the amplitude component of the precoding weight vector indicated by the NodeB and apply the phase component of this precoding weight vector. For example, if the precoding weight vector is denoted as $w = [\sqrt{1-\alpha^2} \alpha e^{j\theta}]^T$ where $\alpha$ is the amplitude information and $\theta$ is the phase information, the new precoding weight vector that is to be applied by the WTRU may just have phase information, i.e., $$w = \sqrt{\frac{1}{2}} \, [1 \ e^{j\theta}]^T.$$

The NodeB receiver may differentiate which precoding weight vector was applied at the WTRU by testing two hypothesis. If $P \leq P_H$, the WTRU may follow the precoding weight vector indicated by the NodeB.

Embodiments for calculating a normalized remaining power margin (NRPM) for E-TFC restriction are disclosed hereafter.

Due to the introduction of the second DPCCH in a WTRU transmitter, when calculating an NRPM, the power overhead of the second DPCCH may be taken into account. In addition, since the second DPCCH may be gated, the DPCCH gating cycle may also be taken into account.

With the second DPCCH, the NRPM for E-TFC candidate j may be calculated as follows:

$$\text{NRPM}_j = (P\text{Max}_j - P_{DPDCH} - P_{DPCCH1,target} - P_{DPCCH2} - P_{HS\text{-}DPCCH} - P_{E\text{-}DPCCH,j})/P_{DPCCH1,target},$$   Equation (24)

where DPCCH1 is the primary DPCCH that is precoded together with HS-DPCCH, E-DPCCH, DPDCH, and E-DPDCHs, and DPCCH2 is the secondary DPCCH.

If DPCCH2 is transmitted together with DPCCH1, $P_{DPCCH2}$ may be estimated based on $P_{DPCCH1,target}$ and a gain factor $\gamma$ signaled from a higher layer. For example, $P_{DPCCH2}$ may be calculated as follows:

$$P_{DPCCH2} = \gamma^2 \times P_{DPCCH1,target}.$$   Equation (25)

If gated DPCCH2 is enabled, the following embodiments may be used to calculate $P_{DPCCH2}$. In one embodiment, the estimated DPCCH2 transmit power $P_{DPCCH2}$ may be calculated based on $P_{DPCCH1,target}$ a gain factor $\gamma$ signaled from a higher layer, and the number of slots (N) that is not DTXed within the TTI for the next upcoming transmission. For example, $P_{DPCCH2}$ may be calculated as follows:

$$P_{DPCCH2} = (N/N_{TTI}) \times \gamma^2 \times P_{DPCCH1,target},$$   Equation (26)

where $N_{TTI}=3$ for 2 ms TTI, $N_{TTI}=15$ for 10 ms TTI.

In another embodiment, the estimated DPCCH2 transmit power $P_{DPCCH2}$ may be calculated based on $P_{DPCCH1,target}$ a gain factor $\gamma$ signaled from a higher layer, and DPCCH2 DTX cycle which is defined as the ratio between the number of transmitted or non-DTXed DPCCH2 slot $N_{tx}$ and the number of slots $N_{frame}$ of one radio frame. For example, $P_{DPCCH2}$ may be calculated as follows:

$$P_{DPCCH2} = (N_{tx}/N_{frame}) \times \gamma^2 \times P_{DPCCH1,target},$$   Equation (27)

wherein $N_{frame}=15$.

In another embodiment, the estimated DPCCH2 transmit power $P_{DPCCH2}$ may be calculated based on $P_{DPCCH1,target}$, and a gain factor $\gamma$ signaled from a higher layer. For example, $P_{DPCCH2}$ may be calculated as follows:

$$P_{DPCCH2} = \gamma^2 \times P_{DPCCH1,target}.$$   Equation (28)

In another embodiment, the estimated DPCCH2 transmit power $P_{DPCCH2}$ may be set to zero.

Embodiments for UE power headroom (UPH) measurements are disclosed hereafter. Due to the introduction of the second DPCCH in the uplink closed-loop transmit diversity scheme, the conventional UPH measurement procedure needs to be modified.

In one embodiment, the UPH calculation may take the second DPCCH into account for the slots for which the second DPCCH is not DTXed. For each activated uplink frequency, the UPH, which is the ratio of the maximum WTRU transmission power ($P_{max,tx}$) and the DPCCH code power, may be calculated as follows:

$$\text{UPH} = P_{max,tx}/(P_{DPCCH1} + P_{DPCCH2}),$$   Equation (29)

where $P_{DPCCH}1$, $P_{DPCCH2}$ are the transmitted code power on the DPCCHs before precoding. For the slots where DPCCH2 is DTXed, $P_{DPCCH2}=0$.

In another embodiment, the UPH calculation may take the first DPCCH into account as the NodeB may calculate the true UPH based on the gain factor $\gamma$ and DPCCH2 DTX cycle for scheduling purpose. The UPH may be calculated as follows:

$$\text{UPH} = P_{max,tx}/P_{DPCCH1}.$$   Equation (30)

In another embodiment, the UPH calculation may take the second DPCCH into account even for the slots for which the second DPCCH is DTXed. The UPH may be calculated as follows:

$$\text{UPH} = P_{max,tx}/(P_{DPCCH1} + P_{DPCCH2}) = \text{UPH} = P_{max,tx}/((1+\gamma^2)P_{DPCCH1}).$$   Equation (31)

The reported UPH may be an estimate of the average value of the UPH over a certain period.

Embodiments for supporting enhanced phase reference operation in HSUPA CLTD and UL MIMO are disclosed hereafter.

When high data rates are used on the E-DPDCH, the conventional high speed uplink packet access (HSUPA) uplink system supports enhanced phase reference, such that the E-DPCCH transmit power is boosted. For HSUPA with closed-loop transmit diversity or MIMO multi-stream operations, an enhanced phase reference may be supported to achieve improved high data rate phase reference performance.

For CLTD and MIMO HSUPA, a second pilot, (e.g., second DPCCH), may be transmitted to assist the serving NodeB in determining the precoding weights to be fed back to the WTRU. The transmit power of the second DPCCH may be boosted in order to have more accurate channel estimation for precoding vector generation and/or an enhanced phase reference for the second stream.

The first DPCCH may be precoded using the same precoding vector as the E-DPDCHs, and the second DPCCH may be precoded using a different precoding vector. For the multistream MIMO case, the second DPCCH may be encoded.

In order to improve the demodulation performance of an E-DPDCH for high data rate transmissions, the E-DPCCH transmit power may be boosted in HSUPA CLTD and/or MIMO HSUPA. In this case, the unquantized second DPCCH gain factor for the i-th E-TFC, $\beta_{sc,i,uq}$ may be calculated as follows:

$$\beta_{sc,i,uq} = \gamma \cdot \beta_c \cdot \sqrt{1 + \left(\frac{\beta_{ec,i,uq}}{\beta_c}\right)^2},$$   Equation (32)

where $\gamma$ is the scaling factor such that the second DPCCH gain factor $\beta_{sc} = \gamma \cdot \beta_c$ when enhanced phase reference is not enabled, and $\beta_{sc,i,uq}$ is defined and calculated as in 3GPP TS 25.214. $\beta_{sc,i,uq}$ may be further quantized according to a predefined quantization table.

In another embodiment, $\beta_{sc,i,uq}$ may be calculated based on quantized E-DPCCH gain factor $\beta_{ec,i}$ for the i-th E-TFC, as follows:

$$\beta_{sc,i,uq} = \gamma \cdot \beta_c \cdot \sqrt{1 + \left(\frac{\beta_{ec,i}}{\beta_c}\right)^2}.$$   Equation (33)

In another embodiment, $\beta_{sc,i,uq}$ may be calculated as follows:

$$\beta_{sc,i,uq} = \gamma \cdot \beta_c \cdot \sqrt{\frac{\sum_{k=1}^{k_{max,i}} \left(\frac{\beta_{ed,i,k}}{\beta_c}\right)^2}{10^{\frac{\Delta_{T_2TP}}{10}}}}, \quad \text{Equation (34)}$$

where $\Delta_{T2TP}$ is signaled by higher layers and is defined in 3GPP TS 25.213, $\beta_{ed,i,k}$ is the E-DPDCH gain factor for the i-th E-TFC on the k-th physical channel, and $k_{max,i}$ is the number of physical channels used for the i-th E-TFC.

In all the above embodiments, the second DPCCH gain factor may be calculated dynamically and may be based on the data traffic. Alternatively, the boosted second DPCCH gain factor may be set semi-dynamic, for example, as follows:

$$\beta_{sc} = \gamma_{boost} \cdot \beta_c, \quad \text{Equation (35)}$$

where $\gamma_{boost}$ may be signaled via RRC signaling and $\gamma_{boost} > \gamma$.

In another embodiment, the first DPCCH transmit power may be boosted to improve the E-DPDCH demodulation performance for high data rate transmissions. In this case, the unquantized second DPCCH gain factor for the i-th E-TFC, $\beta_{sc,i,uq}$ may be calculated as follows:

$$\beta_{sc,i,uq} = \gamma \cdot \sqrt{\frac{\sum_{k=1}^{k_{max,i}} (\beta_{ed,i,k})^2}{10^{\frac{\Delta_{T_2TP}}{10}}}}. \quad \text{Equation (36)}$$

Alternatively, the boosted DPCCH gain factor may be calculated first as follows:

$$\beta_{c,boost} = \sqrt{\frac{\sum_{k=1}^{k_{max,i}} (\beta_{ed,i,k})^2}{10^{\frac{\Delta_{T_2TP}}{10}}}}, \quad \text{Equation (37)}$$

and then the second DPCCH gain factor may be calculated based on the boosted DPCCH gain factor as follows:

$$\beta_{sc} = \gamma \cdot \beta_{c,boost}. \quad \text{Equation (38)}$$

In the embodiments described above, the second DPCCH power is boosted to achieve more accurate channel estimates to improve weight generation performance for CLTD and/or an enhanced phase reference for the second stream for MIMO operation.

Figure 21:
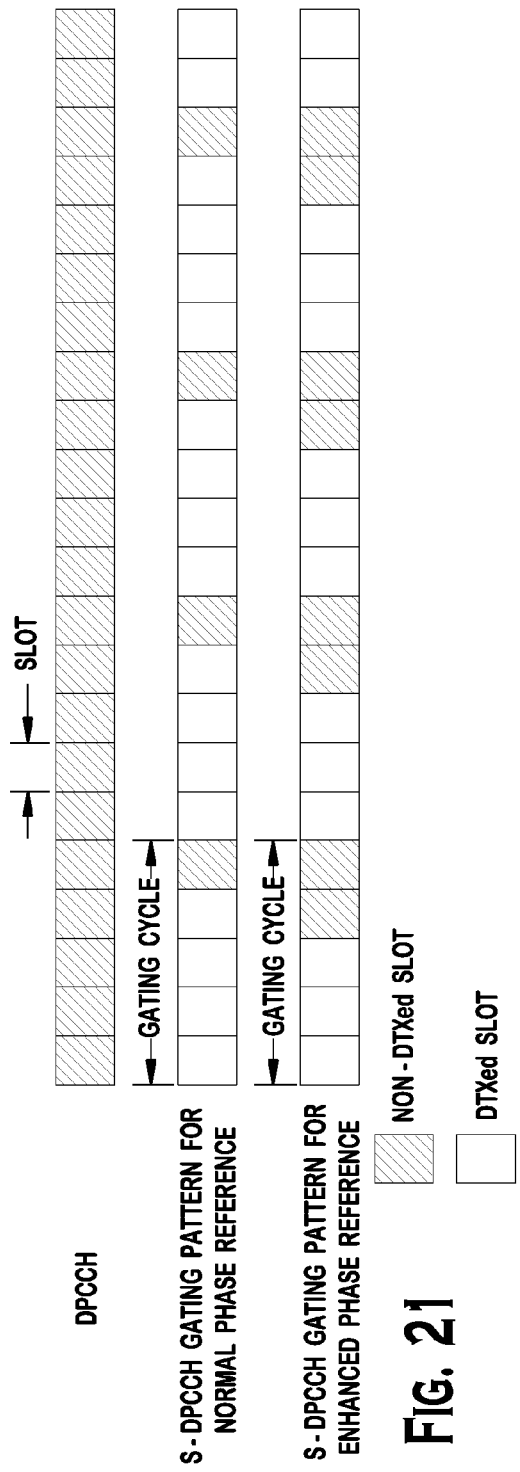
FIG. 21 shows an example second DPCCH gating pattern for enhanced phase reference.

For CLTD operation, instead of boosting the second DPCCH transmit power, the second DPCCH slots may be transmitted more frequently in the mode where enhanced phase reference is required than normal mode, given the fact that the CLTD transmitter structure allows the second DPCCH to be DTXed in certain slots. This may be done by adjusting the second DPCCH gating pattern. FIG. 21 shows an example second DPCCH gating pattern for enhanced phase reference. In FIG. 21, compared to the second DPCCH gating pattern for normal phase reference, one additional second DPCCH slot is transmitted on the slot right before the non-DTXed slot of the second DPCCH gating cycle for normal phase reference. The two second DPCCH slots in one gating cycle for enhanced phase reference may be both used at the NodeB for weight generation.

The combination of the enhanced second DPCCH gating pattern and boosting the second DPCCH power may be used.

In another embodiment, the second DPCCH may use longer pilot bits if enhanced phase reference from the second DPCCH is needed, and the same second DPCCH transmit power may be used as the normal phase reference. For example, the second DPCCH may include 6 or 8 pilot bits for normal phase reference, and a second DPCCH with 10-bit pilot may be used for enhanced phase reference.

Figure 22:
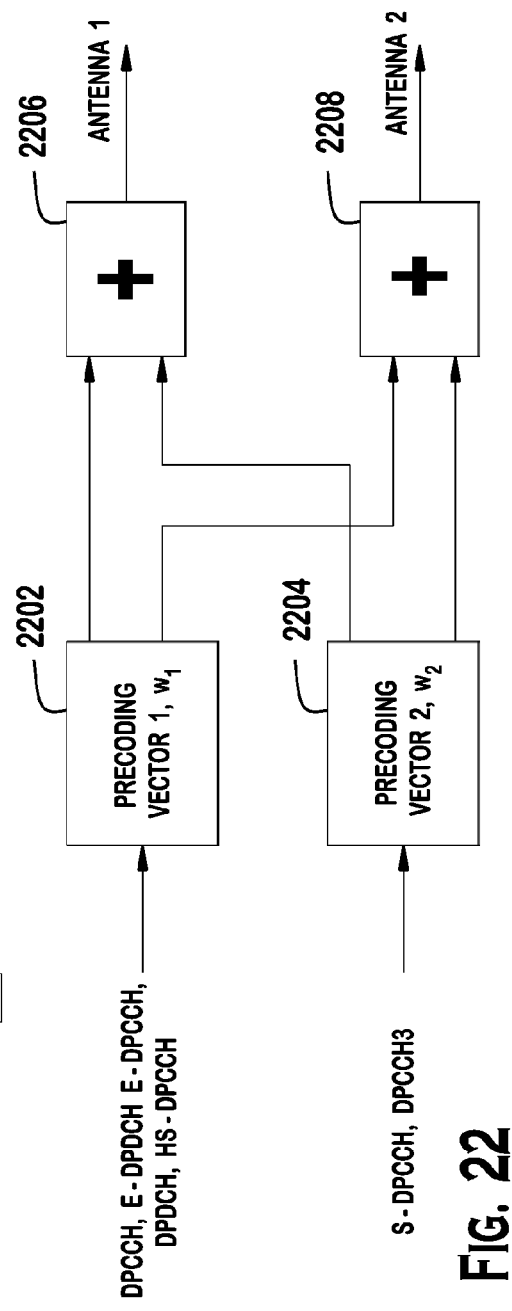
FIG. 22 shows an example transmission of the third DPCCH for enhanced phase reference assistance.

In another embodiment, a third pilot channel DPCCH3 may be transmitted, which is precoded with the same precoding vector applied to the second DPCCH when enhanced phase reference from the second DPCCH is needed. FIG. 22 shows an example transmission of the third DPCCH for enhanced phase reference assistance. DPCCH, E-DPDCH, E-DPCCH, DPDCH, and/or HS-DPCCH are precoded by a precoding block 2202, and S-DPCCH and the third DPCCH (DPCCH3) are precoded by a precoding block 2204, and each precoded antenna components are added by combiners 2206, 2208 and then sent to the corresponding antennas.

The gain factor $\beta_{c3}$, applied to DPCCH3 may be calculated as follows:

$$\beta_{c3} = \gamma \cdot \beta_{ec}. \quad \text{Equation (39)}$$

For MIMO operation, the second DPCCH may be transmitted with all second stream E-DPDCH transmissions to provide a phase reference for detection. For MIMO operation, a second E-DPCCH may be sent on the second stream with the second stream E-DPDCH as a phase reference for detection. A combination of the second DPCCH and the second E-DPCCH may be used to improve the second stream phase reference for the E-DPDCH detection by combining the two reference signals. This combination for improved phase reference may be used if the second DPCCH is transmitted every E-DPDCH transmission or it is transmitted with a gating pattern as described above for the CLTD case.

In another embodiment for CLTD where the accuracy of the channel estimation for precoding estimation need not be any better than that for lower modulation, where boosting is not used, the transmission power of the second DPCCH may be lowered when the power of the E-DPCCH is boosted to enable better channel phase estimation for higher modulation detection. As the power of the E-DPCCH is boosted, the quality of the channel estimation for both modulation detection and precoding estimation would be improved. If the improved channel estimation is not necessary for the network to choose the precoding matrix, the second DPCCH power may be lowered while maintaining the precoding matrix accuracy. This de-boosting may be achieved by any of the embodiments described above for the boosting, except that the value chosen for $\gamma$ or $\gamma_{boost}$ would yield a decrease in transmission power instead of an increase.

FIG. 23 shows an example implementation of the second DPCCH gating pattern to mitigate phase discontinuity. The precoding weight change may cause phase discontinuity of the estimated effective channel to be used by the E-DPDCH demodulation since filtering on channel estimate over a few slots is needed. To mitigate this phase discontinuity problem, depending on the PCI feedback cycle and the time when the WTRU applies the PCI, the second DPCCH gating pattern may be designed such that N successive second DPCCH slots may be present in which the last second DPCCH slot may be the slot when the WTRU applies a PCI. These N successive second DPCCH slots may be used at the serving NodeB for demodulation as well, in addition to weight generation. Therefore, the second DPCCH slots power may be boosted to the same as the first DPCCHs.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method implemented in a wireless transmit/receive unit (WTRU) for transmitting pilot symbols on multiple antennas, the method comprising:
transmitting an uplink primary dedicated physical control channel (DPCCH) and at least one uplink secondary DPCCH (S-DPCCH) via the multiple antennas using different channelization codes, wherein the S-DPCCH carries pilot symbols that are the same as pilot symbols of at least length eight of the primary DPCCH;
transmitting an enhanced dedicated channel (E-DCH) dedicated physical data channel (E-DPDCH), wherein a normalized remaining power margin (NRPM) for an E-DCH transport format combination (E-TFC) selection is performed by taking a primary DPCCH transmit power, an S-DPCCH transmit power, a dedicated physical data channel (DPDCH) transmit power, a high speed dedicated physical control channel (HS-DPCCH) transmit power and an E-DCH dedicated physical control channel (E-DPCCH) transmit power into account;
wherein power scaling is applied equally to the primary DPCCH and the S-DPCCH on a condition that a required transmit power exceeds a maximum allowed transmit power of the WTRU such that a power ratio between the primary DPCCH and the S-DPCCH remains the same after the power scaling; and
wherein, when discontinuous transmission (DTX) is active, the WTRU does not transmit the S-DPCCH in a slot where the WTRU does not transmit the primary DPCCH.

2. The method of claim 1 wherein same number of pilot symbols are transmitted on the S-DPCCH when the WTRU is transmitting in a compressed mode.

3. The method of claim 1 wherein a same total pilot energy ratio is maintained between the primary DPCCH and the S-DPCCH both in a normal mode and in a compressed mode.

4. The method of claim 1 wherein the S-DPCCH transmit power is determined based on a primary DPCCH power target and a gain factor signaled from a higher layer.

5. The method of claim 1 wherein a gain factor for the S-DPCCH is boosted on a condition that E-DCH data is transmitted on a secondary stream.

6. The method of claim 5 wherein an amount of boosting of the gain factor for the S-DPCCH is determined based on a combination of an E-DPDCH gain factor, a scaling factor signaled by a higher layer and a traffic to pilot power ratio signaled by a higher layer.

7. The method of claim 1 wherein the S-DPCCH is continuously transmitted at a different power setting when a second stream is transmitted.

8. The method of claim 1 wherein the S-DPCCH carries ten pilot symbols including two non-frame synchronization word (FSW) symbols.

9. A wireless transmit/receive unit (WTRU) for transmitting pilot symbols on multiple antennas, the WTRU comprising:
a plurality of antennas; and
a circuitry configured to transmit an uplink primary dedicated physical control channel (DPCCH) and at least one uplink secondary DPCCH (S-DPCCH) via the multiple antennas using different channelization codes, wherein the S-DPCCH carries pilot symbols that are the same as pilot symbols of at least length eight of the primary DPCCH;
wherein the circuitry is configured to transmit an enhanced dedicated channel (E-DCH) dedicated physical data channel (E-DPDCH), wherein a normalized remaining power margin (NRPM) for an E-DCH transport format combination (E-TFC) selection is performed by taking a primary DPCCH transmit power, an S-DPCCH transmit power, a dedicated physical data channel (DPDCH) transmit power, a high speed dedicated physical control channel (HS-DPCCH) transmit power and an E-DCH dedicated physical control channel (E-DPCCH) transmit power into account;
wherein power scaling is applied equally to the primary DPCCH and the S-DPCCH on a condition that a required transmit power exceeds a maximum allowed transmit power of the WTRU such that a power ratio between the primary DPCCH and the S-DPCCH remains the same after the power scaling; and
wherein, when discontinuous transmission (DTX) is active, the WTRU does not transmit the S-DPCCH in a slot where the WTRU does not transmit the primary DPCCH.

10. The WTRU of claim 9 wherein same number of pilot symbols are transmitted on the S-DPCCH when the WTRU is transmitting in a compressed mode.

11. The WTRU of claim 9 wherein a same total pilot energy ratio is maintained between the primary DPCCH and the S-DPCCH both in a normal mode and in a compressed mode.

12. The WTRU of claim 9 wherein the S-DPCCH transmit power is determined based on a primary DPCCH power target and a gain factor signaled from a higher layer.

13. The WTRU of claim 9 wherein a gain factor for the S-DPCCH is boosted on a condition that E-DCH data is transmitted on a secondary stream.

14. The WTRU of claim 13 wherein an amount of boosting of the gain factor for the S-DPCCH is determined based on a combination of an E-DPDCH gain factor, a scaling factor signaled by a higher layer and a traffic to pilot power ratio signaled by a higher layer.

15. The WTRU of claim 9 wherein the S-DPCCH is continuously transmitted at a different power setting when a second stream is transmitted.

16. The WTRU of claim 9 wherein the S-DPCCH carries ten pilot symbols including two non-frame synchronization word (FSW) symbols.

* * * * *